US006473799B1

(12) United States Patent
Takeshita et al.

(10) Patent No.: US 6,473,799 B1
(45) Date of Patent: Oct. 29, 2002

(54) USER SYSTEM FOR A DISTRIBUTED NETWORK

(75) Inventors: Ken-ichi Takeshita; Keiki Nishihara; Shinya Yamamura; Shin-ichi Matsumoto, all of Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/223,557

(22) Filed: Dec. 30, 1998

(30) Foreign Application Priority Data

Jul. 1, 1998 (JP) .......................................... 10-186091

(51) Int. Cl.$^7$ .......................................... G06F 15/173
(52) U.S. Cl. ...................................... 709/225; 379/265
(58) Field of Search ................................. 709/225, 229; 379/93.01, 265.09, 265.02, 265

(56) References Cited

U.S. PATENT DOCUMENTS

| | | | | |
|---|---|---|---|---|
| 5,301,246 A | * | 4/1994 | Archibald et al. | 380/23 |
| 5,500,891 A | * | 3/1996 | Harrington et al. | 379/265 |
| 5,519,874 A | * | 5/1996 | Yamagishi et al. | 395/800 |
| 5,565,910 A | * | 10/1996 | Rowse et al. | 348/15 |
| 5,892,764 A | * | 4/1999 | Riemann et al. | 370/401 |
| 5,958,016 A | * | 9/1999 | Chang et al. | 709/229 |
| 5,999,617 A | * | 12/1999 | Oyanagi et al. | 379/265 |
| 6,094,479 A | * | 7/2000 | Lindeberg et al. | 379/220 |
| 6,208,639 B1 | * | 3/2001 | Murai | 370/365 |
| 6,272,496 B1 | * | 8/2001 | Lennert et al. | 707/102 |
| 6,292,555 B1 | * | 9/2001 | Okamoto | 379/265 |

FOREIGN PATENT DOCUMENTS

JP          6-314262          11/1994

* cited by examiner

*Primary Examiner*—Mark H. Rinehart
*Assistant Examiner*—Bunjob Jaroenchonwanit
(74) *Attorney, Agent, or Firm*—Katten Muchin Zavis Rosenman

(57) ABSTRACT

A user system for a distributed network whereby a user system which is not provided with a distributed application platform can be connected to a distributed network. A user information unit incorporates therein physical points corresponding to stream and network flow endpoints, respectively. A flow endpoint control channel connects a user signaling unit to the user information unit. The user signaling unit includes distributed communication control means, distributed network service controller, and information unit controller for controlling the user information unit by means of a flow endpoint control signal. The user information unit includes physical point linking unit, and flow endpoint control signal processing unit which cooperates with the user signaling unit by means of the flow endpoint control signal.

6 Claims, 49 Drawing Sheets

| SIGNAL NAME | DIRECTION OF COMMUNICATION | INFORMATION INCLUDED |
| --- | --- | --- |
| CONNECT FOR ORIGINATING | DOWN | STREAM FLOW ENDPOINT ID, NETWORK FLOW ENDPOINT ID |
| CONNECT FOR TERMINATING | DOWN | STREAM FLOW ENDPOINT ID, NETWORK FLOW ENDPOINT ID, ADDITIONAL INFORMATION |
| DISCONNECT INSTRUCTION | DOWN | STREAM FLOW ENDPOINT ID |
| ORIGINATION | UP | STREAM FLOW ENDPOINT ID, NETWORK FLOW ENDPOINT ID, ADDITIONAL INFORMATION |
| CONNECTED | UP | STREAM FLOW ENDPOINT ID |
| DISCONNECT INDICATION | UP | STREAM FLOW ENDPOINT ID |
| STATUS CHANGE | UP | STREAM FLOW ENDPOINT ID, STATUS |

FIG. 5

| LINE | EXPRESSION IN PRIVATE BRANCH EXCHANGE | | | EXPRESSION IN DISTRIBUTED NETWORK | | |
|---|---|---|---|---|---|---|
| | LINE LOCATION NO. | LOGICAL NO. | EXTENSION NO. | FLOW ENDPOINT ID (NO.) | PROPERTY | DIRECTIONALITY |
| EXTENSION A | 1001 | 1 (EXTENSION) | 300 | S1(300) | VOICE | BOTH-WAY |
| EXTENSION B | 1002 | 2 (EXTENSION) | 301 | S2(400) | VOICE | BOTH-WAY |
| TRUNK A | 2001 | 11 (TRUNK) | — | N 11 | 64k | BOTH-WAY |
| TRUNK B | 2002 | 12 (TRUNK) | — | N 12 | 64k | BOTH-WAY |
| TRUNK C | 2003 | 13 (TRUNK) | — | N 13 | 64k | BOTH-WAY |
| TRUNK D | 3001 | 20 (TRUNK) | — | S 31 | AUDIO | BOTH-WAY |
| GROUP A | — | 1 (TRUNK GROUP) | — | N 1 | 64k | BOTH-WAY |
| GROUP D | — | 2 (TRUNK GROUP) | — | S3(500) | AUDIO | BOTH-WAY |

FIG. 6

<TRUNK IDLE/BUSY DATA>

<EXTENSION IDLE/BUSY DATA>

<RECEIVED NUMERALS ANALYSIS DATA>

<LINE LOCATION NO.
 —LOGICAL LINE NO. CONVERSION DATA>

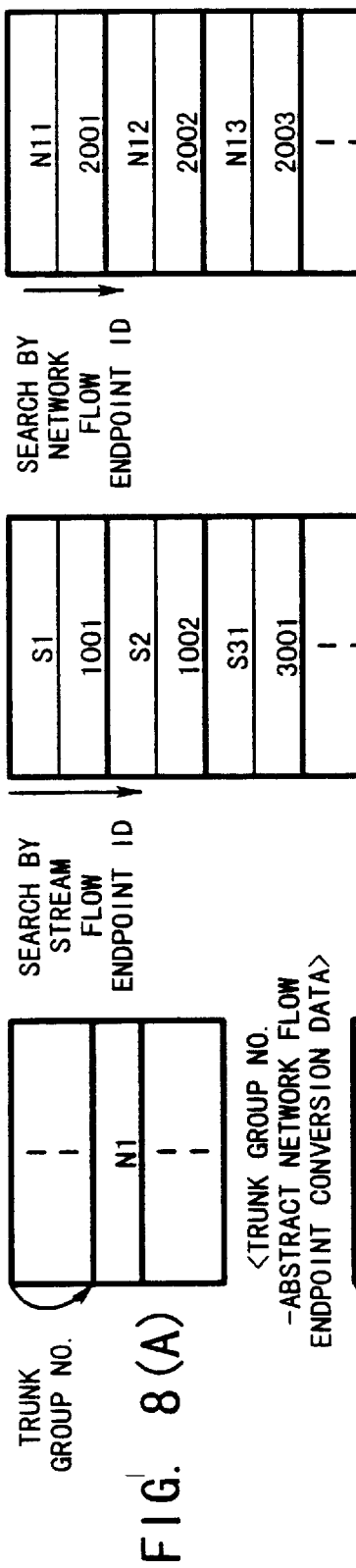
FIG. 8(A) ⟨TRUNK GROUP NO. -ABSTRACT NETWORK FLOW ENDPOINT CONVERSION DATA⟩
FIG. 8(B) ⟨LOGICAL EXTENSION NO. -STREAM FLOW ENDPOINT CONVERSION DATA⟩
FIG. 8(C) ⟨LOGICAL TRUNK NO. -STREAM FLOW ENDPOINT CONVERSION DATA⟩
FIG. 8(D) ⟨STREAM FLOW ENDPOINT-LINE LOCATION NO. CONVERSION DATA⟩
FIG. 8(E) ⟨NETWORK FLOW ENDPOINT-LINE LOCATION NO. CONVERSION DATA⟩

FIG. 9(A)

SEARCH BY STREAM FLOW ENDPOINT ID OR STREAM FLOW ENDPOINT NO. ↓

| S1 |
|---|
| 300 |
| 0 (= FLOW ENDPOINT) |
| 0 (= VOICE) |
| 0/1/2/3 (= IDLE/ ORIGINATION/ TERMINATION/ UNUSABLE) |
| N1 |
| S2 |
| 400 |
| 0 (= FLOW ENDPOINT) |
| 0 (= VOICE) |
| 0/1/2/3 |
| N1 |
| S3 |
| 500 |
| 1 (= ABSTRACT FLOW ENDPOINT) |
| 1 (= AUDIO) |
| — |
| N1 |
| S31 |
| — |
| 0 (= FLOW ENDPOINT) |
| 1 (= AUDIO) |
| 0/1/2/3 |
| N1 |

<STREAM FLOW ENDPOINT DATA>

FIG. 9(B)

SEARCH BY NETWORK FLOW ENDPOINT ID ↓

| N1 |
|---|
| 1 (= ABSTRACT FLOW ENDPOINT) |
| 64 |
| 0 (= BOTH-WAY) |
| — |
| N11 |
| 0 (= FLOW ENDPOINT) |
| 64 |
| 0 |
| 0/1 (= IDLE/ BUSY) |
| N12 |
| 0 (= FLOW ENDPOINT) |
| 64 |
| 0 |
| 0/1 |
| N13 |
| 0 (= FLOW ENDPOINT) |
| 64 |
| 0 |
| 0/1 |

<NETWORK FLOW ENDPOINT DATA>

<ABSTRACT NETWORK FLOW ENDPOINT MEMBER DATA>

<ABSTRACT STREAM FLOW ENDPOINT MEMBER DATA>

<FLOW ENDPOINT LINK DATA>

USER SYSTEM FOR A DISTRIBUTED NETWORK

BACKGROUND OF THE INVENTION (1) Field of the Invention

The present invention relates to a user system for a distributed network, and more particularly, to a user system of a type which has no distributed application platform provided therein and thus is unable to be incorporated in a distributed network.

(2) Description of the Related Art

TINA (Telecommunications Information Networking Architecture) is known as a distributed network architecture using a distributed application platform which is distributed communication control means.

FIG. 47 shows, by way of example, a configuration of a distributed network conventionally adopted according to TINA. A user system 100, such as a workstation, is equipped with an interface card 100a for distributed application platform, a network card 100b, and a sound card 100c. The sound card 100c treats a speaker 100d as a stream flow endpoint.

Network systems 101, 102 and 103 also are provided with interface cards 101a, 102a and 103a for distributed application platform, respectively, and the network systems 102 and 103 are additionally provided with network cards 102b and 103b, respectively. The distributed application platform interface cards 100a, 101a, 102a and 103a are interconnected via a control signaling channel 122, and the network cards 100b, 102b and 103b are interconnected via an information channel 121 and ATM switches 111 and 112.

FIG. 48 illustrates the architecture of the distributed network shown in FIG. 47. As shown in FIG. 48, in a TINA-compliant distributed network architecture using a distributed application platform (CORBA etc.) 150, an information network 130 and a signaling network 140 are separated from each other. The distributed application platform 150 is a distributed OS for executing distributed communication control and is hereinafter referred to as "distributed communication control means."

The signaling network 140 can be divided into user components 141 and 142 and network components 145 to 149. The user components 141 and 142 are application programs of user systems that use the distributed communication control means 150, and the network components 145 to 149 are application programs of network systems that also use the distributed communication control means 150. If a request signal requesting establishment of an information link on the information channel 121 is sent from the user component 141, 142 to the signaling network 140, it is transferred to the network component 145–149 via the distributed communication control means 150. Thereupon, a connection request is sent from the network component 145–149 to a network information unit 135, 136, and also a connection request is sent from the user component 141, 142 to a stream terminating system 131 and a network terminating system 132. As a result, an information link is established on the information channel 121.

FIG. 49 shows, by way of example, a structure of a user system complying with TINA. As shown in the right-hand part of FIG. 49, conventionally, the user system has the distributed communication control means 150, treats the sound card 100c of the user system 100, for example, as a stream flow endpoint, and logically treats the network card 100b, which is the connection point between the network terminating system of the user system 100 and the network information system, as a network flow endpoint.

According to TINA, a flow connection within the user system 100 signifies a logical connection between stream and network flow endpoints using the distributed communication control means 150. For physical connections as shown in the left-hand part of FIG. 49, the distributed communication control means is not used. Thus, TINA prescribes nothing as to physical connections (i.e., outside the scope of provisions). User components for performing physical connections are vaguely defined as UAP (User Application) or CPE-CP (Customer Premise Equipment Connection Performer), but what TINA defines is only interfacing with other user components or other network components. Also, for the stream flow endpoint and the network flow endpoint, there is a general provision as to what information is retained thereby, but conversion with respect to actual systems, etc. are not defined because of diversity of system types and for other reasons.

As stated above, in conventional user systems adopted in TINA, the physical point represented by a stream flow endpoint and the physical point represented by a network flow endpoint are incorporated in the user system having the distributed communication control means provided therein. Accordingly, in a section of the user system except the distributed communication control means, connections between physical points alone are performed.

Conventionally, therefore, a user system which is not provided with the distributed communication control means, for example, a private branch exchange, is associated with a problem that it cannot be directly connected as a user system to a distributed network. Specifically, in order to incorporate a private branch exchange in a distributed network as a part of a user systems, it is necessary that a system having the distributed communication control means should be connected to the private branch exchange, and that a request from the private branch exchange (line) or from the distributed network should be converted by the system into a request to the distributed network or to the private branch exchange (line).

Further, conventional private branch exchanges and the like operate on specialized OS and cannot be provided with the distributed communication control means, and therefore, a private branch exchange is unable to function as a user system by itself and thus cannot be directly connected to a distributed network.

SUMMARY OF THE INVENTION

An object of the present invention is to provide a user system for a distributed network whereby a user system which is not provided with a distributed application platform can be connected to a distributed network.

To achieve the above object, there is provided a user system for a distributed network in which flow connection is expressed by a logical link between a stream flow endpoint and a network flow endpoint, and physical points represented by the stream and network flow endpoints, respectively, are linked in a flow-dependent manner. The user system comprises a user signaling unit, a user information unit incorporating therein physical points corresponding to stream and network flow endpoints, respectively, a flow endpoint control channel connecting the user signaling unit and the user information unit, distributed communication control means provided in the user signaling unit, distributed network service control means provided in the user signaling unit, information unit control means, provided in the user signaling unit, for controlling the user information unit by means of a flow endpoint control signal, physical point linking means provided in the user information unit, and flow endpoint control signal processing means provided in the user information unit and cooperating with the user signaling unit by means of the flow endpoint control signal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram illustrating various forms of flow endpoint control signals exchanged between the user signaling unit and the user information unit (private branch exchange) via a flow endpoint control channel;

FIG. 6 is a diagram showing the correspondence of lines equipped in the user information unit (private branch exchange) to stream flow endpoints and network flow endpoints;

FIG. 8(A) is a diagram showing trunk group number-abstract network flow endpoint conversion data stored in the data section of the user information unit (private branch exchange);

FIG. 8(B) is a diagram showing logical extension number-stream flow endpoint conversion data stored in the data section of the user information unit (private branch exchange);

FIG. 8(C) is a diagram showing logical trunk number-stream flow endpoint conversion data stored in the data section of the user information unit (private branch exchange);

FIG. 8(D) is a diagram showing stream flow endpoint-equipment location number conversion data stored in the data section of the user information unit (private branch exchange);

FIG. 8(E) is a diagram showing network flow endpoint-equipment location number conversion data stored in the data section of the user information unit (private branch exchange);

FIG. 9(A) is a diagram showing stream flow endpoint data stored in a data section of the user signaling unit;

FIG. 9(B) is a diagram showing network flow endpoint data stored in the data section of the user signaling unit;

DESCRIPTION OF THE PREFERRED EMBODIMENTS

An embodiment of the present invention will be hereinafter described with reference to the drawings.

Figure 1:
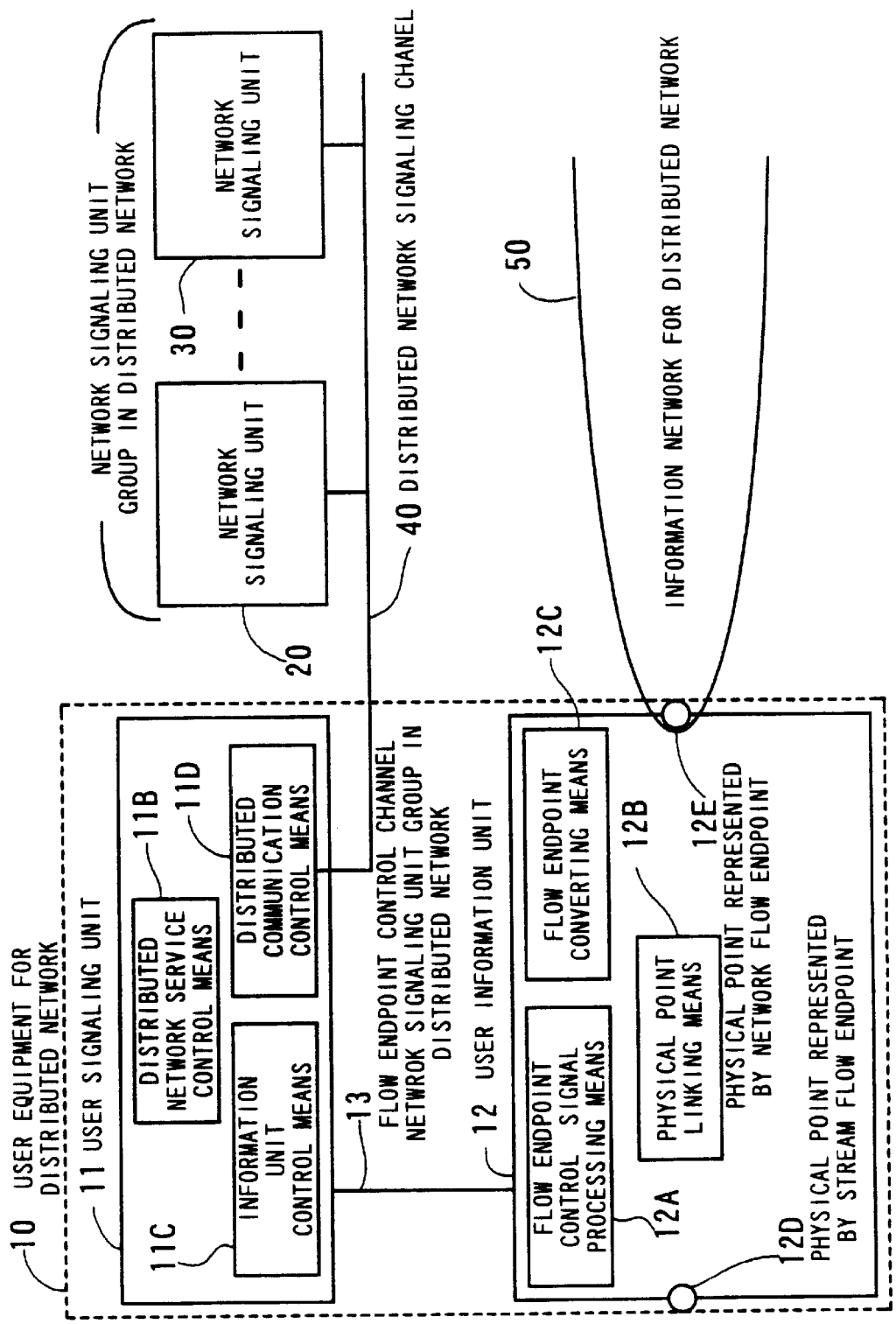
FIG. 1 is a diagram illustrating the principles of the present invention.

Referring first to FIG. 1, a theoretical configuration according to the embodiment of the present invention will be described. A user system 10 for a distributed network according to the present invention comprises a user signaling unit 11, a user information unit 12 incorporating therein physical points 12D and 12E respectively corresponding to a stream flow endpoint and a network flow endpoint, a flow endpoint control channel 13 connecting the user signaling unit 11 and the user information unit 12, distributed communication control means 11D provided in the user signaling unit 11, distributed network service control means 11B provided in the user signaling unit 11, information unit control means 11C provided in the user signaling unit 11, for controlling the user information unit 12 by means of a flow endpoint control signal, physical point linking means 12B provided in the user information unit 12, and flow endpoint control signal processing means 12A provided in the user information unit 12 and cooperating with the user signaling unit 11 by means of the flow endpoint control signal.

As shown in FIG. 1, network signaling units 20, ..., 30 are connected to the user system 10 via a distributed network signaling channel 40. A network information network 50 is an information network of distributed network type.

In the user signaling unit 11, the distributed communication control means 11D controls communications with the network signaling units 20, ..., 30 via the distributed network signal line 40. The distributed network service control means 11B carries out, in cooperation with the network signaling units 20, ..., 30, access to service provided by the network, service execution control, control of a logical link between the stream and network flow endpoints, and management of the network flow endpoint. The information unit control means 11C performs management of the stream flow endpoint in cooperation with the network signaling units 20, ..., 30, and controls the user information unit 12 by means of the flow endpoint control signal.

In the user information unit 12, the physical point linking means 12B links the physical point 12D represented by the stream flow endpoint to the physical point 12E represented by the network flow endpoint. The flow endpoint control signal processing means 12A cooperates with the user signaling unit 11 by means of the flow endpoint control signal. The flow endpoint converting means 12C converts physical point information and flow endpoint information.

The configuration described above permits the user information unit 12, which cannot be equipped with or does not have the distributed communication control means 11D, to be connected to a distributed network, and flow connections of the user information unit 12 can be freely handled by the user signaling unit 11.

Further, since the user information unit 12 is provided with the flow endpoint converting means 12C for converting the physical point information and the flow endpoint information, it is not necessary for the user signaling unit 11 to convert the physical point information or the flow endpoint information.

The embodiment of the present invention will be now described in more detail. In the following description of the embodiment, the distributed network service control means 11B shown in FIG. 1 corresponds to a distributed network service control section 11ab shown in FIG. 3. Similarly, the information unit control means 11C corresponds to an information unit control section 11ac shown in FIG. 3, the distributed communication control means 11D corresponds to a distributed communication control section had shown in FIG. 3, the flow endpoint control signal processing means 12A corresponds to a flow endpoint control signal processing section 12aa shown in FIG. 4, the physical point linking means 12B corresponds to a physical point linking section 12ab shown in FIG. 4, and the flow endpoint converting means 12C corresponds to a flow endpoint converting section 12ac shown in FIG. 4.

Figure 2:
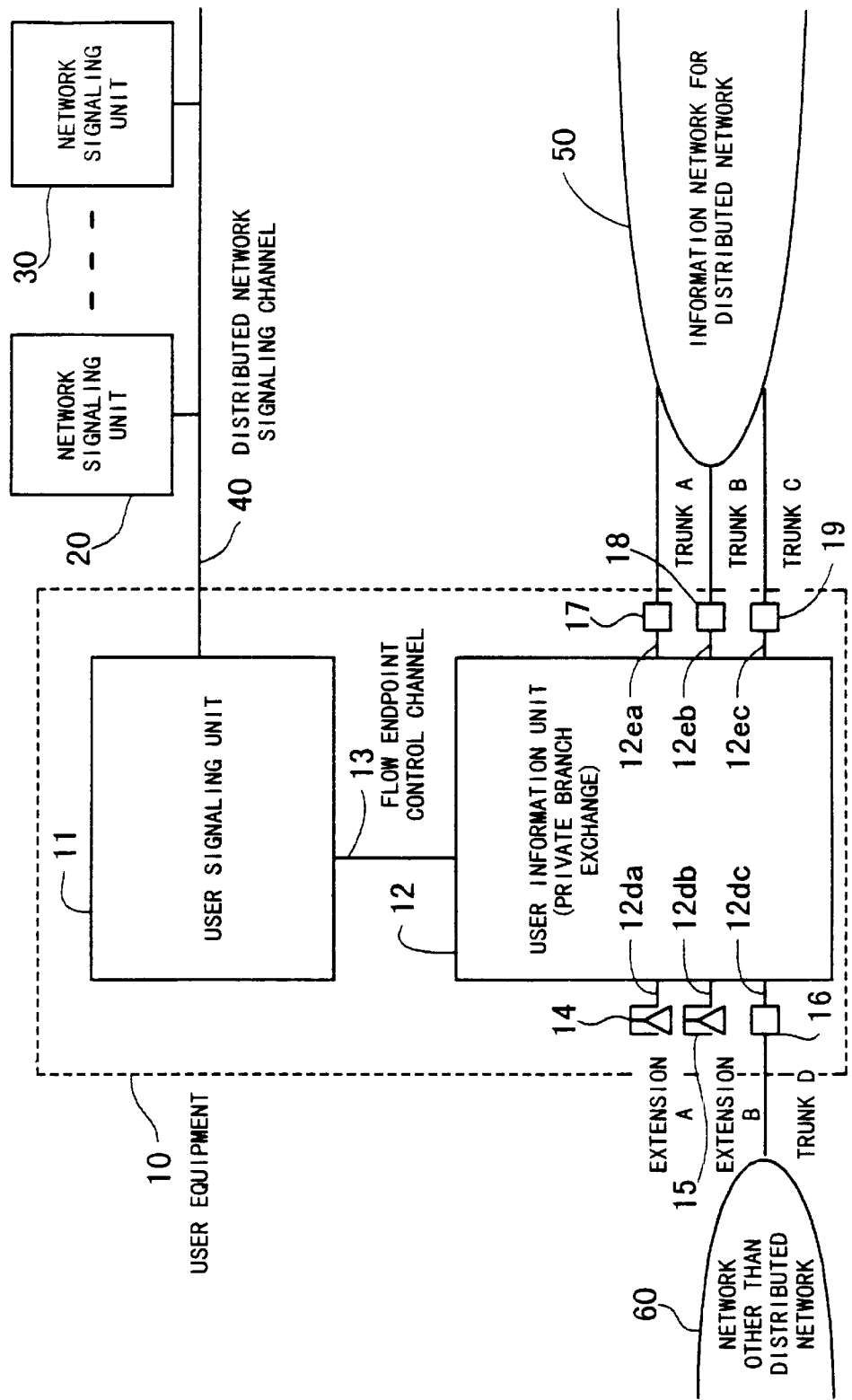
FIG. 2 is a diagram showing networks to which a private branch exchange, as a user information unit according to the present invention, is connected.

FIG. 2 shows networks to which a private branch exchange, as the user information unit according to the present invention, is connected. A user system 10 for distributed network is constituted mainly by a user signaling unit 11 and a user information unit 12. The user information unit 12 is a private branch exchange. The user signaling unit 11 is connected to network signaling units 20, ..., 30 via a distributed network signaling channel 40 and exchanges operations such as service control therewith. The user signaling unit 11 and the user information unit 12 are connected to each other via a flow endpoint control channel 13 and exchanges flow endpoint control signals therebetween. Lines 12da and 12db are lines respectively equipped for extensions (A, B) 14 and 15 corresponding to stream flow endpoints, and a line 12*dc* is a line connected to a network 60 other than distributed network and equipped for a trunk (D) 16 corresponding to a stream flow endpoint. Lines 12*ea*, 12*eb* and 12*ec* are lines connected to a network information network 50, which is a distributed network, and respectively equipped for trunks (A, B, C) 17, 18 and 19 corresponding to network flow endpoints.

Figure 3:
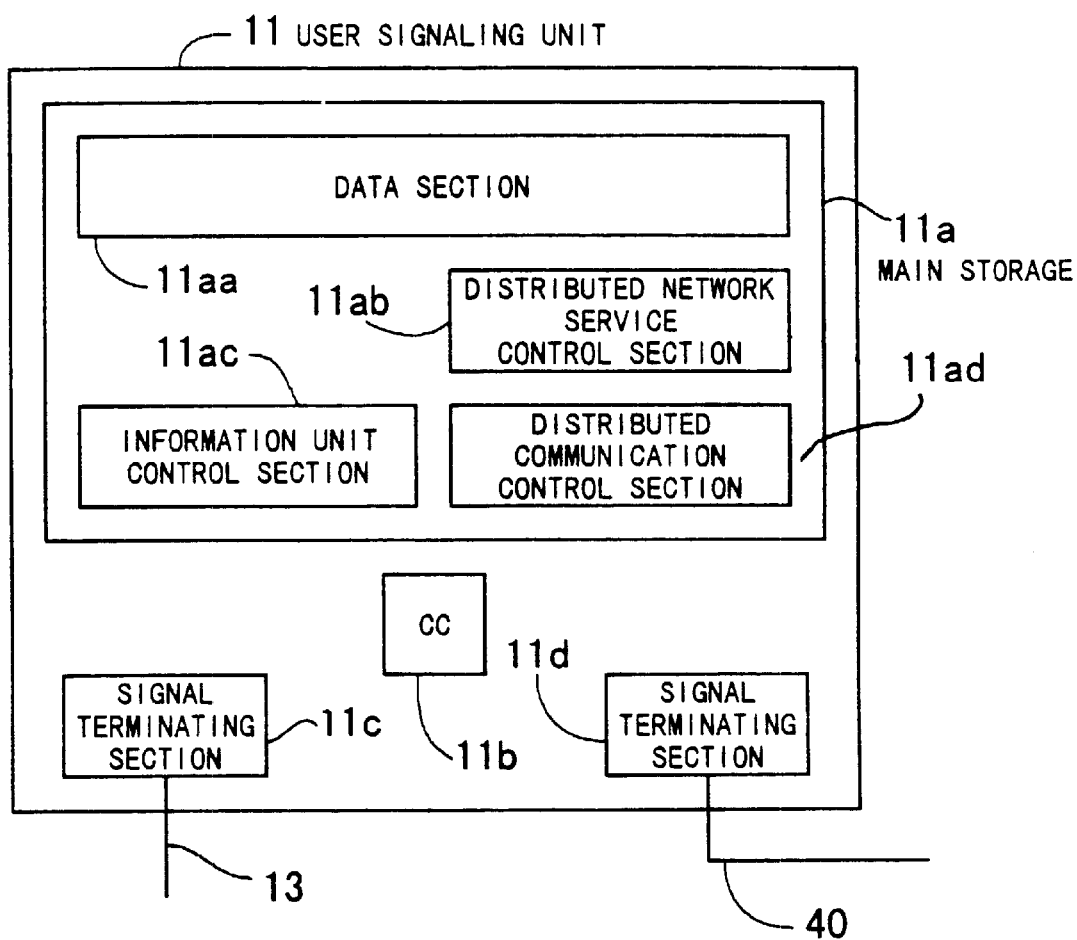
FIG. 3 is a diagram showing the internal arrangement of a user signaling unit.

FIG. 3 shows the internal arrangement of the user signaling unit 11. The user signaling unit 11 comprises a main storage 11*a*, a processor (CC) 11*b*, and signal terminating sections 11*c* and 11*d*. The main storage 11*a* includes a data section 11*aa*, a distributed network service control section 11*ab*, an information unit control section 11*ac*, and a distributed communication control section 11*ad*. The distributed network service control section 11*ab*, the information unit control section 11*ac* and the distributed communication control section 11*ad* correspond to respective processing programs executed by the processor (CC) 11*b*, and the data section 11*aa* corresponds to data stored temporarily during operation of the processor (CC) 11*b*. The signal terminating section 11*c* is a section for transmitting/receiving flow endpoint control signals and physically terminating the flow endpoint control channel 13. The signal terminating section 11*d* is a transmitting/receiving section for physically terminating the distributed network signaling channel 40.

Figure 4:
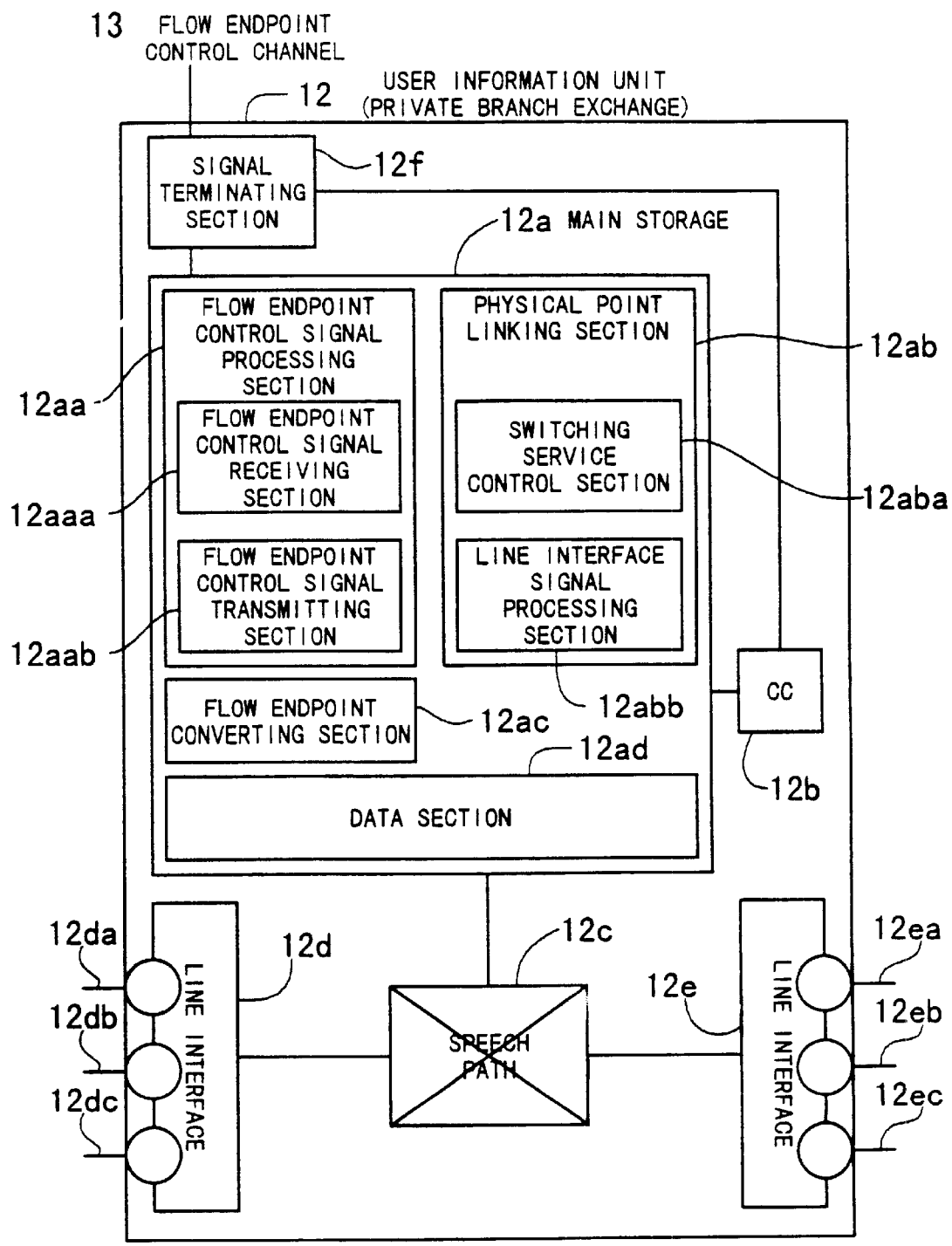
FIG. 4 is a diagram showing the internal arrangement of the user information unit.

FIG. 4 shows the internal arrangement of the user information unit 12. The user information unit 12 comprises a main storage 12*a*, a processor (CC) 12*b*, a speech path 12*c*, line interfaces 12*d* and 12*e*, and a signal terminating section 12*f*. The main storage 12*a* includes a flow endpoint control signal processing section 12*aa*, a physical point linking section 12*ab*, a flow endpoint converting section 12*ac*, and a data section 12*ad*. The flow endpoint control signal processing section 12*aa*, the physical point linking section 12*ab* and the flow endpoint converting section 12*ac* correspond to respective processing programs executed by the processor (CC) 12*b*, and the data section 12*ad* corresponds to data stored temporarily during operation of the processor (CC) 12*b*.

The physical point linking section 12*ab* comprises a line interface signal processing section 12*abb* and a switching service control section 12*aba*. The line interface signal processing section 12*abb* connects the speech path 12*c* and switching line control signals with the line interfaces 12*d* and 12*e*. The switching service control section 12*aba* performs line control, setting instructions with respect to the speech path 12*c*, and control of execution of exchange services such as flow endpoint control signal transmit instruction.

The flow endpoint control signal processing section 12*aa* includes a flow endpoint control signal transmitting section 12*aaa* for controlling transmission of flow endpoint control signals, and a flow endpoint control signal receiving section 12*aab* for controlling reception of flow endpoint control signals. The signal terminating section 12*f* is a flow endpoint control signal transmitting/receiving section which physically terminates the flow endpoint control channel 13. The line interfaces 12*d* and 12*e* are line terminating sections equipped for the extensions (A, B) 14 and 15 and the trunks (A, B, C, D) 17, 18, 19 and 16, and exchange line control signals with the processor 12*b* via the speech path 12*c*.

The arrangement of flow endpoint control signals will be now described.

FIG. 5 illustrates various forms of flow endpoint control signals exchanged between the user signaling unit 11 and the user information unit (private branch exchange) 12 via the flow endpoint control channel 13.

The signals comprise stream flow endpoint ID, network flow endpoint ID, additional information, status, etc. As the "ADDITIONAL INFORMATION", dialed numerals or the like are set, and as the "STATUS", "BUSY/IDLE" is set.

In FIG. 5, the direction of communication represents the direction of signal: "DOWN" indicates the direction of signal from the user signaling unit 11 to the user information unit 12, and "UP" indicates the direction of signal from the user information unit 12 to the user signaling unit 11. "CONNECT FOR ORIGINATIONG" signal is a signal indicative of completion of origination in response to an "ORIGINATION" signal requesting establishment of a physical link between a stream flow endpoint and a network flow endpoint. "CONNECT FOR TERMINATING" signal is a signal requesting establishment of a physical link between a network flow endpoint and a stream flow endpoint. "CONNECT FOR TERMINATING" signal is a signal requesting end of communication via a stream flow endpoint. "ORIGINATION" signal is a signal requesting connection with a distributed network. "CONNECTED" signal is a signal indicating that a stream flow endpoint has been activated. "DISCONNECT INDICATION" signal is a signal indicating that a stream flow endpoint has been deactivated. "STATUS CHANGE" signal is a signal notifying the status of a stream flow endpoint.

FIG. 6 shows the correspondence of the lines equipped in the user information unit (private branch exchange) 12 to the stream flow endpoints and the network flow endpoints. In the illustrated example, line location numbers, extension numbers, logical extension numbers, logical trunk numbers and logical trunk group numbers of the user information unit (private branch exchange) 12 are correlated with stream flow endpoint information and network flow endpoint information of the distributed network. In the column "LINE", "GROUP A" denotes a trunk group consisting of the trunks A, B and C, and "GROUP D" denotes a trunk group consisting of the trunk D only.

Referring now to FIGS. 7(A) through 7(D) and FIGS. 8(A) through 8(E), various data stored in the data section 12*ad* of the user information unit (private branch exchange) 12 will be described.

Figure 7C:
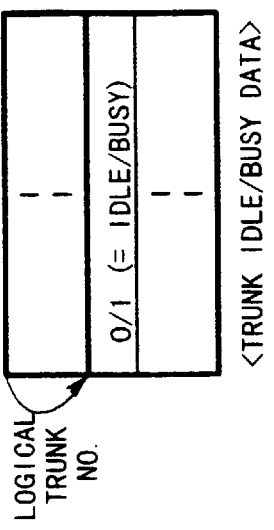
FIG. 7(C) is a diagram showing trunk idle/busy data stored in the data section of the user information unit (private branch exchange)
Figure 7B:
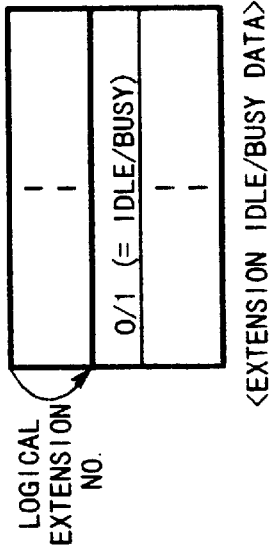
FIG. 7(B) is diagram showing extension idle/busy data stored in the data section of the user information unit (private branch exchange)
Figure 7D:
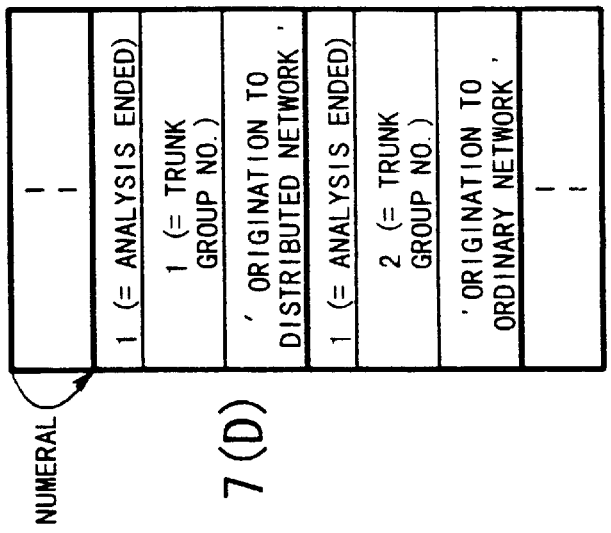
FIG. 7(D) is a diagram showing received numerals analysis data stored in the data section of the user information unit (private branch exchange)
Figure 7A:
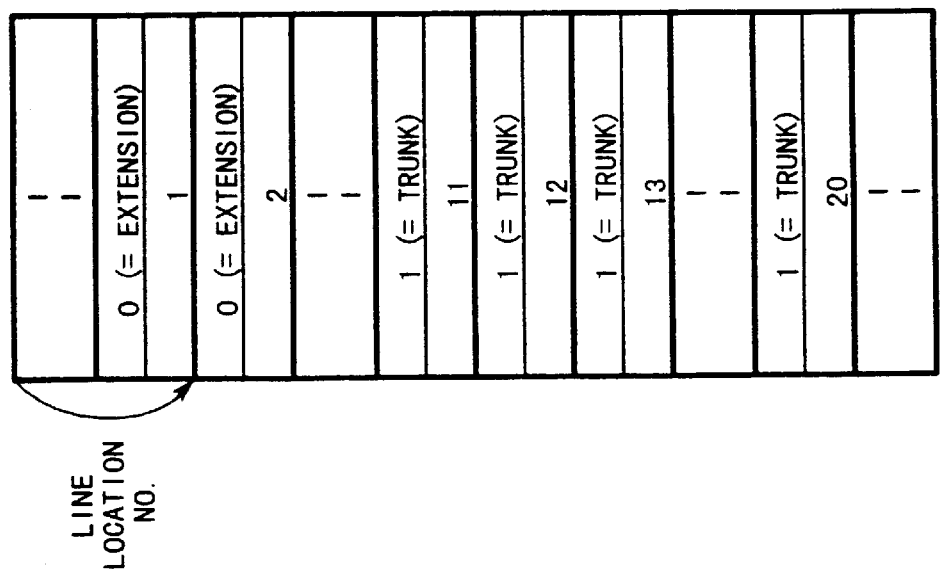
FIG. 7(A) is a diagram showing line location number-logical line number conversion data stored in a data section of the user information unit (private branch exchange)

FIG. 7(A) illustrates line location number-logical line number conversion data stored in the data section 12*ad* of the user information unit (private branch exchange) 12. With respect to each line equipped in the user information unit (private branch exchange) 12, a value indicating whether the line concerned is an extension or a trunk, and a logical extension number or a logical trunk number, which are logical line numbers, are registered.

FIG. 7(B) illustrates extension idle/busy data stored in the data section 12*ad* of the user information unit (private branch exchange) 12. With respect to each extension line equipped in the user information unit (private branch exchange) 12, extension status information is registered.

FIG. 7(C) illustrates trunk idle/busy data stored in the data section 12*ad* of the user information unit (private branch exchange) 12. With respect to each trunk of the user information unit (private branch exchange) 12, trunk status information is registered.

FIG. 7(D) illustrates received numerals analysis data stored in the data section 12*ad* of the user information unit (private branch exchange) 12. With respect to each digit of received numerals, a value indicating a link address to the next data or completion of analysis is registered. Also, information added when the analysis is completed, for example, a trunk group number, is registered. Further, a value by which an switching service type, for example, origination to distributed network origination, can be discriminated is registered. The drawing of FIG. 7(D) is simplified in order to facilitate explanation.

FIG. 8(A) illustrates trunk group number-abstract network flow endpoint conversion data stored in the data section 12*ad* of the user information unit (private branch exchange) 12. With respect to each trunk group, an abstract network flow endpoint ID is registered.

FIG. 8(B) illustrates logical extension number-stream flow endpoint conversion data stored in the data section 12*ad* of the user information unit (private branch exchange) 12. With respect to each extension, a stream flow endpoint ID ("NULL" if there is no corresponding ID) is registered.

FIG. 8(C) illustrates logical trunk number-stream flow endpoint conversion data stored in the data section 12*ad* of the user information unit (private branch exchange) 12. With respect to each trunk, a stream flow endpoint ID ("NULL" if there is no corresponding ID) is registered.

FIG. 8(D) illustrates stream flow endpoint-line location number conversion data stored in the data section 12*ad* of the user information unit (private branch exchange) 12. With respect to each stream flow endpoint, a stream flow endpoint ID and an line location number indicative of a physical line location in the user information unit (private branch exchange) 12 are registered.

FIG. 8(E) illustrates network flow endpoint-line location number conversion data stored in the data section 12*ad* of the user information unit (private branch exchange) 12. With respect to each network flow endpoint, a network flow endpoint ID and an line location number indicative of a physical line location in the user information unit (private branch exchange) 12 are registered.

Referring now to FIGS. 9(A), 9(B) and 10(A) to 10(C), various data stored in the data section 11*aa* of the user signaling unit 11 will be described.

FIG. 9(A) illustrates stream flow endpoint data stored in the data section 11*aa* of the user signaling unit 11. With respect to each stream flow endpoint, a stream flow endpoint ID, a stream flow endpoint number, a flow endpoint type indicating whether or not the stream flow endpoint concerned is an abstract stream flow endpoint, a stream flow endpoint property, and information on a network flow endpoint ID (initial value) to be connected are registered, and also a status information field for the stream flow endpoint is provided.

FIG. 9(B) illustrates network flow endpoint data stored in the data section 11*aa* of the user signaling unit 11. With respect to each network flow endpoint, a network flow endpoint ID, a flow endpoint type indicating whether or not the network flow endpoint concerned is an abstract network flow endpoint, a network flow endpoint property (band), and an available flow directionality are registered, and also a status information field for the network flow endpoint is provided.

Figure 10B:
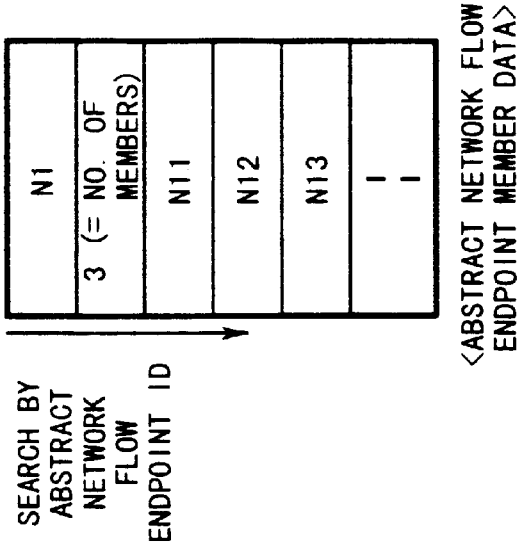
FIG. 10(B) is a diagram showing abstract network flow endpoint member data stored in the data section of the user signaling unit.
Figure 10A:
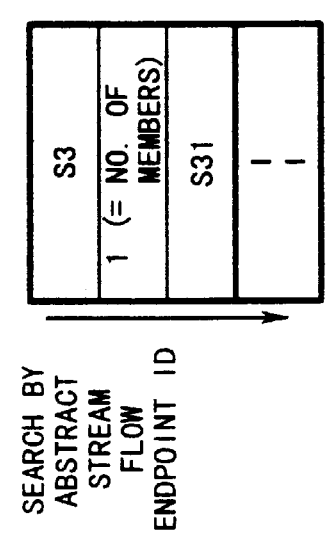
FIG. 10(A) is a diagram showing abstract stream flow endpoint member data stored in the data section of the user signaling unit.

FIG. 10(A) illustrates abstract stream flow endpoint member data stored in the data section 11*aa* of the user signaling unit 11. With respect to each abstract stream flow endpoint, a stream flow endpoint ID, the number of stream flow endpoint members included in the abstract stream flow endpoint concerned and member stream flow endpoint IDs are registered.

FIG. 10(B) illustrates abstract network flow endpoint member data stored in the data section 11*aa* of the user signaling unit 11. With respect to each abstract network flow endpoint, a network flow endpoint ID, the number of network flow endpoint members included in the abstract network flow endpoint concerned and member network flow endpoint IDs are registered.

Figure 10C:
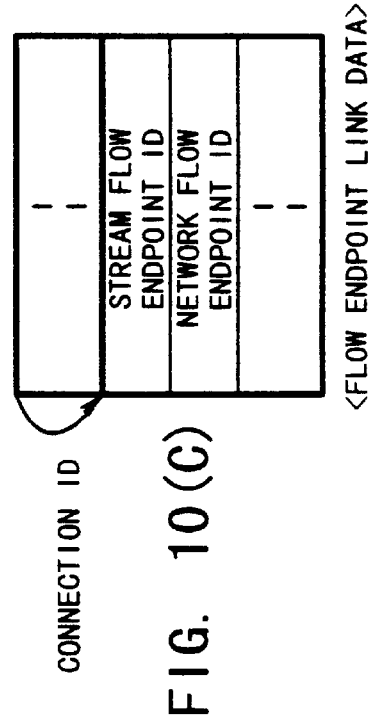
FIG. 10(C) is a diagram showing flow endpoint link data stored in the data section of the user signaling unit.

FIG. 10(C) illustrates flow endpoint link data stored in the data section 11*aa* of the user signaling unit 11. With respect to each flow connection (connection ID), a stream flow endpoint ID and a network flow endpoint ID are registered.

A process for an originating connection from an extension of the user information unit (private branch exchange) 12 to the distributed network will be now described.

Figure 11:
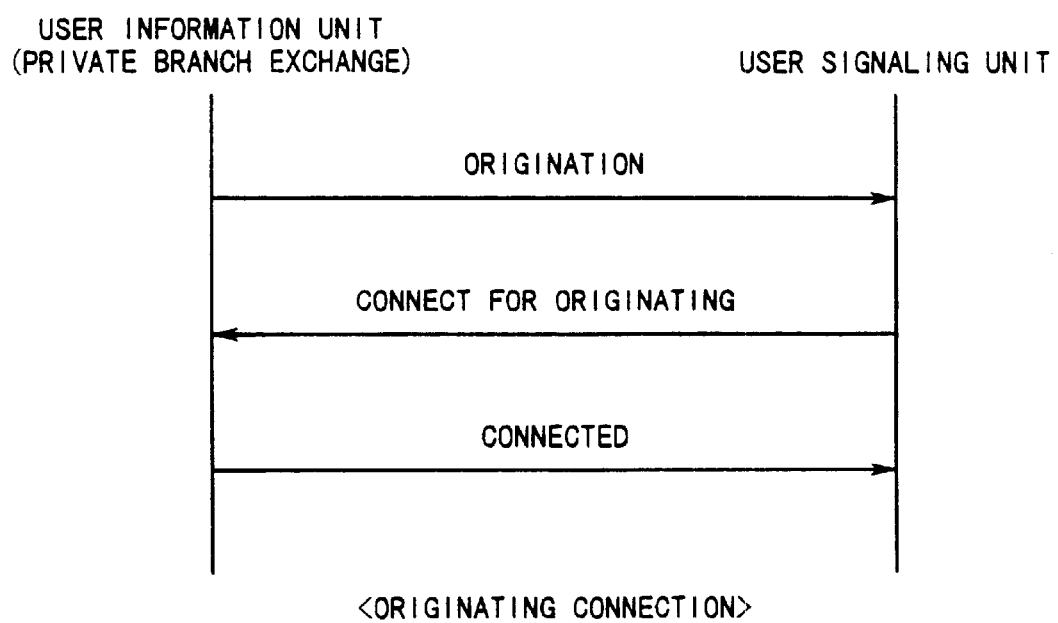
FIG. 11 is a diagram showing a sequence of flow endpoint control signals exchanged between the user information unit (private branch exchange) and the user signaling unit.

FIG. 11 shows a sequence of flow endpoint control signals exchanged between the user information unit (private branch exchange) 12 and the user signaling unit 11, wherein the terms "ORIGINATION", "CONNECT FOR ORIGINATING" and "CONNECTED" correspond to the respective signal names appearing in FIG. 5.

Figure 12:
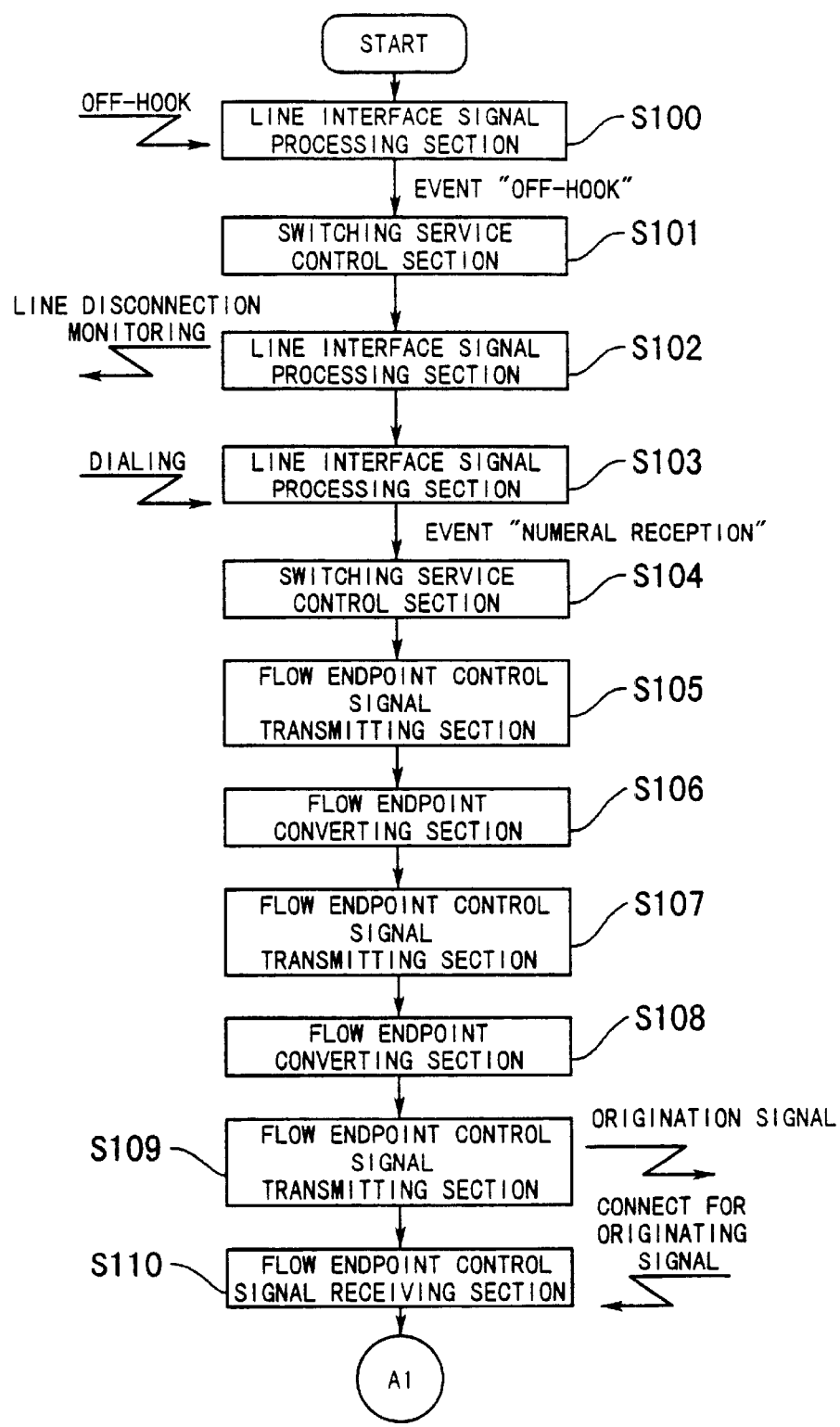
FIG. 12 is a flowchart showing the first half of an entire process executed by the user information unit (private branch exchange)
Figure 13:
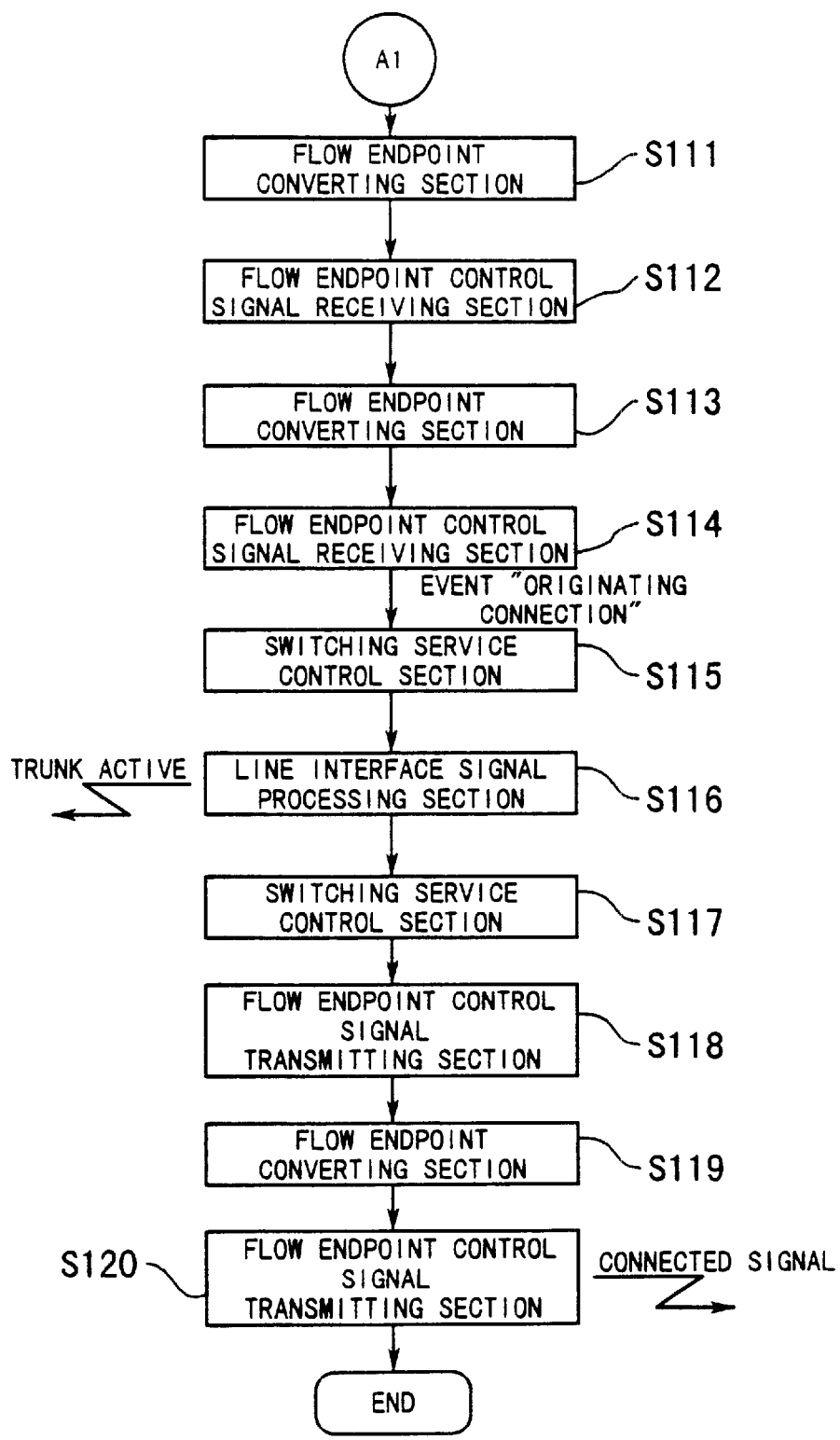
FIG. 13 is a flowchart showing the latter half of the entire process executed by the user information unit (private branch exchange)

FIGS. 12 and 13 illustrate the first and second halves, respectively, of an entire process executed by the user information unit (private branch exchange) 12. In FIGS. 12 and 13, individual processes are represented by the names of the sections for executing the respective processes.

Figure 14:
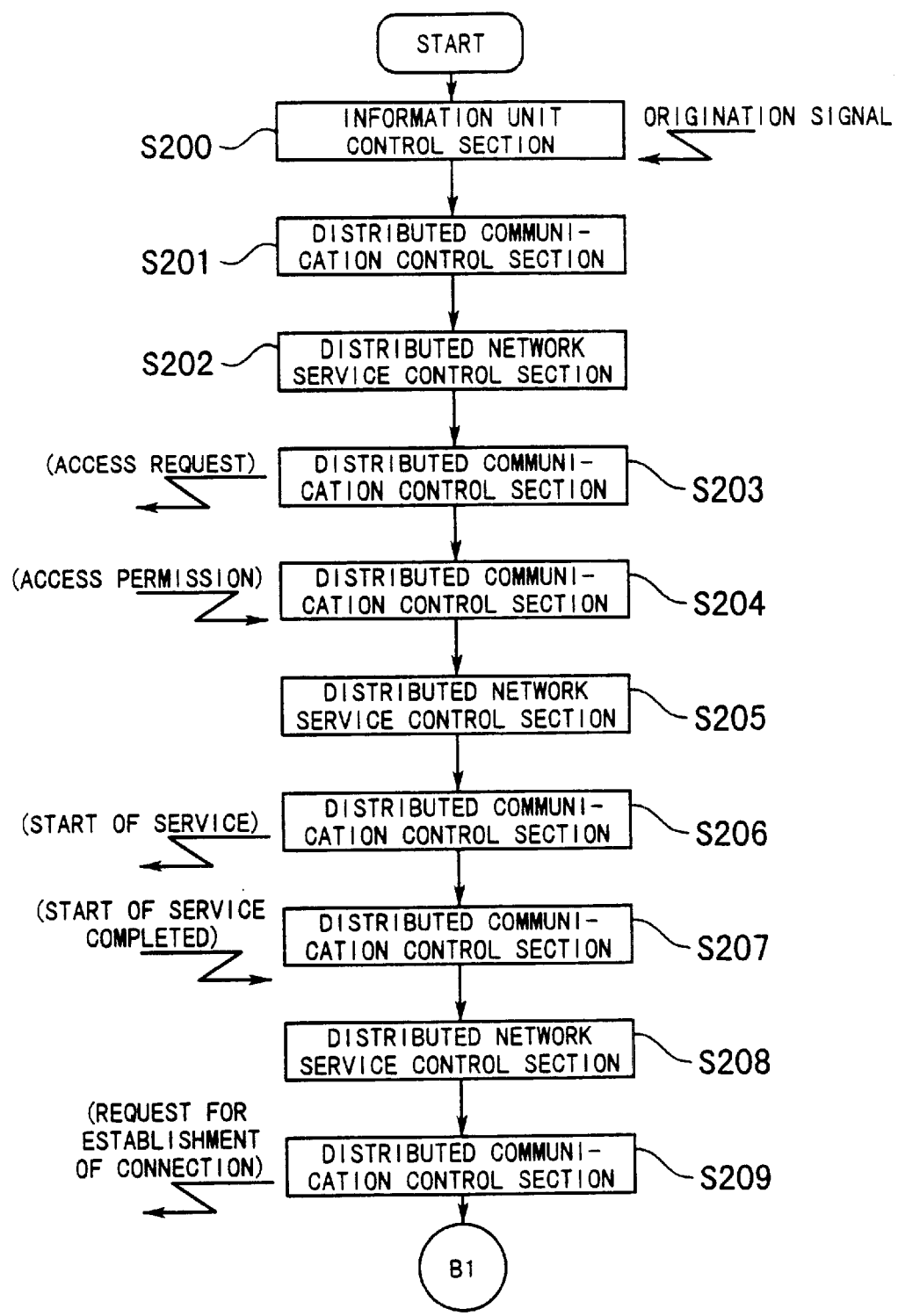
FIG. 14 is a flowchart showing the first half of an entire process executed by the user signaling unit.
Figure 15:
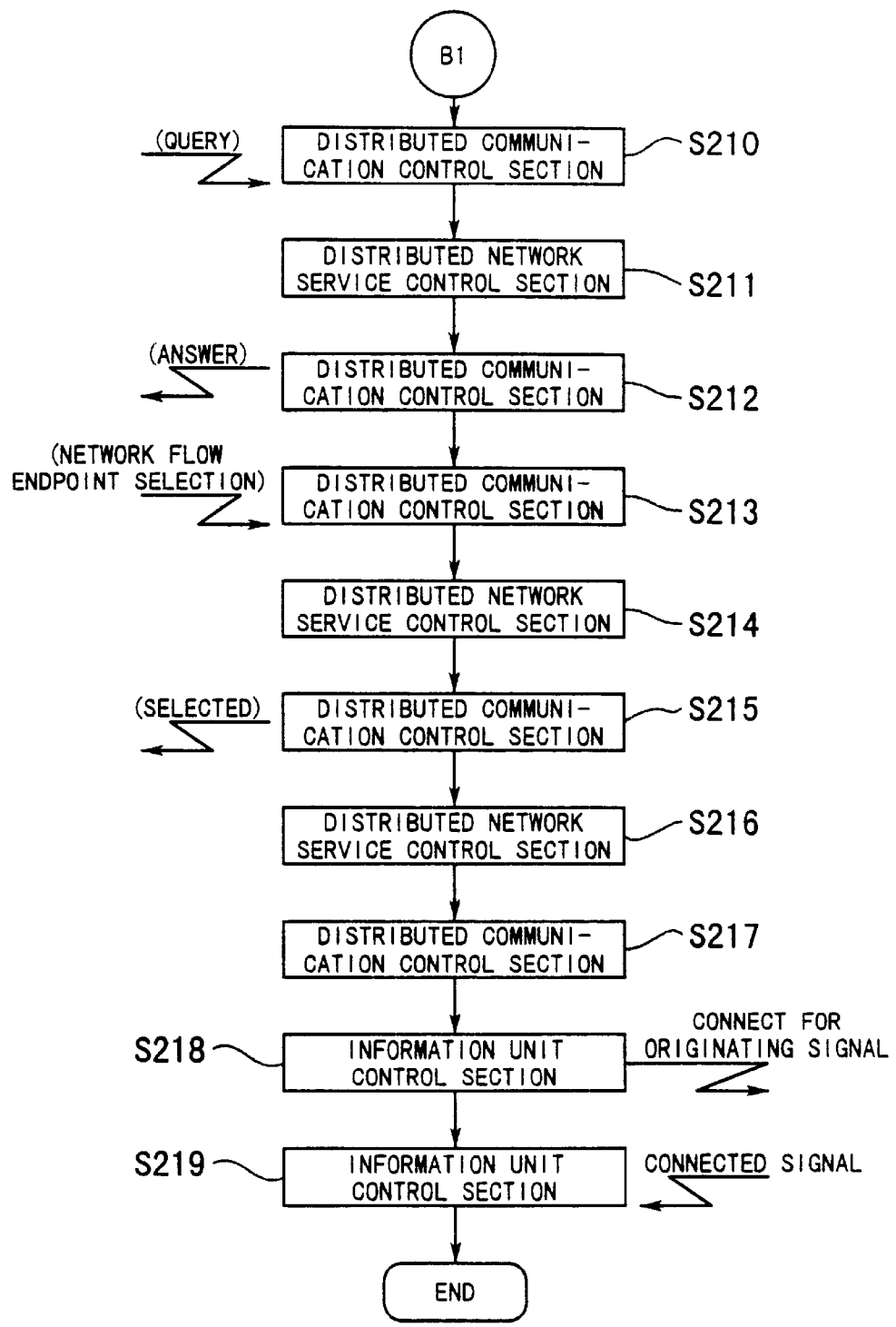
FIG. 15 is a flowchart showing the latter half of the entire process executed by the user signaling unit.

FIGS. 14 and 15 illustrate the first and second halves, respectively, of an entire process executed by the user signaling unit 11. Also in FIGS. 14 and 15, individual processes are represented by the names of the sections for executing the respective processes.

Figure 16:
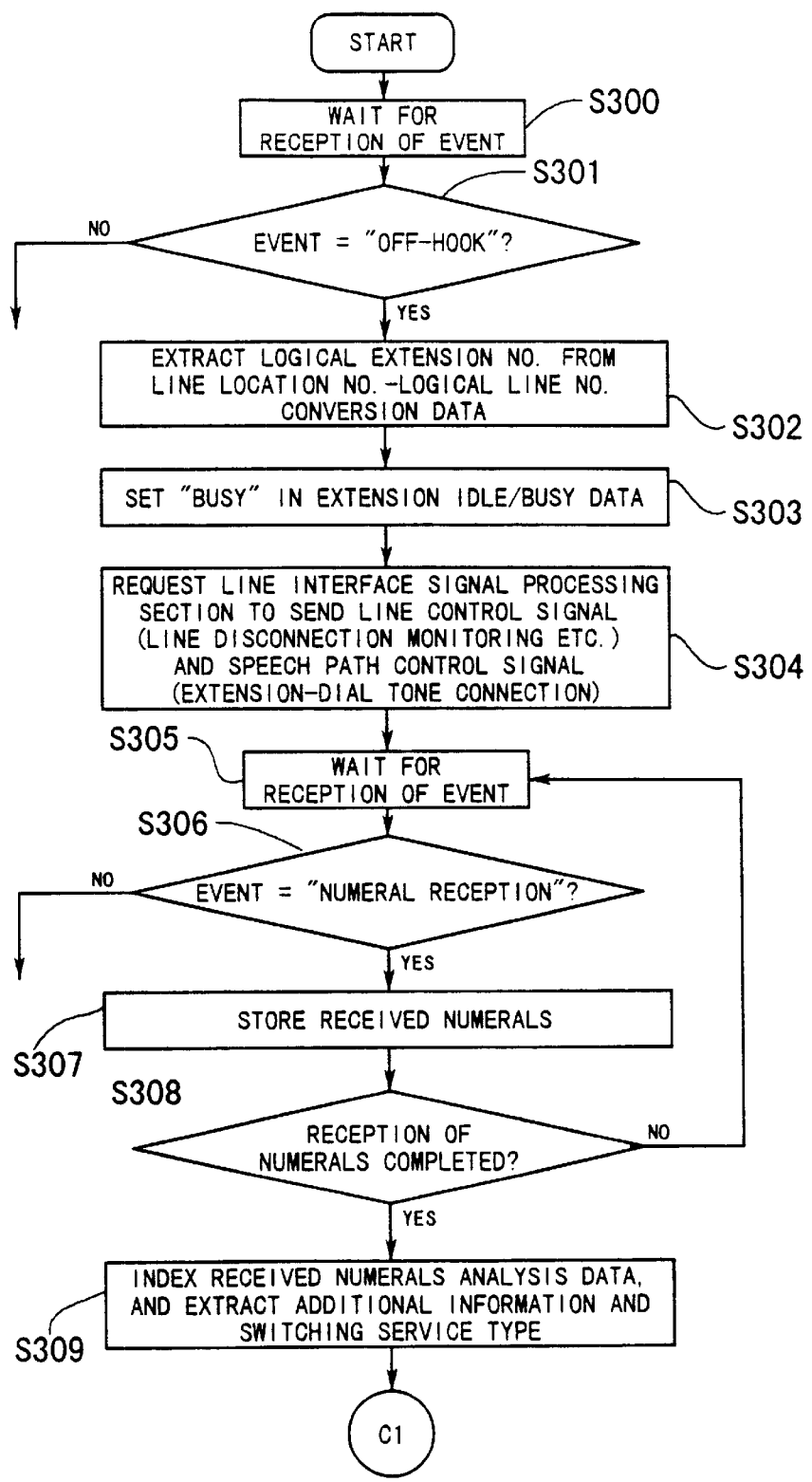
FIG. 16 is a flowchart showing the first half of a process executed by a switching service control section.
Figure 17:
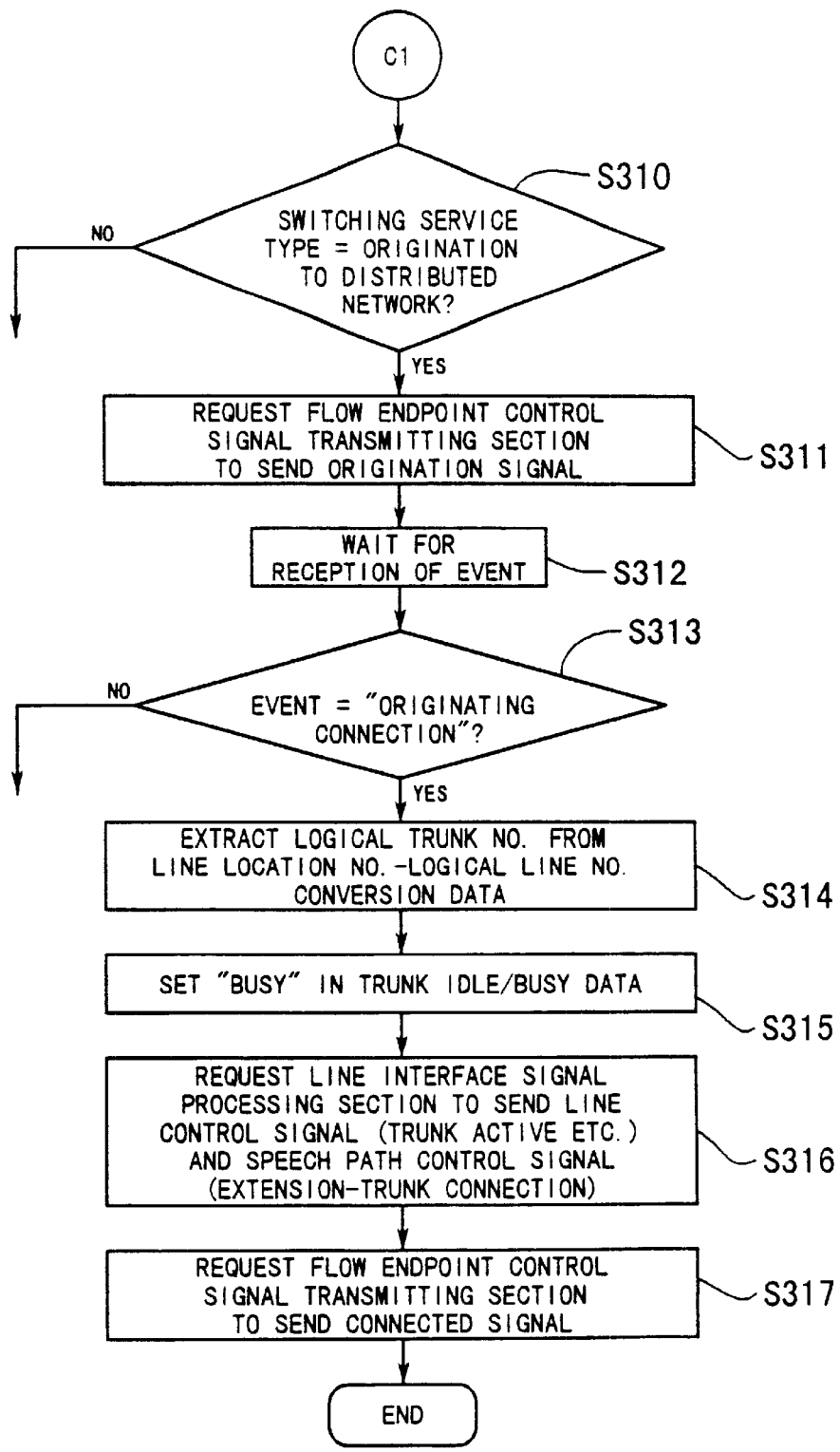
FIG. 17 is a flowchart showing the latter half of the process executed by the switching service control section.
Figure 18:
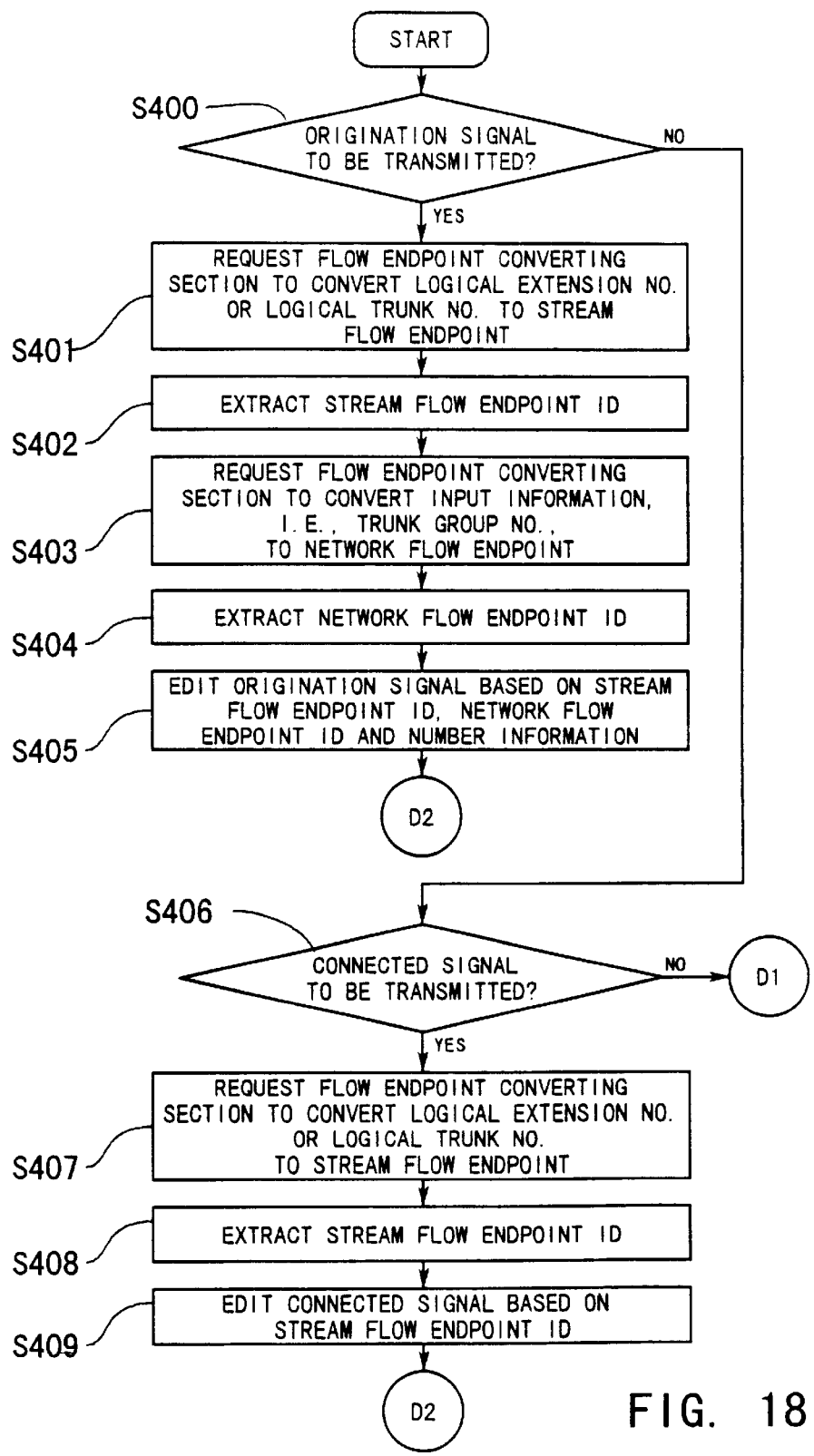
FIG. 18 is a flowchart showing the first half of a process executed by a flow endpoint control signal transmitting section.
Figure 19:
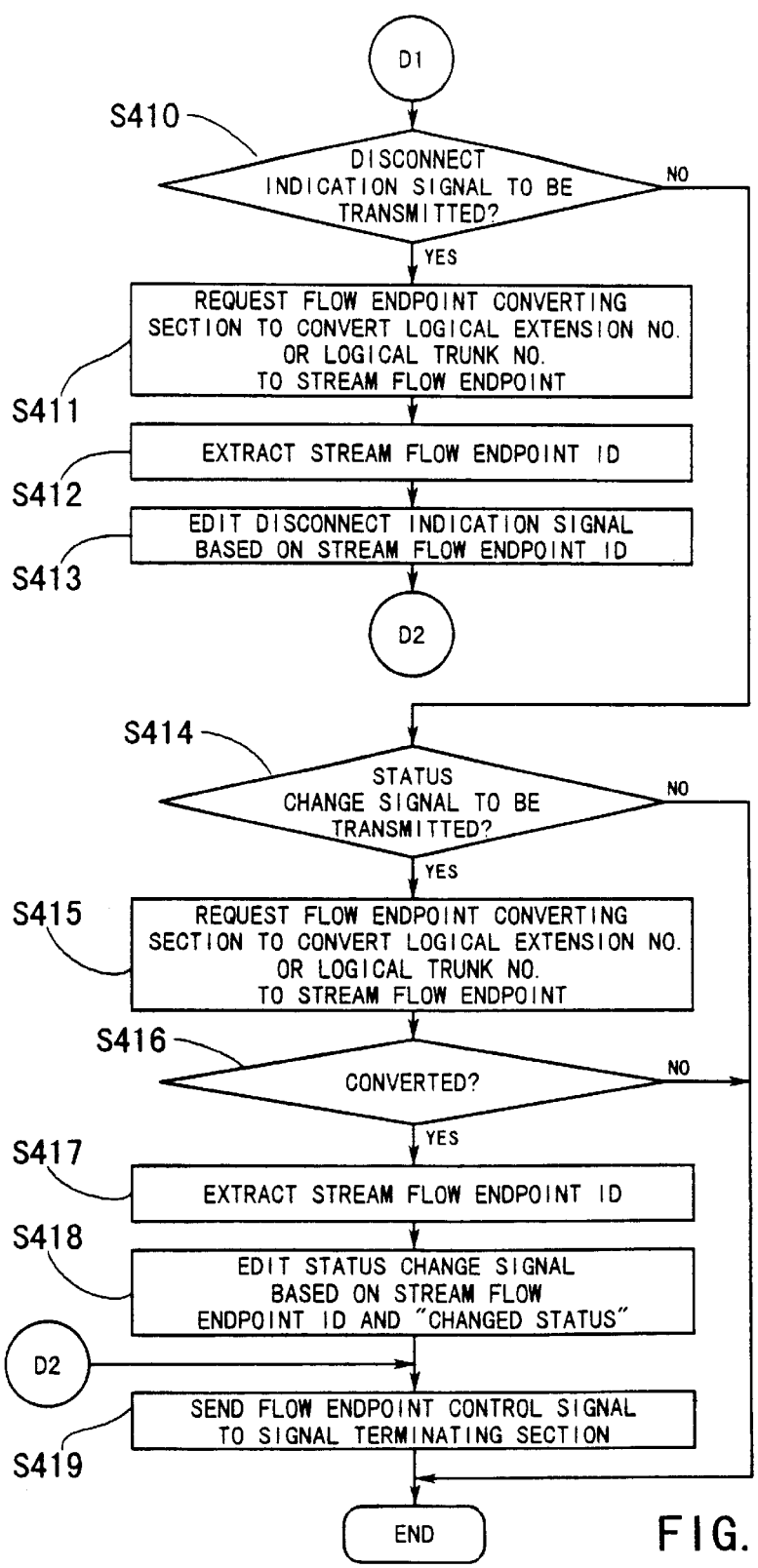
FIG. 19 is a flowchart showing the latter half of the process executed by the flow endpoint control signal transmitting section.
Figure 20:
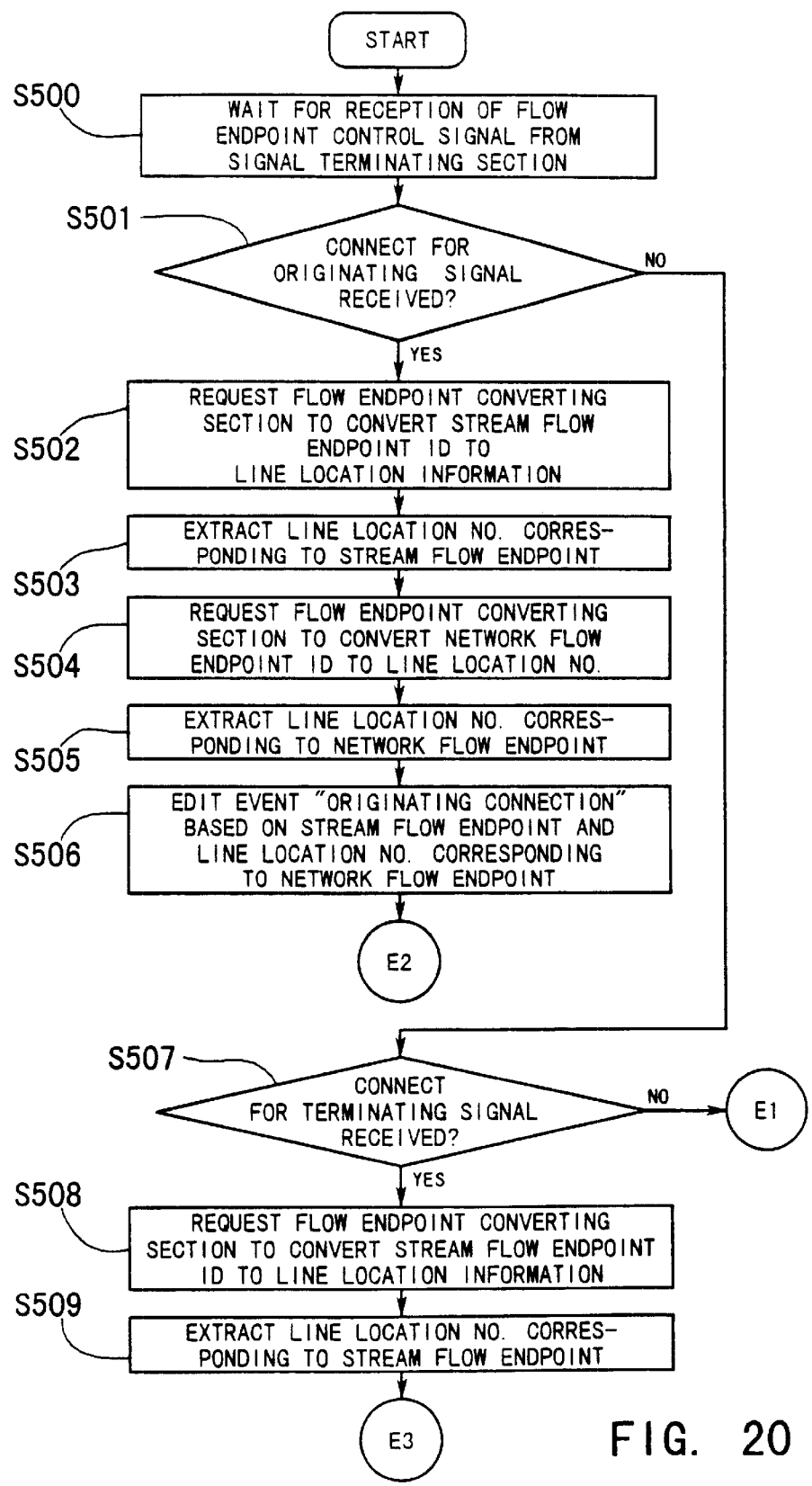
FIG. 20 is a flowchart showing the first half of a process executed by a flow endpoint control signal receiving section.
Figure 21:
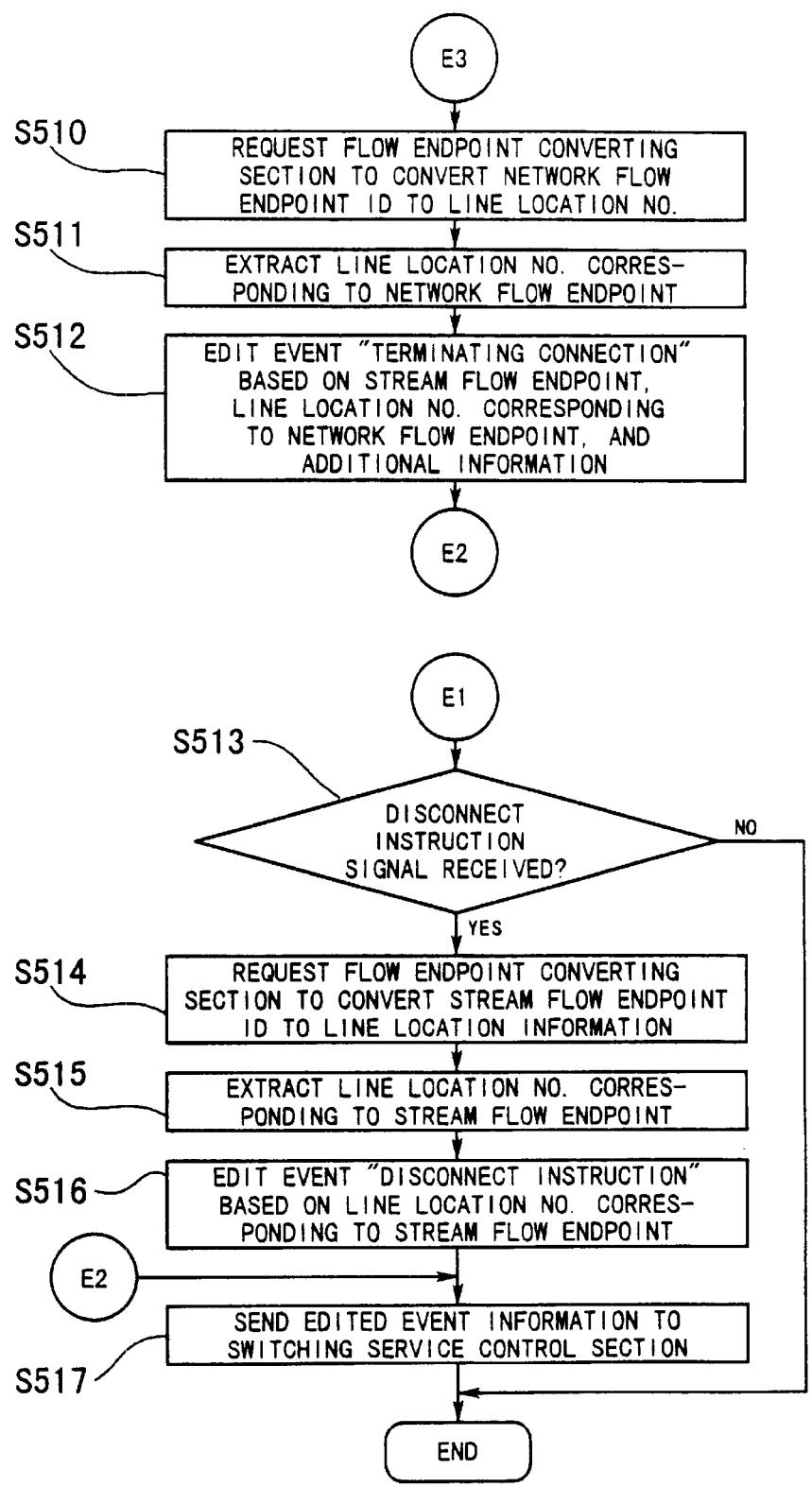
FIG. 21 is a flowchart showing the latter half of the process executed by the flow endpoint contorl signal receiving section.
Figure 22:
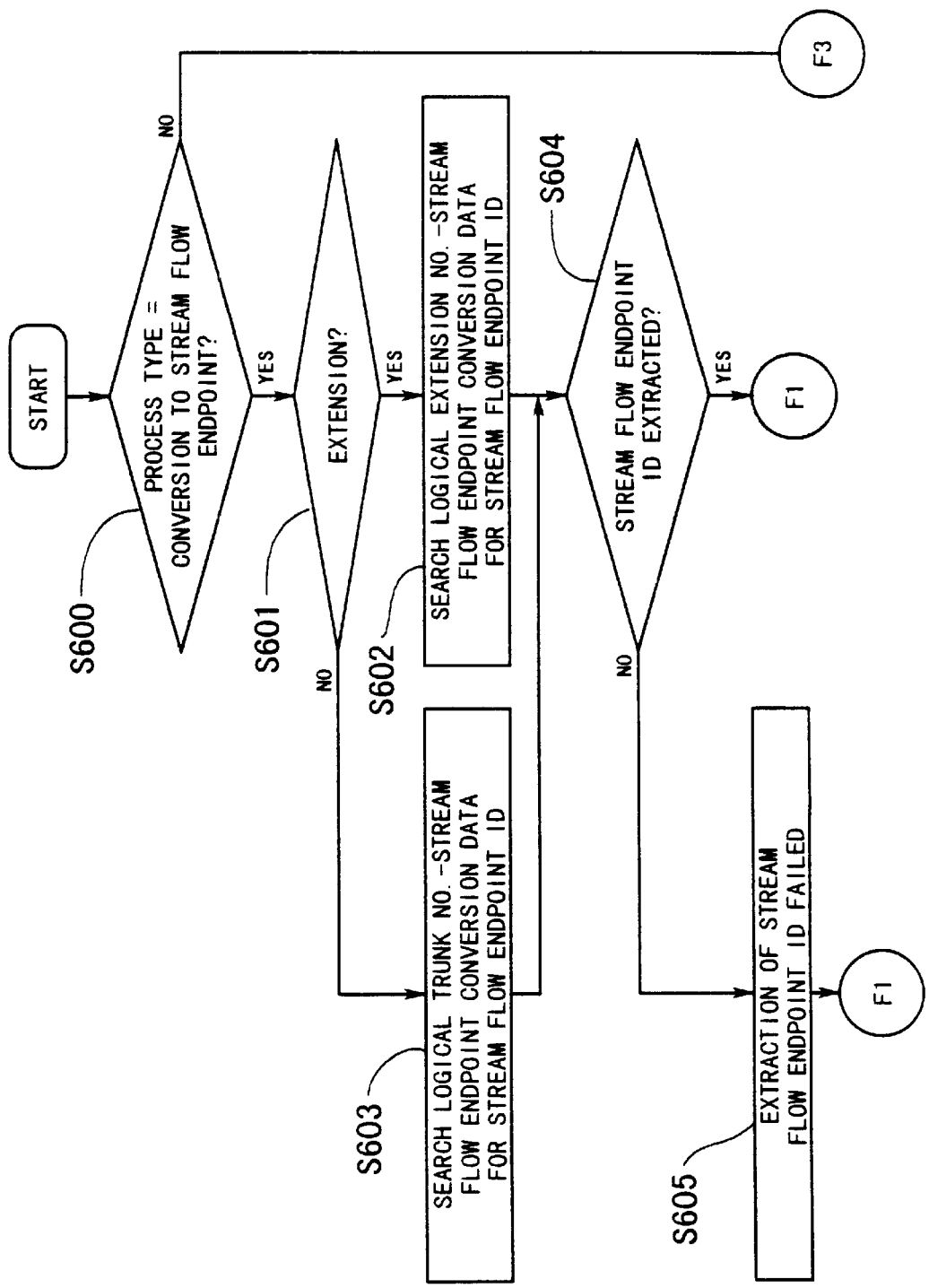
FIG. 22 is a flowchart showing the first half of a process executed by a flow endpoint converting section.
Figure 23:
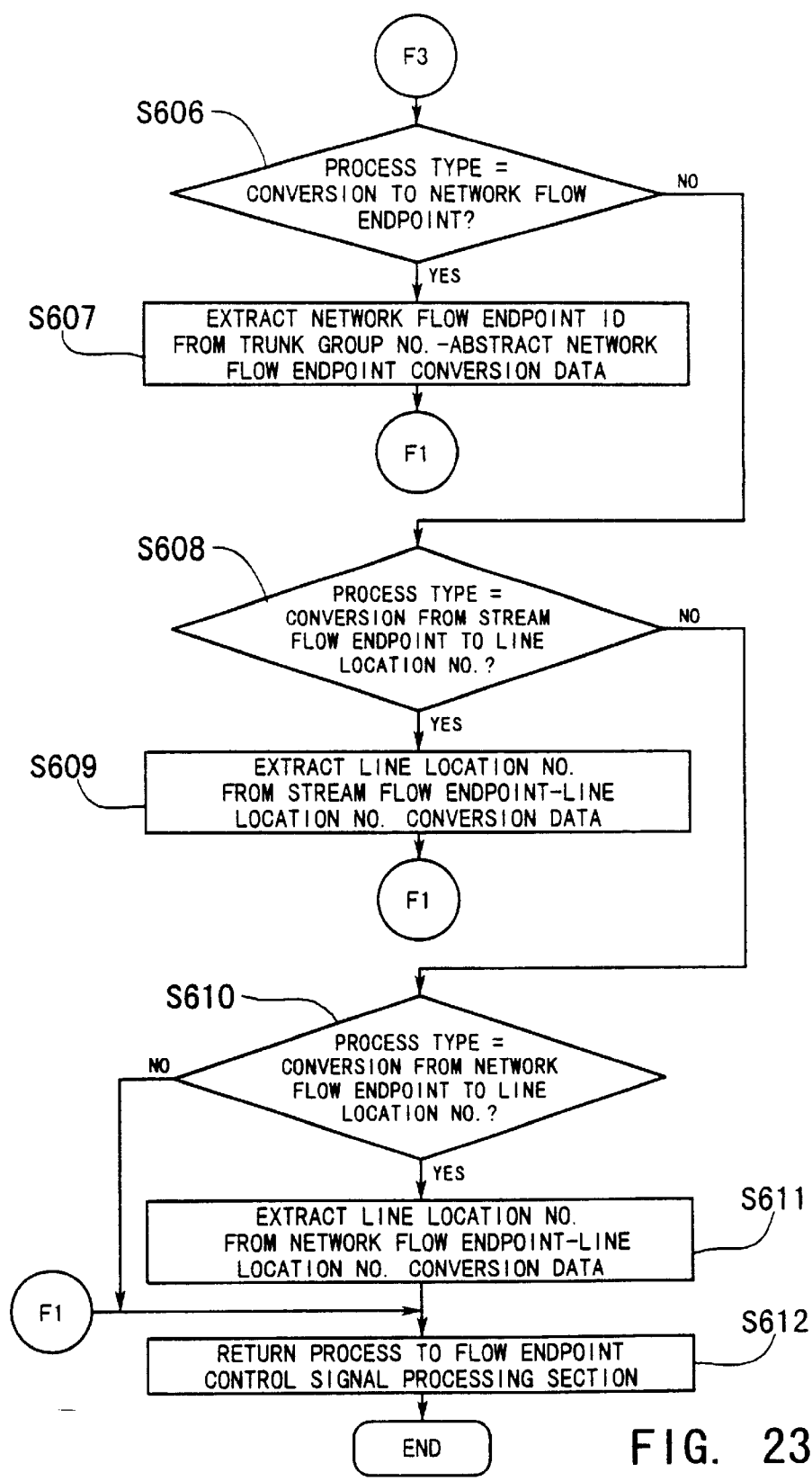
FIG. 23 is a flowchart showing the latter half of the process executed by the flow endpoint converting section.
Figure 24:
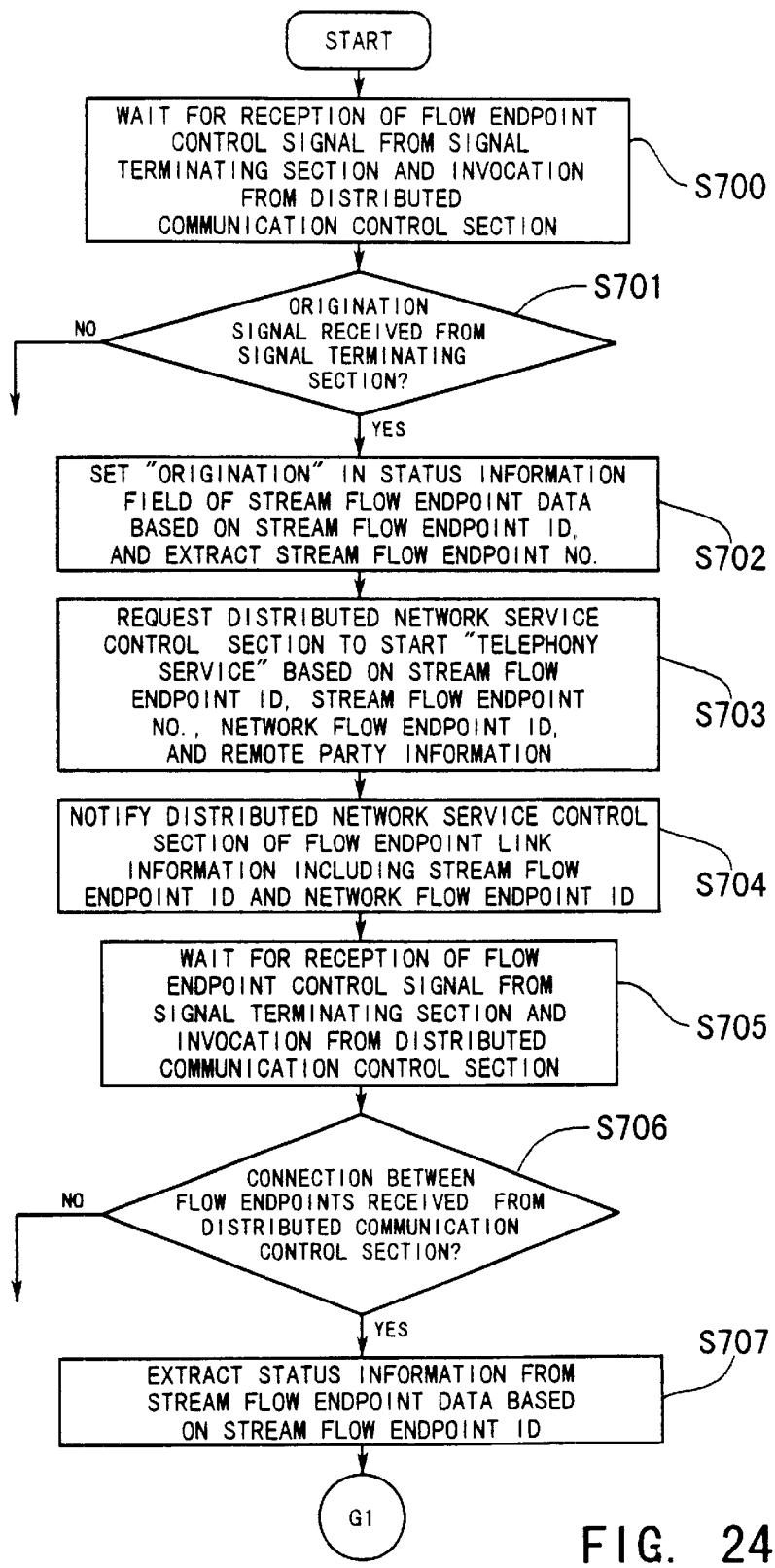
FIG. 24 is a flowchart showing the first half of a process executed by an information unit control section.
Figure 25:
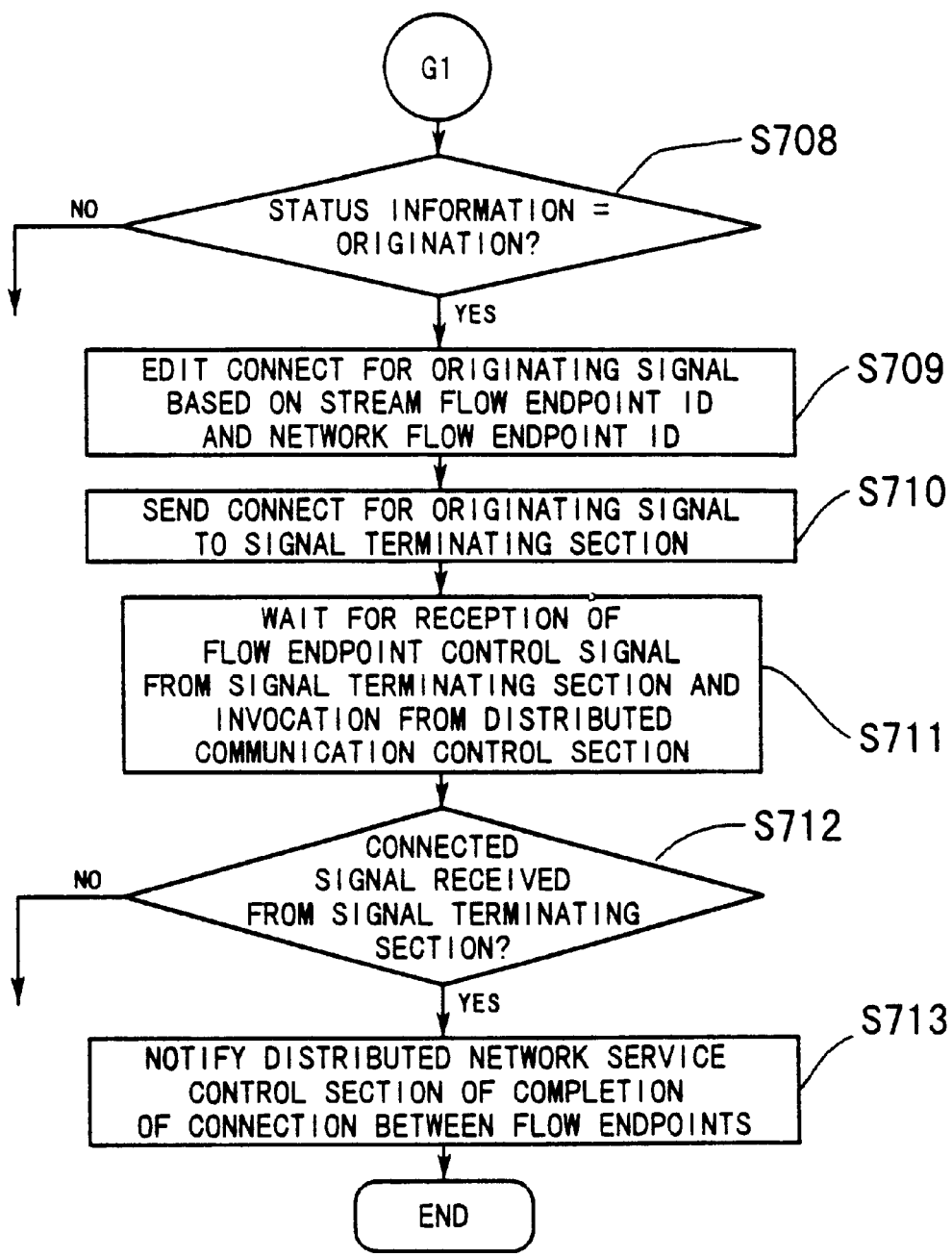
FIG. 25 is a flowchart showing the latter half of the process executed by the information unit control section.

FIGS. 16 and 17 illustrate the first and second halves, respectively, of a process executed by the switching service control section 12*aba*. FIGS. 18 and 19 illustrate the first and second halves, respectively, of a process executed by the flow endpoint control signal transmitting section 12*aab*. FIGS. 20 and 21 illustrate the first and second halves, respectively, of a process executed by the flow endpoint control signal receiving section 12*aaa*. FIGS. 22 and 23 illustrate the first and second halves, respectively, of a process executed by the flow endpoint converting section 12*ac*. FIGS. 24 and 25 illustrate the first and second halves, respectively, of a process executed by the information unit control section 11*ac*. In the following, it is assumed that the user system 10 is assigned the user system number "777" in the distributed network.

Referring to the step numbers (S) appearing in FIGS. 12 through 25, the process for an originating connection from an extension of the user information unit (private branch switching) 12 to the distributed network will be described.

Control of User Information Unit (Private Branch Switching) 12

<<Step S100 of FIG. 12>> When the state of the extension (A) 14 shown in FIG. 2, for example, changes to an off-hook state, an "OFF-HOOK" signal is transmitted via the line interface 12*d* to the line interface signal processing section 12*abb* shown in FIG. 4. The line interface signal processing section 12*abb* transfers information "EVENT= 'OFF-HOOK', LINE LOCATION NO. '1001'" to the switching service control section 12*aba*.

<<Step S101 of FIG. 12>> In this step, the process flow shown in FIG. 16 is executed.

On receiving "EVENT='OFF-HOOK'" (Step S301), the switching service control section 12*aba* extracts the logical extension number "1" from the line location number-logical line number conversion data [cf. FIG. 7(A)] (Step S302). The switching service control section 12*aba* then sets "BUSY" in the extension idle/busy data [cf. FIG. 7(B)]

(Step S303), and requests line interface control "LINE DISCONNECTION MONITORING", speech path setting (dial-tone connection), etc. to the line interface signal processing section 12abb (Step S304).

<<Step S102 of FIG. 12>> On receiving the instructions from the switching service control section 12aba, the line interface signal processing section 12abb subjects the instructions to format conversion and then sends a request to the line interface 12d. Also, the line interface signal processing section 12abb controls the speech path 12c in accordance with the equipment location number information.

<<Step S103 of FIG. 12>> If a connecting number "1", which indicates origination to the distributed network, and a remote party number "3334000", for example, are dialed at the extension (A) 14, the line interface signal processing section 12abb transfers event "NUMERAL RECEPTION" to the switching service control section 12aba each time it receives a line signal.

<<Step S104 of FIG. 12>> In this step, the process flow shown in FIGS. 16 and 17 is executed.

The switching service control section 12aba stores the received numerals (Steps S306–S307). When reception of the numerals is completed (Step S308), the switching service control section 12aba indexes the received numerals analysis data [cf. FIG. 7(D)], confirms by the first numeral that origination connection to the distributed network has been requested, and at the same time extracts the trunk group number "1" (Steps S309–S310). Then, an origination signal transmission request "'ORIGINATION', LOGICAL EXTENSION NO.='1', TRUNK GROUP NO.='1', '3334000'" is made with respect to the flow endpoint control signal transmitting section 12aab (Step S311).

<<Step S105 of FIG. 12>> In this step, the process flow shown in FIG. 18 is executed.

On receiving the origination signal transmission request (Step S400), the flow endpoint control signal transmitting section 12aab requests the flow endpoint converting section 12ac to convert the logical extension number "1" to a stream flow endpoint (Step S401).

<<Step S106 of FIG. 12>> In this step, the process flow shown in FIGS. 22 and 23 is executed.

The flow endpoint converting section 12ac determines whether or not conversion to a stream flow endpoint has been requested (Step S600). If conversion to a stream flow endpoint has been requested, it is determined whether or not the number to be converted is an extension number (Step S601). If the number to be converted is an extension number, the logical extension number-stream flow endpoint conversion data [FIG. 8(B)] is searched for a corresponding stream flow endpoint ID (Step S602). If the stream flow endpoint ID "S1" can be extracted (Step S604), the process is returned to the flow endpoint control signal transmitting section 12aab (Step S612).

<<Step S107 of FIG. 12>> In this step, the process flow shown in FIG. 18 is executed.

The flow endpoint control signal transmitting section 12aab extracts the stream flow endpoint ID "S1" (Step S402), and then requests the flow endpoint converting section 12ac to convert the trunk group number "1" to a network flow endpoint (Step S403).

<<Step S108 of FIG. 12>> In this step, the process flow shown in FIG. 23 is executed.

The flow endpoint converting section 12ac determines whether or not conversion to a network flow endpoint has been requested (Step S606). If conversion to a network flow endpoint has been requested, the network flow endpoint ID "N1 " is extracted from the trunk group number-abstract network flow endpoint conversion data [cf. FIG. 8(A)] (Step S607), and the process is returned to the flow endpoint control signal transmitting section 12aab (Step S612).

<<Step S109 of FIG. 12>> In this step, the process flow shown in FIGS. 18 and 19 is executed.

The flow endpoint control signal transmitting section 12aab extracts the network flow endpoint ID "N1" (Step S404), performs format conversion "'ORIGINATION', 'S1', 'N1', '3334000'" (Step S405), and sends an origination signal to the user signaling unit 11 via the signal terminating section 12f (Step S419).

Control of User Signaling Unit 11

<<Steps S200–S201 of FIG. 14>> In these steps, the process flow shown in FIG. 24 is executed.

On receiving the flow endpoint control signal "'ORIGINATION', 'S1', 'N1', '3334000'" from the user information unit (private branch exchange) 12 via the signal terminating section 11c (Step S701), the information unit control section 11ac sets "ORIGINATION" as the status of the stream flow endpoint in the stream flow endpoint data [cf. FIG. 9(A)] and extracts the stream flow endpoint number "300" (Step S702). Then, based on the stream flow endpoint information, the network flow endpoint information and the remote party information, the information unit control section 11ac makes a request for start of telephony service "'TELEPHONY SERVICE', 'S1', '300', 'N1', '3334000'" to the distributed network service control section 11ab via the distributed communication control section 11ad (Step S703), and also notifies the same of flow endpoint link information "'S1', 'N1'" (Step S704).

<<Steps S203-S206 of FIG. 14>> On receiving the request from the information unit control section 11ac, the distributed network service control section 11ab makes an access request to the network signaling unit 20, . . . , 30 via the distributed communication control section 11ad and receives access permission from the network signaling unit 20, . . . , 30 via the distributed communication control section 11ad. Then, following a similar procedure, the distributed network service control section 11ab makes a request for start of service "'TELEPHONY SERVICE', '777300', '3334000'" to the network signaling unit 20, . . . , 30, and also sets the flow endpoint link information "S1", "N1" in the flow endpoint link data [cf. FIG. 10(C)].

<<Steps S207-S209 of FIG. 14>> On receiving completion of start of service from the network signaling unit 20, . . . , 30, the distributed network service control section 11ab transmits a connection establishment request "'S1', 'N1', '777300', '3334000'" to the network signaling unit 20, . . . , 30.

<<Steps S210–S212 of FIG. 15>> In response to a query from the network signaling unit 20, . . . , 30 about an ID for identification of the connection "'S1', 'N1'" or Qos information on the network flow endpoint "N1", the distributed network service control section 11ab extracts the connection ID from the flow endpoint link data [cf. FIG. 10(C)] as well as the property (band) of the network flow endpoint from the network flow endpoint data [cf. FIG. 9(B)], and transmits a response "'S1', 'N1', CONNECTION ID='1', '64 kbps'" to the network signaling unit 20, . . . , 30.

<<Steps S213–S217 of FIG. 15>> On receiving the network flow endpoint selection "'N1', CONNECTION ID='1'" (or network flow endpoint selection "'N11', CON- NECTION ID='1'") from the network signaling unit 20, . . . , 30, the distributed network service control section 11*ab* determines based on the network flow endpoint data [cf. FIG. 9(B)] whether or not the network flow endpoint "N1" is an abstract flow endpoint. If the network flow endpoint is an abstract network flow endpoint, a corresponding member is extracted from the abstract network flow endpoint member data [cf. FIG. 10(B)]. Then, based on the network flow endpoint data [cf. FIG. 9(B)], the network flow endpoint "N11" is selected and "BUSY" is set as the status. The distributed network service control section 11*ab* notifies the network signaling unit 20, . . . , 30 of the selected network flow endpoint information "N11". Also, in the flow endpoint link data [cf. FIG. 10(C)], the network flow endpoint information associated with the connection ID="1" is set to "N11", and a request for connection between flow endpoints "'S1', 'N11'" is made with respect to the information unit control section 11*ac*.

<<Step S218 of FIG. 15>> In this step, the process flow shown in FIGS. 24 and 25 is executed.

On receiving the connection between flow endpoints "'S1', 'N11'" from the distributed network service control section 11*ab* (Step S706), the information unit control section 11*ac* extracts the status information on the stream flow endpoint "S1" from the stream flow endpoint data [cf. FIG. 9(A)] (Step S707). Since the status has been set to "ORIGINATION" (Step S708), the originating connection signal "'CONNECT FOR ORIGINATING', 'S1', 'N11'" is edited (Step S709) and sent to the user information unit (private branch exchange) 12 via the signal terminating section 11*c* (Step S710).

Control of User Information Unit (Private Branch Exchange) 12

<<Step S110 of FIG. 12>> In this step, the process flow shown in FIG. 20 is executed.

On receiving the originating connection signal "'CONNECT FOR ORIGINATING', 'S1', 'N11'from the user signaling unit 11 via the signal terminating section 12*f* (Step S501), the flow endpoint control signal receiving section 12*aaa* requests the flow endpoint converting section 12*ac* to convert the stream flow endpoint ID "S1" to an equipment location number (Step S502).

<<Step S111 of FIG. 13>> In this step, the process flow shown in FIG. 23 is executed.

The flow endpoint converting section 12*ac* determines whether or not conversion from a stream flow endpoint to an line location number has been requested (Step S608). If the requested conversion is from a stream flow endpoint to an line location number, the flow endpoint converting section 12*ac* extracts the line location number "1001" of the extension (A) 14 from the stream flow endpoint-line location number conversion data [cf. FIG. 8(D)] (Step S609), and returns the process to the flow endpoint control signal receiving section 12*aaa* (Step S612).

<<Step S112 of FIG. 13>> In this step, the process flow shown in FIG. 20 is executed.

The flow endpoint control signal receiving section 12*aaa* extracts the line location number "1001" corresponding to the stream flow endpoint "S1" (Step S503), and then requests the flow endpoint converting section 12*ac* to convert the network flow endpoint ID "N11" to an line location number (Step S504).

<<Step S113 of FIG. 13>> In this step, the process flow shown in FIG. 23 is executed.

The flow endpoint converting section 12*ac* determines whether or not the requested conversion is from a network flow endpoint to an line location number (Step S610). If conversion from a network flow endpoint to an line location number has been requested, the flow endpoint converting section 12*ac* extracts the line location number "2001" of the trunk (A) 17 from the network flow endpoint-line location number conversion data [cf. FIG. 8(E)] (Step S611), and returns the process to the flow endpoint control signal receiving section 12*aaa* (Step S612).

<<Step S114 of FIG. 13>> In this step, the process flow shown in FIGS. 20 and 21 is executed.

The flow endpoint control signal receiving section 12*aaa* extracts the line location number "2001" corresponding to the network flow endpoint "N11" (Step S505), converts the originating connection signal to an internal event "EVENT 'ORIGINATING CONNECTION', LINE LOCATION NO.='2001', LINE LOCATION NO.='1001'" of the user information unit (private branch exchange) 12 (Step S506), and transfers the event to the exchange service control section 12*aba* (Step S517).

<<Step S115 of FIG. 13>> In this step, the process flow shown in FIG. 17 is executed.

On receiving "EVENT 'ORIGINATING CONNECTION'" (Step S313), the switching service control section 12*aba* extracts the logical trunk number "11" corresponding to the line location number "2001" of the trunk (A) 17 from the line location number-logical line number conversion data [cf. FIG. 7(A)] (Step S314). The switching service control section 12*aba* then sets "BUSY" in the trunk idle/busy data [cf. FIG. 7(C)] (Step S315), and makes a request for line interface control "TRUNK ACTIVE REQUEST", speech channel setting (trunk A "2001"-extension A "1001" connection), etc. to the line interface signal processing section 12*abb* (Step S316).

<<Step S116 of FIG. 13>> On receiving the instructions from the switching service control section 12*aba*, the line interface signal processing section 12*abb* subjects the instructions to format conversion and then sends a request to the line interface 12*d*. Also, the line interface signal processing section 12*abb* controls the speech channel 12*c* in accordance with the line location number information.

<<Step S117 of FIG. 13>> In this step, the process flow shown in FIG. 17 is executed.

The switching service control section 12*aba* makes a connected signal transmission request "'CONNECTED', LOGICAL EXTENSION NO.='1'" to the flow endpoint control signal transmitting section 12a*ab* (Step S317).

<<Step S118 of FIG. 13>> In this step, the process flow shown in FIG. 18 is executed.

When supplied with the connected signal transmission request (Step S406), the flow endpoint control signal transmitting section 12*aab* requests the flow endpoint converting section 12*ac* to convert the logical extension number "1" to a stream flow endpoint (Step S407).

<<Step S119 of FIG. 13>> In this step, the process flow shown in FIGS. 22 and 23 is executed.

The flow endpoint converting section 12*ac* determines whether or not conversion to a stream flow endpoint has been requested (Step S600). If conversion to a stream flow endpoint has been requested, a determination is made as to whether or not the number to be converted is an extension number (Step S601). If the number to be converted is an extension number, the logical extension number-stream flow endpoint conversion data [cf. FIG. 8(B)] is searched for a corresponding stream flow endpoint ID (Step S602). If the stream flow endpoint "S1" can be extracted (Step S604), the process is returned to the flow endpoint control signal transmitting section 12*aab* (Step S612).

<<Step S120 of FIG. 13>> In this step, the process flow shown in FIGS. 18 and 19 is executed.

The flow endpoint control signal transmitting section 12*aab* extracts the stream flow endpoint ID "S1" (Step S408), and performs format conversion "'CONNECTED', 'S1'" (Step S409). Then, the flow endpoint control signal transmitting section 12*aab* transmits a connected signal to the user signaling unit 11 via the signal terminating section 12*f* (Step S419).

Control of User Signaling Unit 11

<<Step S219 of FIG. 15>> In this step, the process flow shown in FIG. 25 is executed.

The information unit control section 11*ac* receives the flow endpoint control signal "'CONNECTED', 'S1'" from the user information unit (private branch exchange) 12 via the signal terminating section 11*c* (Step S712), and notifies the distributed network service control section 11*ab* that the connection between flow endpoints has been completed (Step S713).

A process for a terminating connection from the distributed network to the user information unit (private branch exchange) 12 will be now described.

Figure 26:
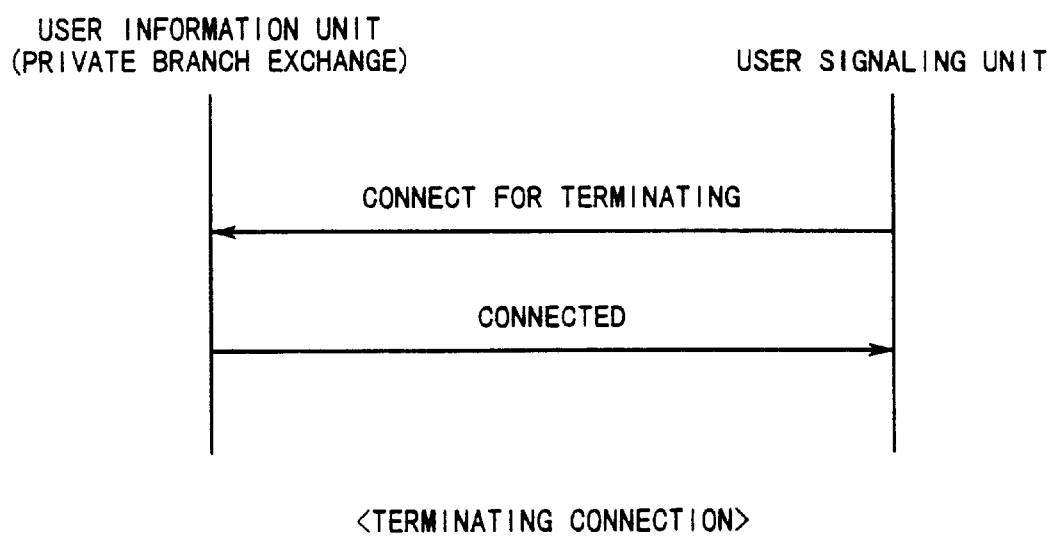
FIG. 26 is a diagram showing a sequence of flow endpoint control signals exchanged between the user information unit (private branch exchange) and the user signaling unit.

FIG. 26 shows a sequence of flow endpoint control signals exchanged between the user information unit (private branch exchange) 12 and the user signaling unit 11, wherein "CONNECT FOR TERMINATING" and "CONNECTED" correspond to the respective signal names shown in FIG. 5.

Figure 27:
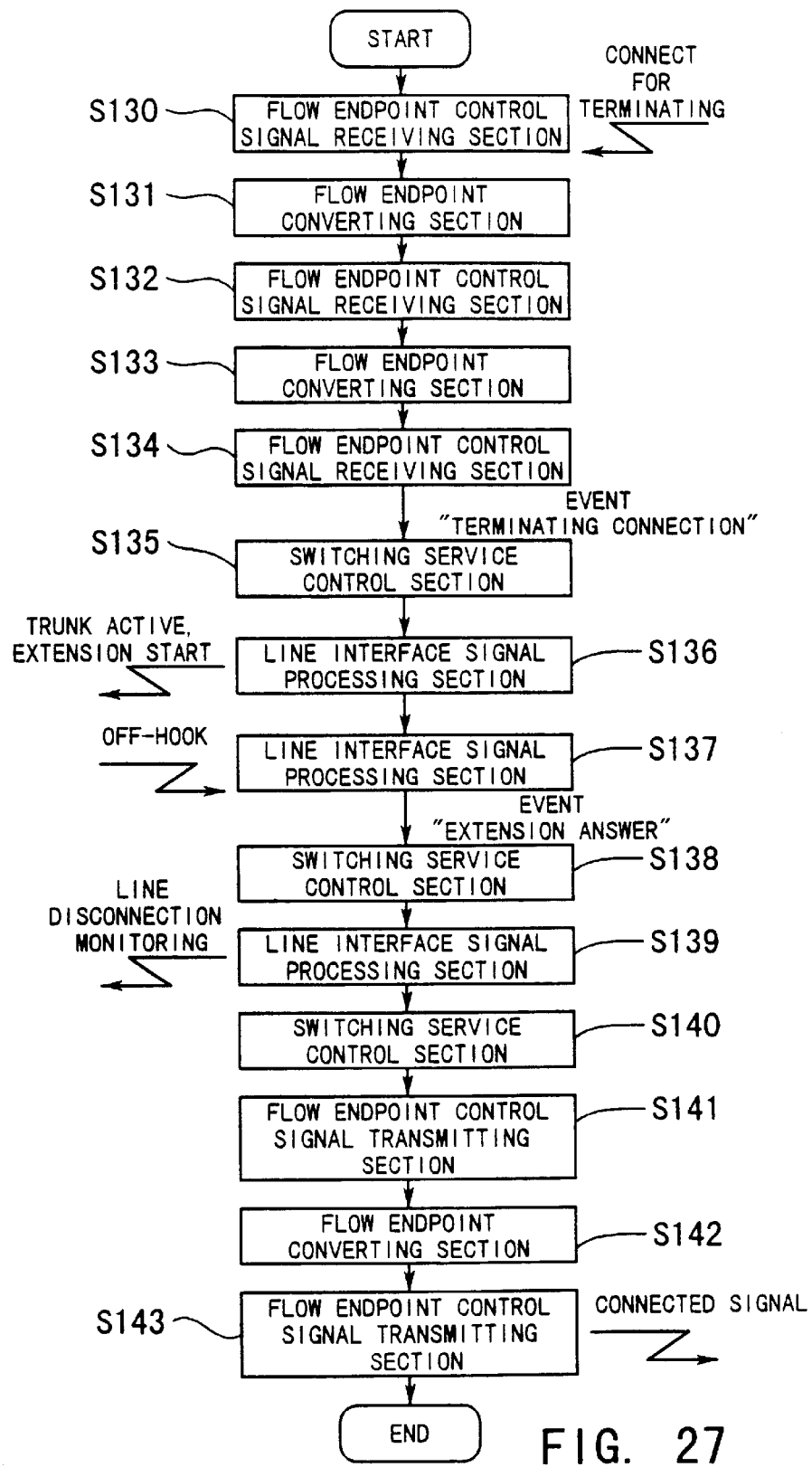
FIG. 27 is a flowchart showing an entire process executed by the user information unit (private branch exchange)

FIG. 27 illustrates an entire process executed by the user information unit (private branch exchange) 12. In FIG. 27, individual processes are represented by the names of the sections for executing the respective processes.

Figure 28:
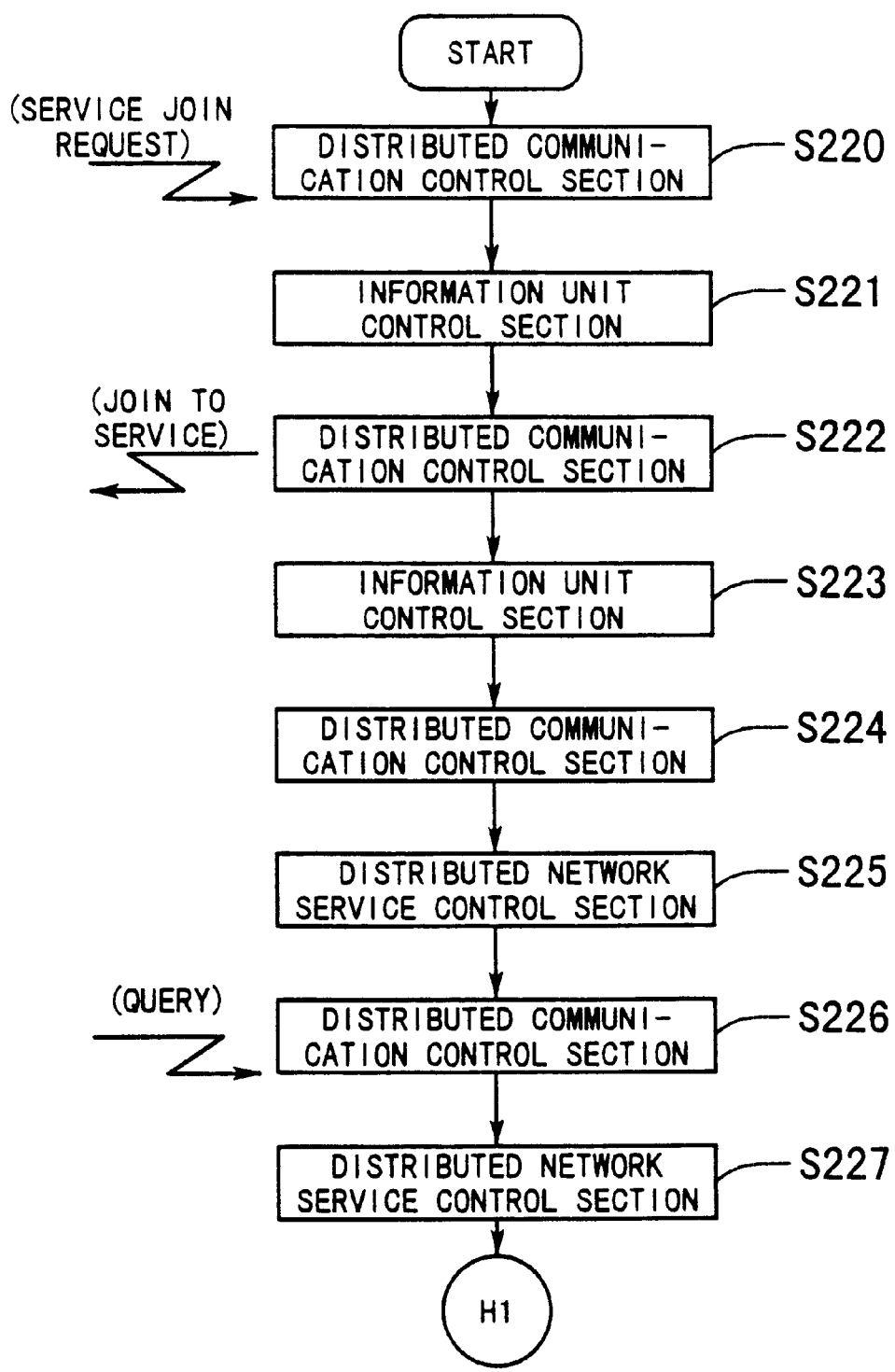
FIG. 28 is a flowchart showing the first half of an entire process executed by the user signaling unit.
Figure 29:
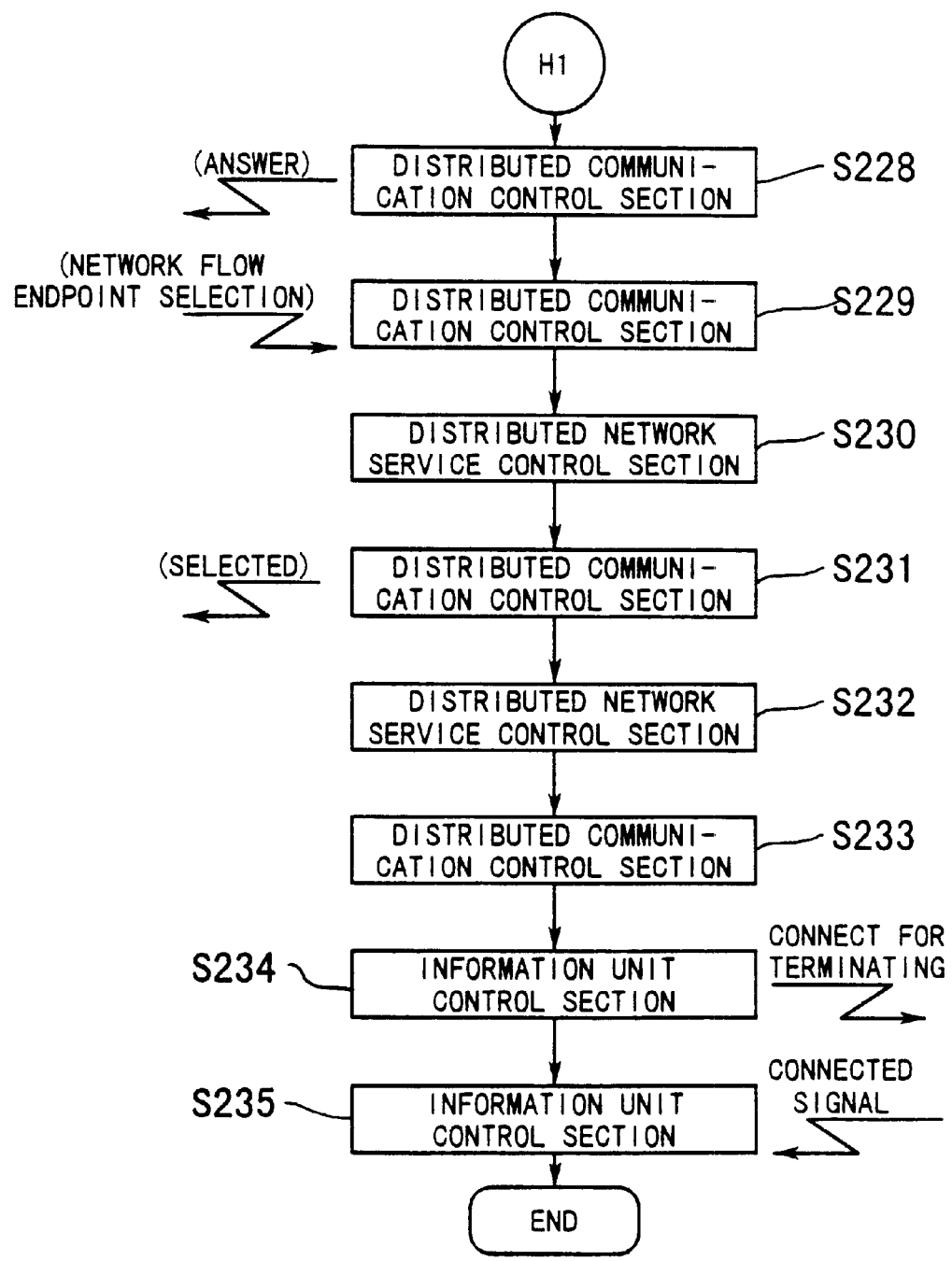
FIG. 29 is a flowchart showing the latter half of the entire process executed by the user signaling unit.

FIGS. 28 and 29 illustrate the first and second halves, respectively, of an entire process executed by the user signaling unit 11. Also in FIGS. 28 and 29, individual processes are represented by the names of the sections for executing the respective processes.

Figure 30:
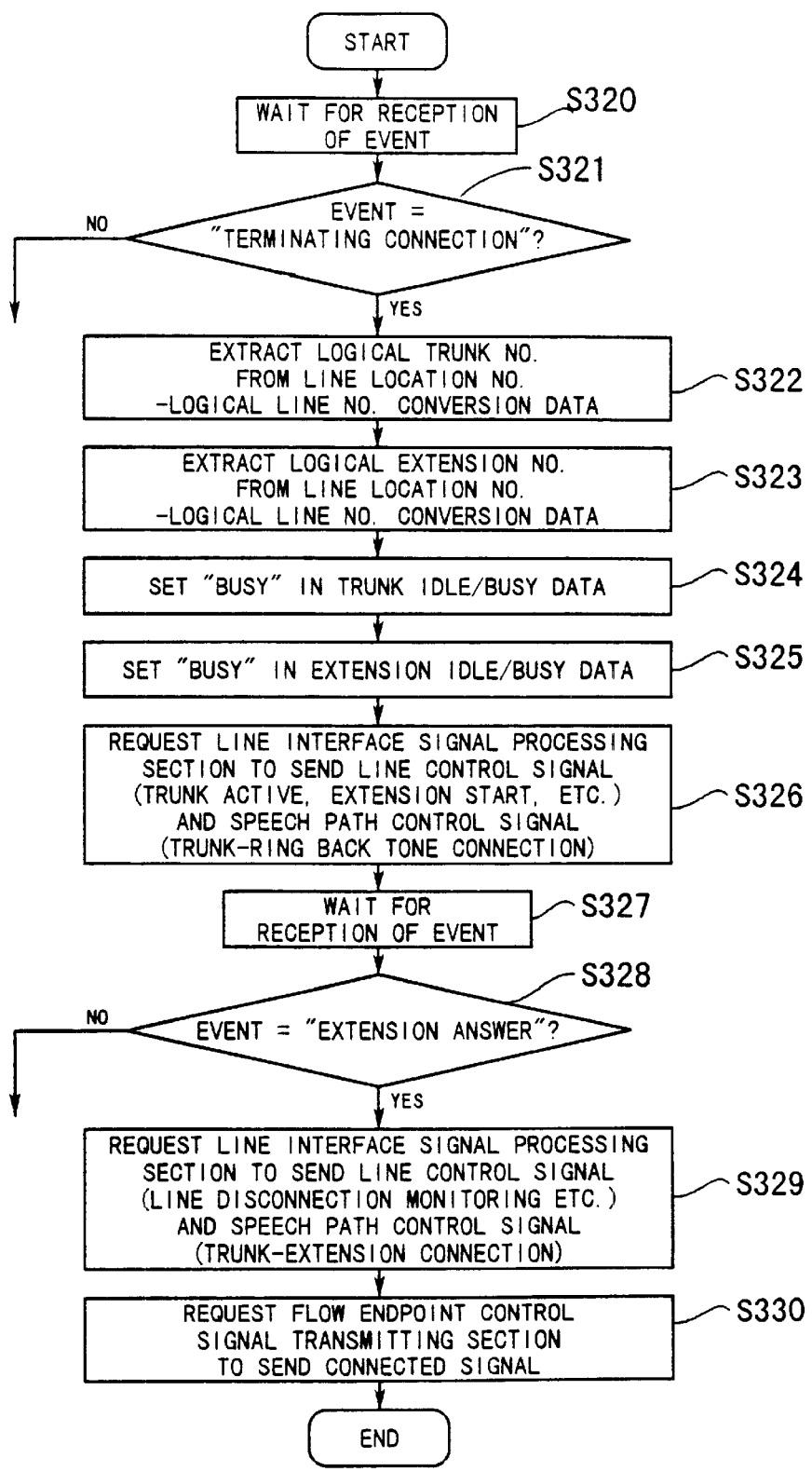
FIG. 30 is a flowchart showing a process executed by the switching service control section.
Figure 31:
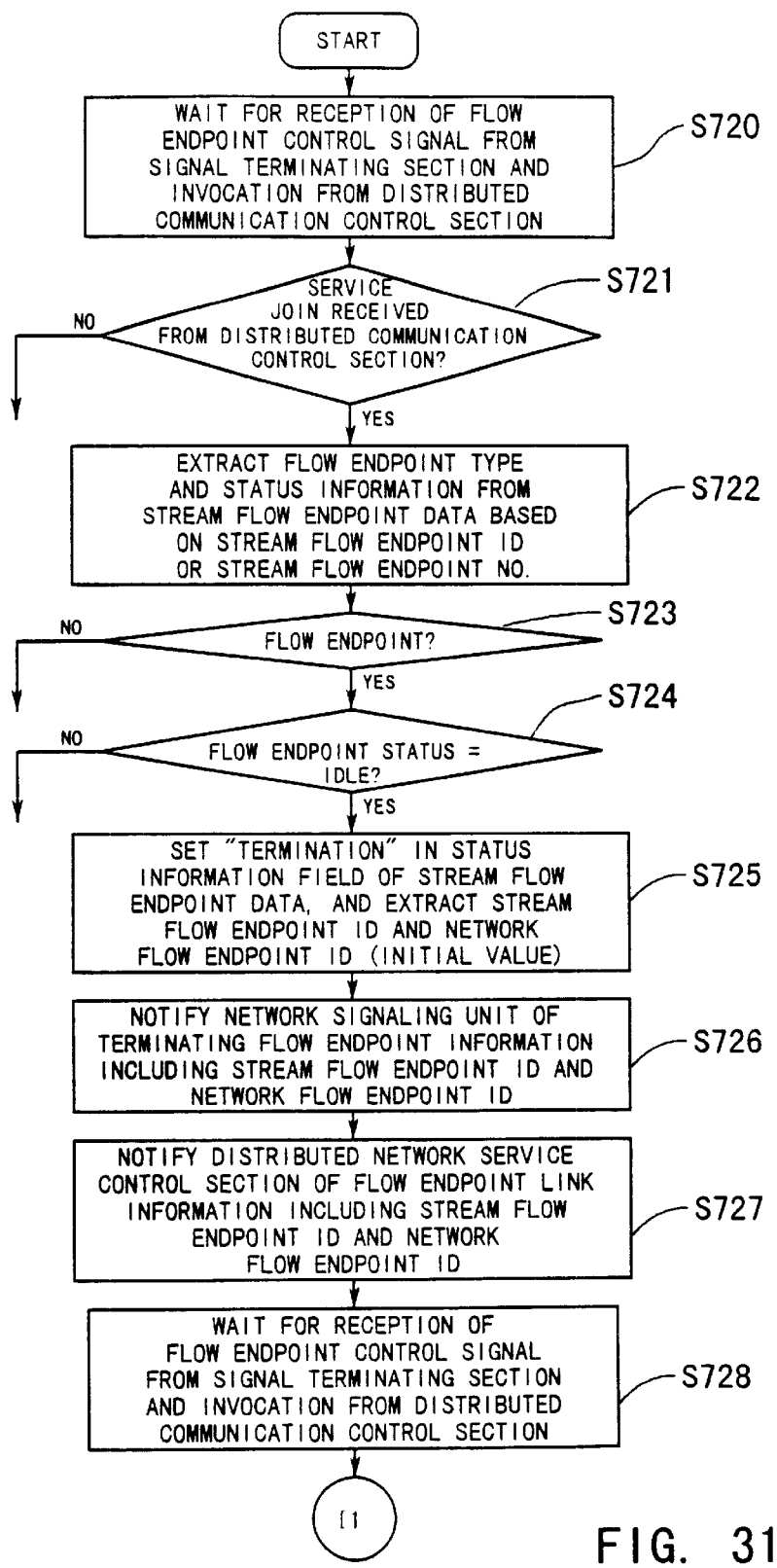
FIG. 31 is a flowchart showing the first half of a process executed by the information unit control section.
Figure 32:
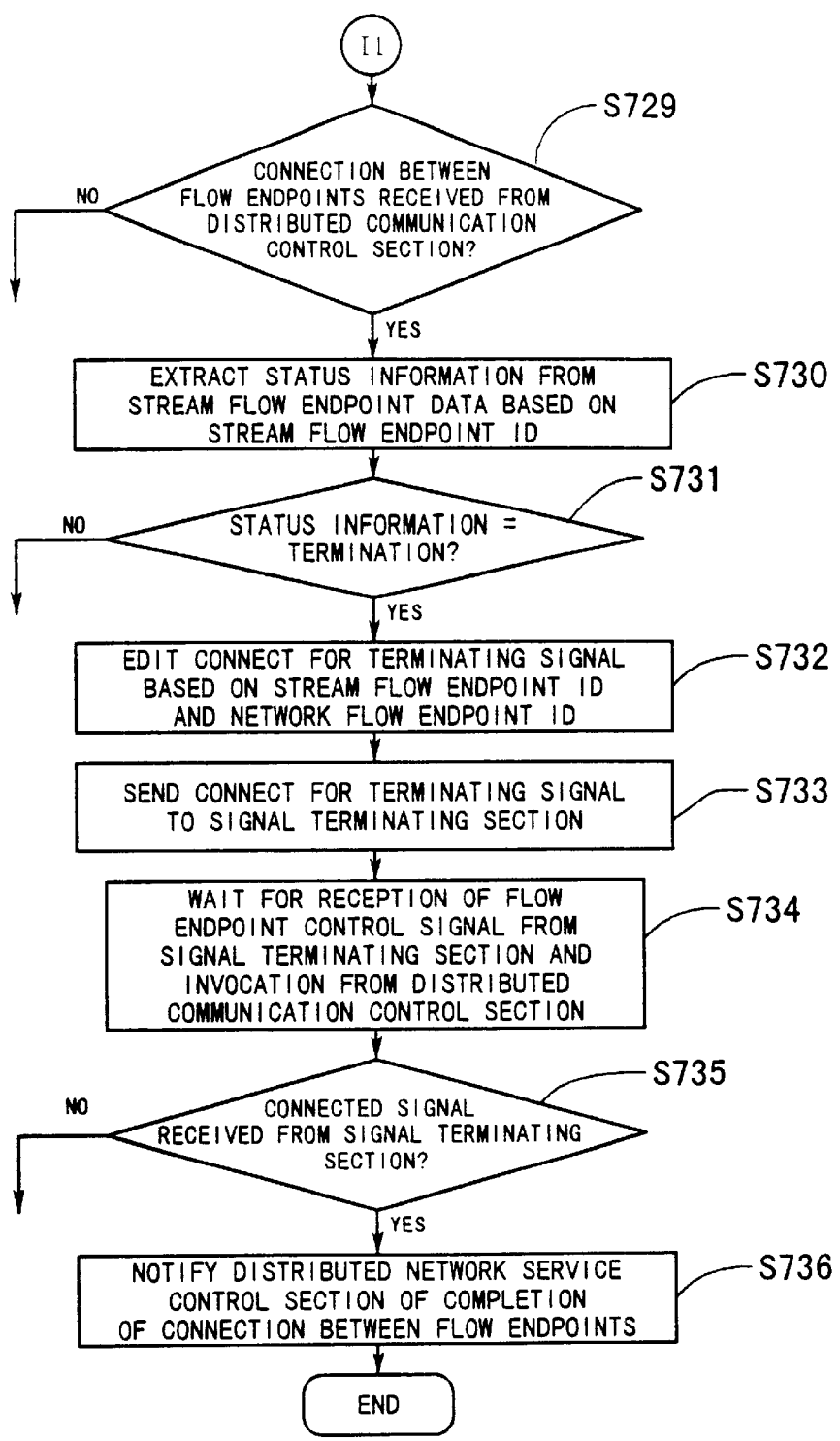
FIG. 32 is a flowchart showing the latter half of the process executed by the information unit control section.

FIG. 30 illustrates a process executed by the switching service control section 12*aba*. FIGS. 31 and 32 illustrate the first and second halves, respectively, of a process executed by the information unit control section 11*ac*. It is assumed that the user system 10 is assigned the user system number "777" within the distributed network.

Referring to the step numbers (S) appearing in FIGS. 27 through 32, the process for a terminating connection from the distributed network to the user information unit (private branch exchange) 12 will be described. In the following, reference will be also made to FIGS. 18 through 23 described above.

Control of User Signaling Unit 11

<<Steps S220–S224 of FIG. 28>> In these steps, the process flow shown in FIG. 31 is executed.

On receiving a telephony service join request '400', '3334000'" including receiving stream flow endpoint information, remote party information, etc. from the network signaling unit 20, . . . , 30 via the distributed communication control section 11*ad* (Step S721), the information unit control section 11*ac* extracts, based on the stream flow endpoint number '400', a corresponding flow endpoint type and status information from the stream flow endpoint data [cf. FIG. 9(A)] (Step S722). If the extracted flow endpoint type is not an abstract flow endpoint (Step S723), the status information is checked. If the flow endpoint status is "IDLE" (Step S724), "TERMINATION" is set as the status, and the stream flow endpoint ID "S2" and the ID (initial value) "N1" of the network flow endpoint to be connected are extracted (Step S725). The information unit control section 11*ac* then sends terminating flow endpoint information "'S2', 'N1'" as service join to the network signaling unit 20, . . . , 30 via the distributed communication control section 11*ad* (Step S726), and notifies the distributed network service control section 11*ab* of the flow endpoint link information "'S2', 'N1'" (Step S727).

<<Step S225 of FIG. 28>> On receiving the notification from the information unit control section 11*ac*, the distributed network service control section 11*ab* sets the flow endpoint link information "'S2', 'N1'" in the flow endpoint link data [cf. FIG. 10(C)].

<<Steps S226–S228 of FIGS. 28 & 29>> The distributed network service control section 11*ab* receives a query about an ID for identification of the connection "'S2', 'N'" or Qos information on the network flow endpoint "N1" from the network signaling unit 20, . . . , 30. In response thereto, the distributed network service control section 11*ab* extracts the connection ID from the flow endpoint link data [cf. FIG. 10(C)] as well as the property (band) of the network flow endpoint from the network flow endpoint data [cf. FIG. 9(B)], and transmits a response "'S2', 'N1', CONNECTION ID='2', '64 kbps'" to the network signaling unit 20, . . . , 30.

<<Steps S229–S233 of FIG. 29>> On receiving the network flow endpoint selection "'N1', CONNECTION ID='2'" from the network signaling unit 20, . . . , 30, the distributed network service control section 11*ab* determines based on the network flow endpoint data [cf. FIG. 9(B)] whether or not the network flow endpoint "N1" is an abstract flow endpoint. If the network flow endpoint "N1" is an abstract network flow endpoint, a 10 corresponding member is extracted from the abstract network flow endpoint member data [cf. FIG. 10(B)]. Then, the network flow endpoint "N12" is selected based on the network flow endpoint data [cf. FIG. 9(B)] and the status is set to "BUSY". Subsequently, the network signaling unit 20, . . . , 30 is notified of the selected network flow endpoint information "N12". Also, in the flow endpoint link data [cf. FIG. 10(C)], the network flow endpoint information associated with the connection ID="2" is set to "N12", and a connection between flow endpoints "'S2', 'N12'" is requested to the information unit control section 11*ac*.

<<Step S234 of FIG. 28>> In this step, the process flow shown in FIG. 32 is executed.

On receiving the connection between flow endpoints "'S2', 'N12'" from the distributed network service control section 11*ab* (Step S729), the information unit control section 11*ac* extracts the status information on the stream flow endpoint "S2" from the stream flow endpoint data [cf. FIG. 9(A)] (Step S730). Since the status has been set to "TERMINATION" (Step S731), the terminating connection signal "'CONNECT FOR TERMINATING', 'S2', 'N12', '–'" is edited (Step S732). Then, the terminating connection signal is transmitted to the user information unit (private branch exchange) 12 via the signal terminating section 11*c* (Step S733).

Control of User Information Unit (Private Branch Exchange) 12

<<Step S130 of FIG. 27>> In this step, the process flow shown in FIG. 20 is executed.

When supplied with the terminating connection signal "'CONNECT FOR TERMINATING', 'S2', 'N12', '–'" from the user signaling unit 11 via the signal terminating section 12f (Step S507), the flow endpoint control signal receiving section 12aaa requests the flow endpoint converting section 12ac to convert the stream flow endpoint ID "S2" to an equipment location number (Step S508).

<<Step S131 of FIG. 27>> In this step, the process flow shown in FIG. 23 is executed.

The flow endpoint converting section 12ac determines whether or not conversion from a stream flow endpoint to an line location number has been requested (Step S608). If the requested conversion is from a stream flow endpoint to an line location number, the line location number "1002" of the extension (B) 15 is extracted from the stream flow endpoint-line location number conversion data [cf. FIG. 8(D)] (Step S609), and the process is returned to the flow endpoint control signal receiving section 12aaa (Step S612).

<<Step S132 of FIG. 27>> In this step, the process flow shown in FIGS. 20 and 21 is executed.

The flow endpoint control signal receiving section 12aaa extracts the line location number "1002" corresponding to the stream flow endpoint "S2" (Step S509), and then requests the flow endpoint converting section 12ac to convert the network flow endpoint ID "N12" to an line location number (Step S510).

<<Step S133 of FIG. 27>> In this step, the process flow shown in FIG. 23 is executed.

The flow endpoint converting section 12ac determines whether or not conversion from a network flow endpoint to an line location number has been requested (Step S610). If the requested conversion is from a network flow endpoint to an line location number, the line location number "2002" of the trunk (B) 18 is extracted from the network flow endpoint-line location number conversion data [cf. FIG. 8(E)] (Step S611), and the process is returned to the flow endpoint control signal receiving section 12aaa (Step S612).

<<Step S134 of FIG. 27>> In this step, the process flow shown in FIG. 21 is executed.

The flow endpoint control signal receiving section 12aaa extracts the line location number "2002" corresponding to the network line endpoint "N12" (Step S511), converts the receiving connection signal to an internal event "EVENT 'RECEIVING CONNECTION', LINE LOCATION NO.= '2002', LINE LOCATION NO.='1002'" of the user information unit (private branch exchange) 12 (Step S512), and transfers the event to the switching service control section 12aba (Step S517).

<<Step S135 of FIG. 27>> In this step, the process flow shown in FIG. 30 is executed.

On receiving "EVENT 'RECEIVING CONNECTION'" (Step S321), the switching service control section 12aba extracts the logical trunk number "12" corresponding to the line location number "2002" of the trunk (B) 18 from the line location number-logical line number conversion data [cf. FIG. 7(A)] (Step S322), and also extracts the logical extension number "2" corresponding to the line location number "1002" of the extension (B) 15 from the line location number-logical line number conversion data [cf. FIG. 7(A)] (Step S323). Then, "BUSY" is set in the trunk idle/busy data [cf. FIG. 7(C)] (Step S324), as well as in the extension idle/busy data [cf. FIG. 7(B)] (Step S325). Subsequently, the switching service control section 12aba makes a request for line interface control "TRUNK ACTIVE REQUEST", "EXTENSION START REQUEST", speech channel setting (trunk B-ring back tone connection), etc. to the line interface signal processing section 12abb (Step S326).

<<Step S136 of FIG. 27>> On receiving the instructions from the switching service control section 12aba, the line interface signal processing section 12abb subjects the instructions to format conversion and then sends a request to the line interface 12d. Also, the line interface signal processing section 12abb controls the speech channel 12c in accordance with the line location number information.

<<Step S137 of FIG. 27>> When the state of the extension (B) 15 changes to an off-hook state, an "EXTENSION RESPONSE" signal is transmitted via the line interface 12d, and on receiving the signal, the line interface signal processing section 12abb transfers information "EVENT 'EXTENSION ANSER, LINE LOCATION NO. '1002'" to the switching service control section 12aba.

<<Step S138 of FIG. 27>> In this step, the process flow shown in FIG. 30 is executed.

On receiving "EVENT 'TERMINATING ANSER'" (Step S328), the switching service control section 12aba makes a request for line interface control "LINE DISCONNECTION MONITORING", speech path setting (trunk B "2002"-extension B "1002" connection), etc. to the line interface signal processing section 12abb (Step S329).

<<Step S139 of FIG. 27>> On receiving the instructions from the switching service control section 12aba, the line interface signal processing section 12abb subjects the instructions to format conversion and then sends a request to the line interfaces 12d and 12e. Also, the line interface signal processing section 12abb controls the speech path 12c in accordance with the line location number information.

<<Step S140 of FIG. 27>> In this step, the process flow shown in FIG. 30 is executed.

The switching service control section 12aba makes a connected signal transmission request "'CONNECTED', LOGICAL EXTENSION NO.='2'" to the flow endpoint control signal transmitting section 12aab (Step S330).

<<Step S141 of FIG. 27>> In this step, the process flow shown in FIG. 18 is executed.

When supplied with the connected signal transmission request (Step S406), the flow endpoint control signal transmitting section 12aab requests the flow endpoint converting section 12ac to convert the logical extension number "2" to a stream flow endpoint (Step S407).

<<Step S142 of FIG. 27>> In this step, the process flow shown in FIGS. 22 and 23 is executed.

The flow endpoint converting section 12ac determines whether or not conversion to a stream flow endpoint has been requested (Step S600). If conversion to a stream flow endpoint has been requested, a determination is made as to whether or not the number to be converted is an extension number (Step S601). If the number to be converted is an extension number, the logical extension number-stream flow endpoint conversion data [cf. FIG. 8(B)] is searched for a corresponding stream flow endpoint ID (Step S602), and if the stream flow endpoint ID "S2" can be extracted (Step S604), the process is returned to the flow endpoint control signal transmitting section 12aab (Step S612).

<<Step S143 of FIG. 27>> In this step, the process flow shown in FIGS. 18 and 19 is executed.

The flow endpoint control signal transmitting section 12aab extracts the stream flow endpoint ID "S2" (Step S408), then performs format conversion "'CONNECTED', 'S2'" (Step S409), and sends a connected signal to the user signaling unit 11 via the signal terminating section 12f (Step S419).

Control of User Signaling Unit 11

<<Step S235 of FIG. 29>> In this step, the process flow shown in FIG. 32 is executed.

On receiving the flow endpoint control signal "'CONNECTED', 'S2'" from the user information unit (private branch exchange) 12 via the signal terminating section 11c (Step S735), the information unit control section 11ac notifies the distributed network service control section 11ab that the connection between flow endpoints has been completed (Step S736).

A disconnecting process initiated by the user information unit (private branch exchange) 12 will be now described.

Figure 33:
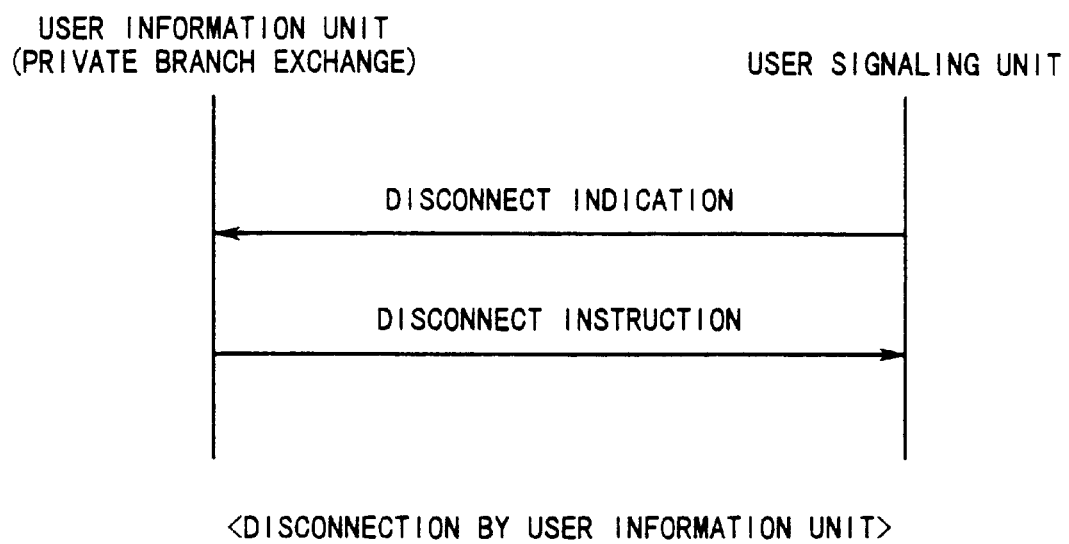
FIG. 33 is a diagram showing a sequence of flow endpoint control signals exchanged between the user information unit (private branch exchange) and the user signaling unit.

FIG. 33 shows a sequence of flow endpoint control signals exchanged between the user information unit (private branch exchange) 12 and the user signaling unit 11, wherein "DISCONNECT INDICATION" and "DISCONNECT INSTRUCTION" correspond to the respective signal names shown in FIG. 5.

Figure 34:
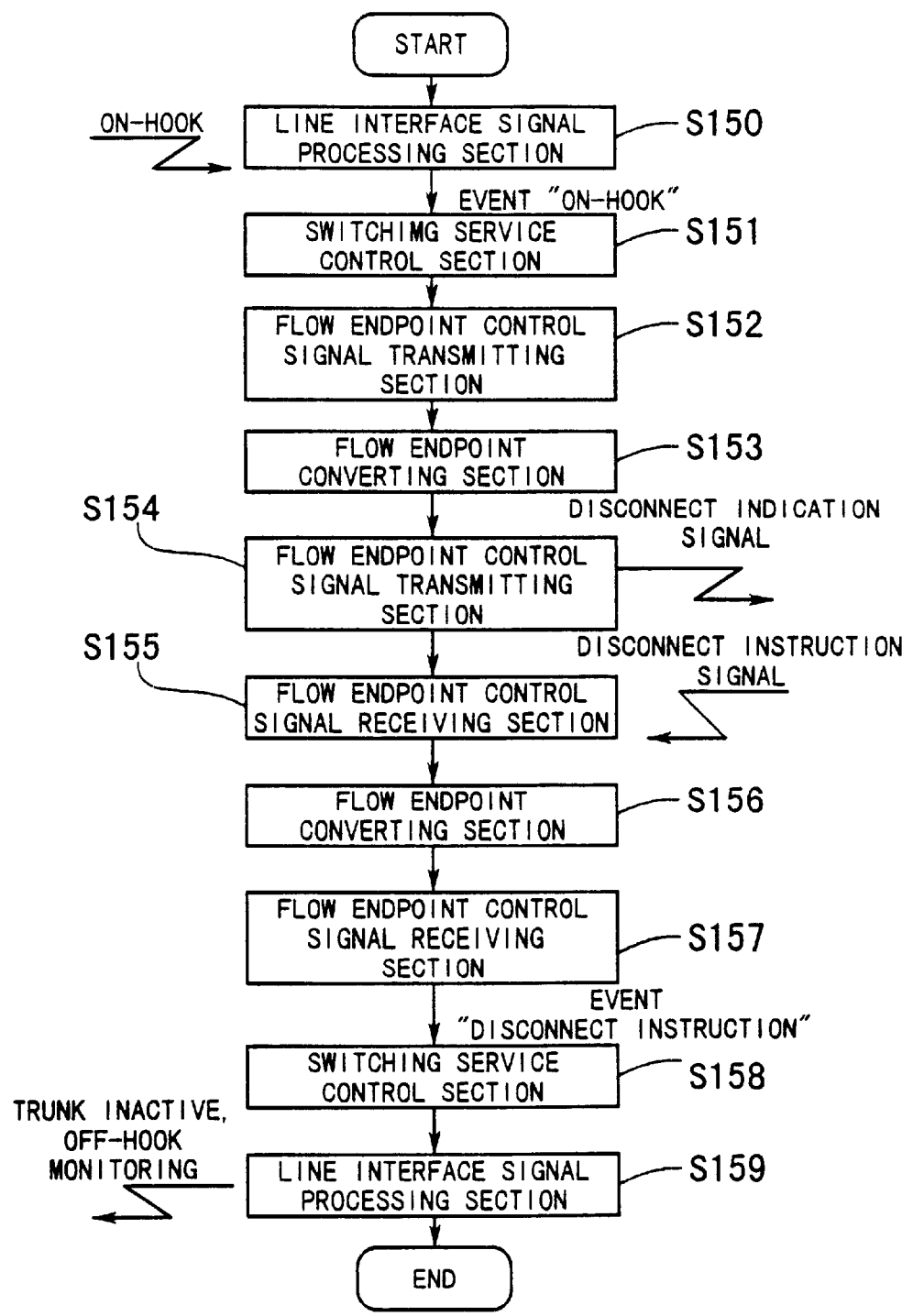
FIG. 34 is a flowchart showing an entire process executed by the user information unit (private branch exchange)

FIG. 34 illustrates an entire process executed by the user information unit (private branch exchange) 12. In FIG. 34, individual processes are represented by the names of the sections for executing the respective processes.

Figure 35:
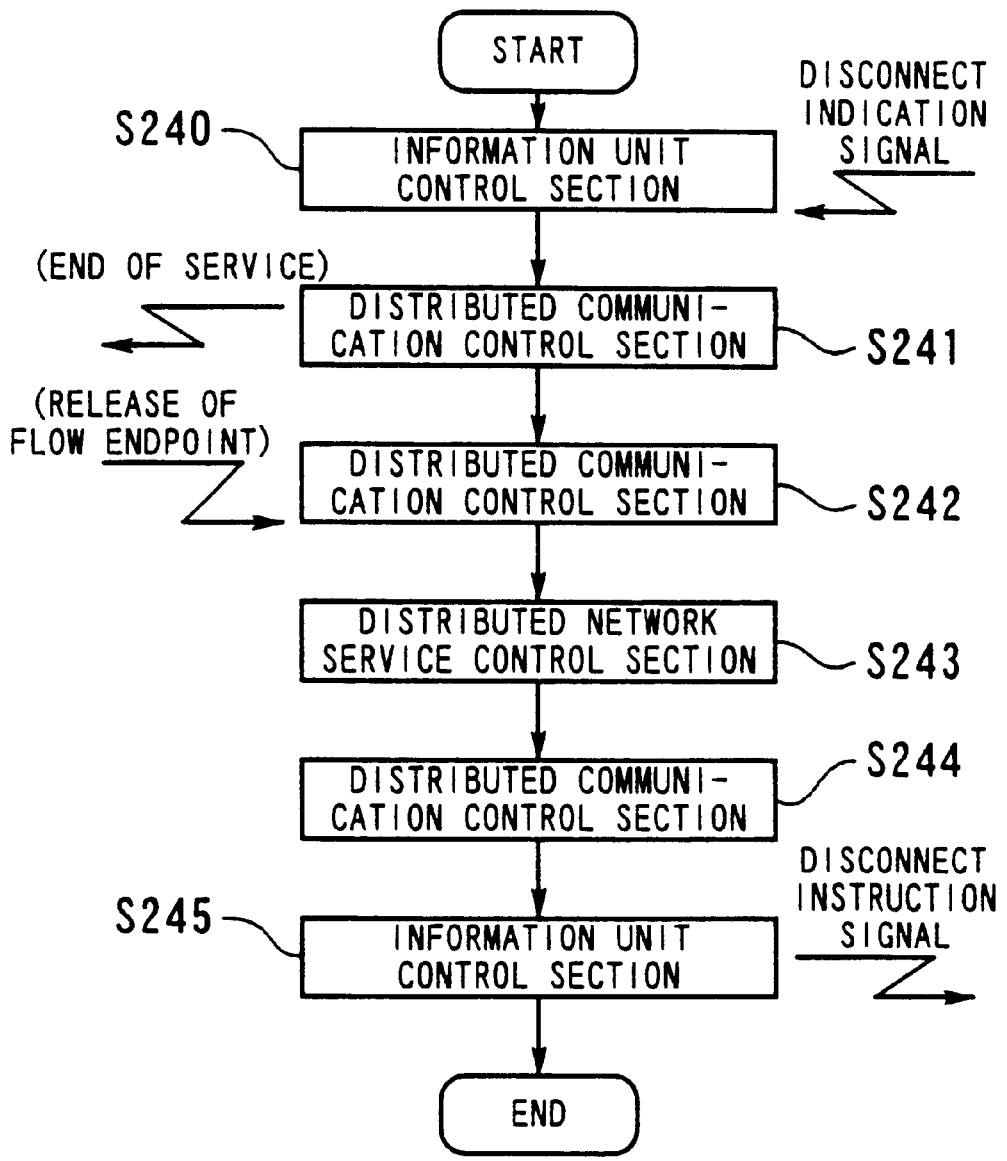
FIG. 35 is a flowchart showing an entire process executed by the user signaling unit.

FIG. 35 illustrates an entire process executed by the user signaling unit 11. Also in FIG. 35, individual processes are represented by the names of the sections for executing the respective processes.

Figure 36:
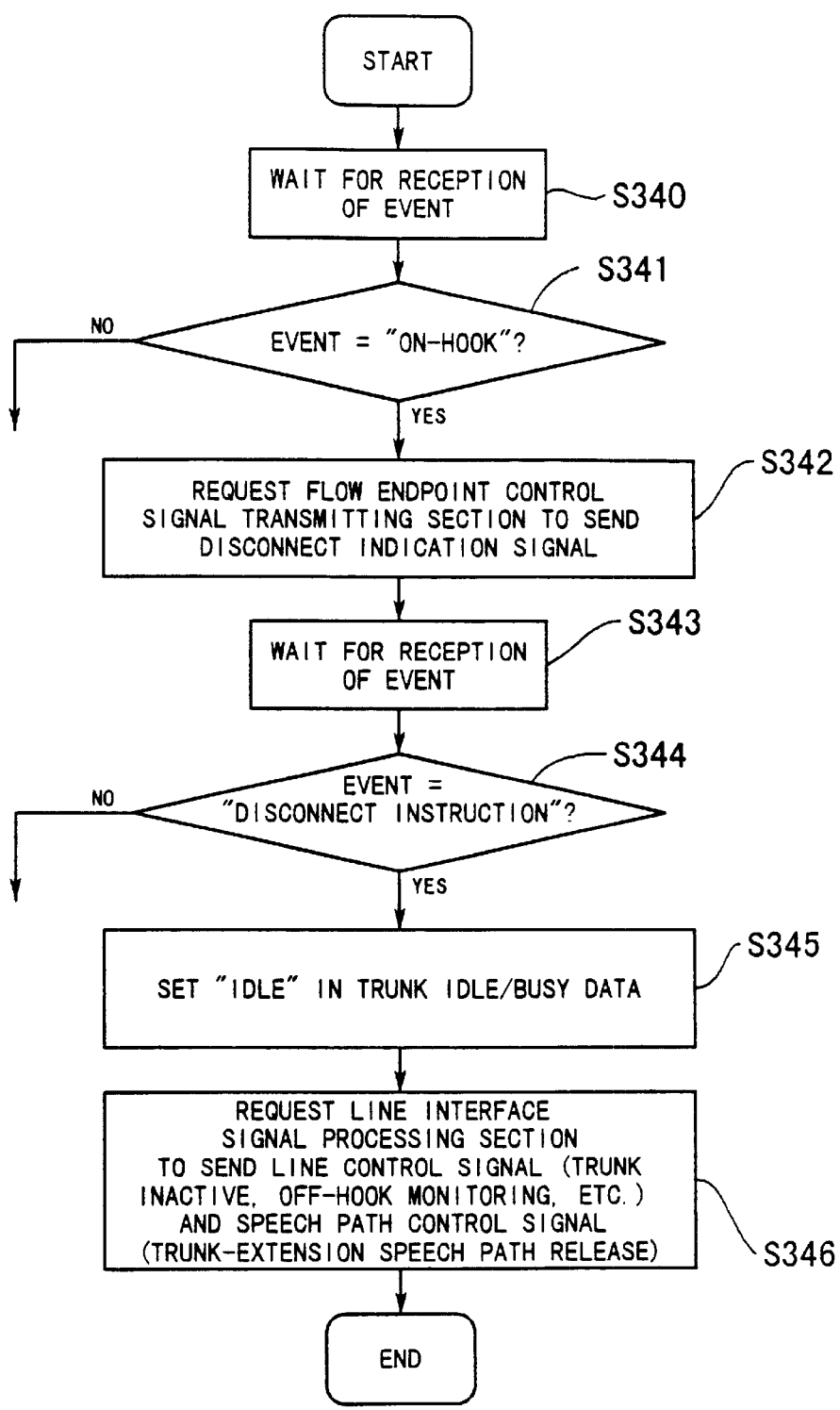
FIG. 36 is a flowchart showing a process executed by the switching service control section.
Figure 37:
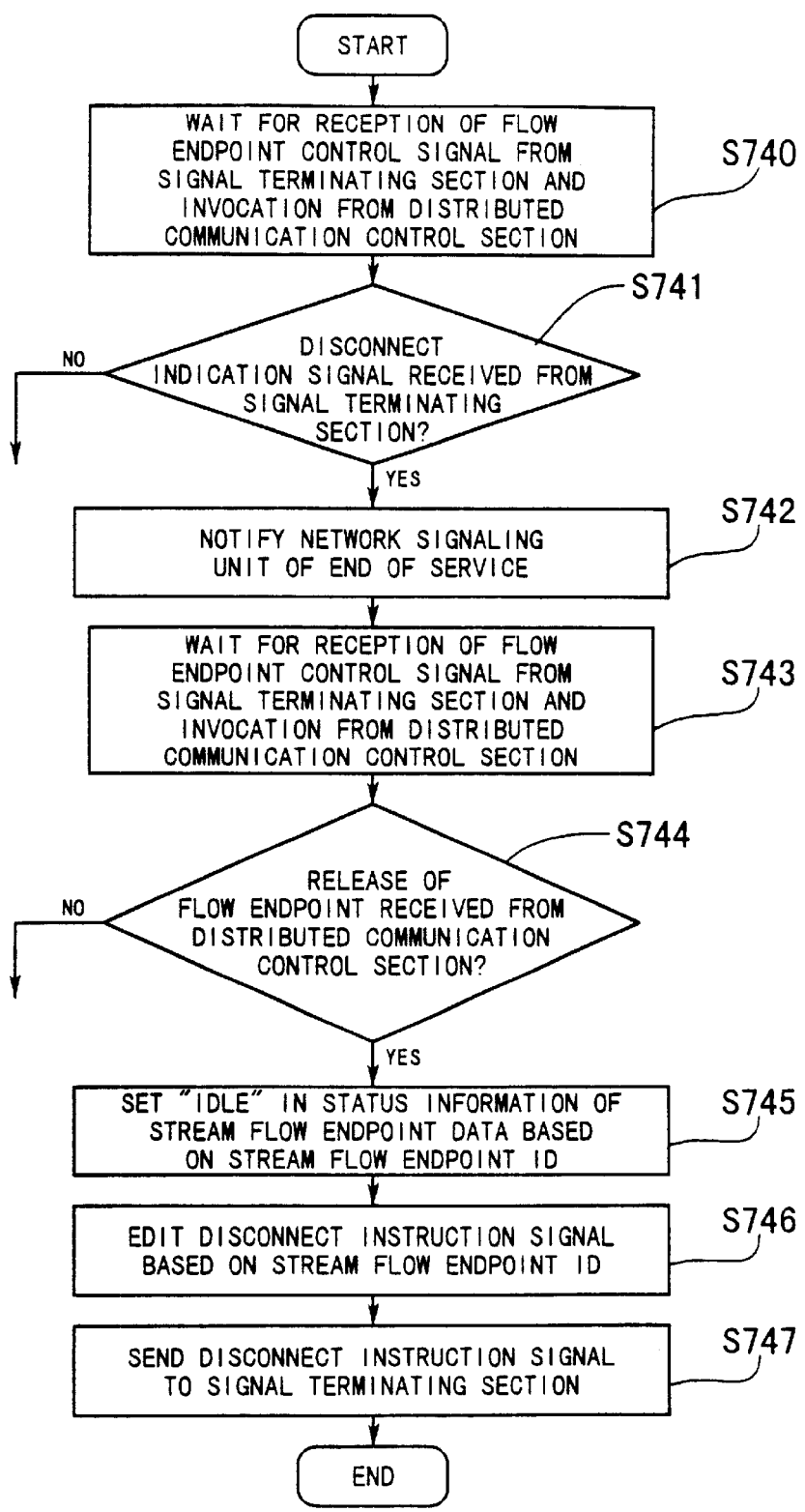
FIG. 37 is a flowchart showing a process executed by the information unit control section.

FIG. 36 illustrates a process executed by the exchange service control section 12aba, and FIG. 37 illustrates a process executed by the information unit control section 11ac. It is here assumed that because of the above-described process of originating connection from an extension of the user information unit (private branch exchange) 12 to the distributed network, the extension (A) 14 and the trunk (A) 17 equipped in the user information unit (private branch exchange) 12 are in a state of communication.

Referring to the step numbers (S) appearing in FIGS. 33 through 37, the disconnecting process initiated by the user information unit (private branch exchange) 12 will be described. In the following, reference will be also made to FIGS. 18 through 23 described above.

Control of User Information Unit (Private Branch Exchange) 12

<<Step S150 of FIG. 34>> When the state of the extension (A) 14 changes to an on-hook state, an "ON-HOOK" signal is transmitted via the line interface 12d, and on receiving the signal, the line interface signal processing section 12abb transfers information "EVENT 'ON-HOOK', LINE LOCATION NO. '1001'" to the switching service control section 12aba.

<<Step S151 of FIG. 34>> In this step, the process flow shown in FIG. 36 is executed.

On receiving "EVENT 'ON-HOOK'" (Step S341), the switching service control section 12aba makes a disconnect indication signal transmission request "'DISCONNECT INDICATION', LOGICAL EXTENSION NO.='1'" to the flow endpoint control signal transmitting section 12aab (Step S342).

<<Step S152 of FIG. 34>> In this step, the process flow shown in FIG. 19 is executed.

When supplied with the disconnect indication signal transmission request (Step S410), the flow endpoint control signal transmitting section 12aab requests the flow endpoint converting section 12ac to convert the logical extension number "1" to a stream flow endpoint (Step S411).

<<Step S153 of FIG. 34>> In this step, the process flow shown in FIGS. 22 and 23 is executed.

The flow endpoint converting section 12ac determines whether or not conversion to a stream flow endpoint has been requested (Step S600). If conversion to a stream flow endpoint has been requested, it is determined whether or not the number to be converted is an extension number (Step S601). If the number to be converted is an extension number, the logical extension number-stream flow endpoint conversion data [cf. FIG. 8(B)] is searched for a corresponding stream flow endpoint ID (Step S602). If the stream flow endpoint ID "S1" can be extracted (Step S604), the process is returned to the flow endpoint control signal transmitting section 12aab (Step S612).

<<Step S154 of FIG. 34>> In this step, the process flow shown in FIG. 19 is executed.

The flow endpoint control signal transmitting section 12aab extracts the stream flow endpoint ID "S1" (Step S412) and performs format conversion "'DISCONNECT INDICATION', 'S1'" (Step S413). Then, a disconnect indication signal is sent to the user signaling unit 11 via the signal terminating section 12f (Step S419).

Control of User Signaling Unit 11

<<Steps S240–S241 of FIG. 35>> In these steps, the process flow shown in FIG. 37 is executed.

On receiving the flow endpoint control signal "'DISCONNECT INDICATION', 'S1'" from the user information unit (private branch exchange) 12 via the signal terminating section 11c (Step S741), the information unit control section 11ac notifies the network signaling unit 20, . . . , 30 of the end of telephony service "'END OF TELEPHONY SERVICE', 'S1'" via the distributed communication control section had (Step S742).

<<Steps S242-S244 of FIG. 35>> The distributed network service control section 11ab receives network flow endpoint release "'N11', CONNECTION ID='1'" from the network signaling unit 20, . . . , 30 via the distributed communication control section 11ad, and sets the status of the network flow endpoint "N1" in the network flow endpoint data [cf. FIG. 9(B)] to "IDLE". Also, the distributed network service control section 11ab invalidates the area with the connection ID="1" in the flow endpoint link data [cf. FIG. 10(C)], and requests the information unit control section 11ac to release the stream flow endpoint "S1".

<<Step S245 of FIG. 35>> In this step, the process flow shown in FIG. 37 is executed.

On receiving the release of flow endpoint "'S1'" from the distributed network service control section 11ab (Step S744), the information unit control section 11ac sets the status information on the stream flow endpoint "S1" in the stream flow endpoint data [cf. FIG. 9(A)] to "IDLE" (Step S745), and edits the disconnect instruction signal "'DISCONNECT INSTRUCTION', 'S1'" (Step S746). Then, the information unit control section 11ac sends the disconnect instruction signal to the user information unit (private branch exchange) 12 via the signal terminating section 11c (Step S747).

Control of User Information Unit (Private Branch Exchange) 12

<<Step S155 of FIG. 34>> In this step, the process flow shown in FIG. 21 is executed.

On receiving the disconnect instruction signal "'DISCONNECT INSTRUCTION', 'S1'" from the user signaling unit 11 via the signal terminating section 12f (Step S513), the flow endpoint control signal receiving section 12aaa requests the flow endpoint converting section 12ac to convert the stream flow endpoint ID "S1" to an line location number (Step S514).

<<Step S156 of FIG. 34>> In this step, the process flow shown in FIG. 23 is executed.

The flow endpoint converting section 12ac determines whether or not conversion from a stream flow endpoint to an line location number has been requested (Step S608). If the requested conversion is from a stream flow endpoint to an line location number, the line location number "1001" of the extension (A) 14 is extracted from the stream flow endpoint-line location number conversion data [cf. FIG. 8(D)] (Step S609), and the process is returned to the flow endpoint control signal receiving section 12aaa (Step S612).

<<Step S157 of FIG. 34>> In this step, the process flow shown in FIG. 21 is executed.

The flow endpoint control signal receiving section 12aaa extracts the line location number "1001" corresponding to the stream flow endpoint "S1" (Step S515), then converts the disconnect instruction signal to an internal event "EVENT 'DISCONNECT INSTRUCTION', LINE LOCATION NO.='1001'" of the user information unit (private branch exchange) 12 (Step S516), and returns the process to the switching service control section 12aba (Step S517).

<<Step S158 of FIG. 34>> In this step, the process flow shown in FIG. 36 is executed.

On receiving "EVENT 'DISCONNECT INSTRUCTION'" (Step S344), the switching service control section 12aba sets "IDLE" in the trunk idle/busy data [cf. FIG. 7(C)] associated with the trunk (A) 17 (Step S345) (The timing for making an extension "IDLE" is complicated and description thereof is omitted for shortness' sake). Then, the switching service control section 12aba makes a request for line interface control "TRUNK INACTIVE REQUEST", "OFF-HOOK MONITORING", speech path release (extension A-trunk A), etc. to the line interface signal processing section 12abb (Step S346).

<<Step S159 of FIG. 34>> On receiving the instructions from the switching service control section 12aba, the line interface signal processing section 12abb subjects the instructions to format conversion and then sends a request to the line interface 12d. Also, based on the line location number information, the line interface signal processing section 12abb controls the speech path 12c.

A disconnecting process initiated by the user signaling unit 11 will be now described.

Figure 38:
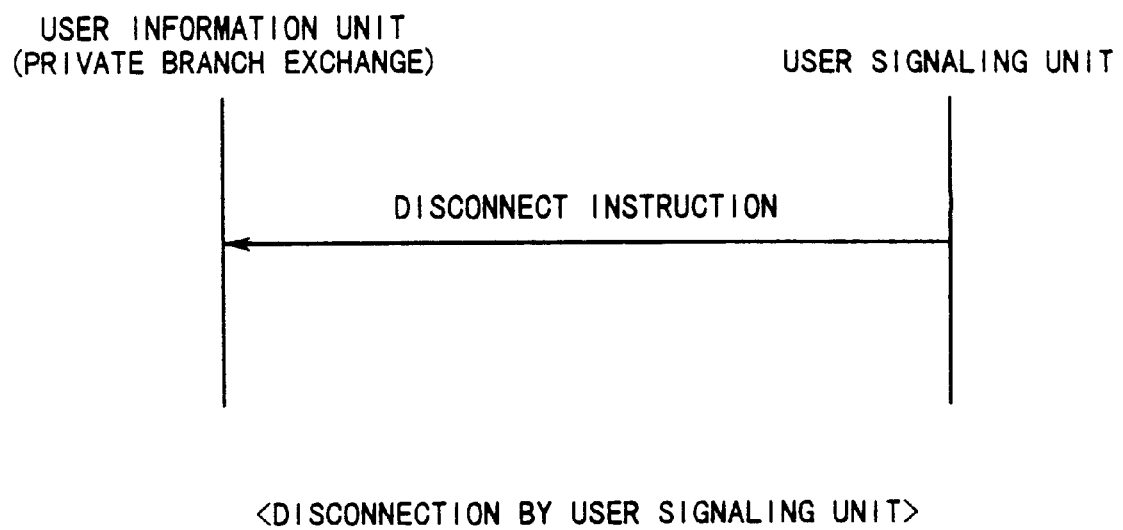
FIG. 38 is a diagram showing a sequence of flow endpoint control signal transmitted between the user information unit (private branch exchange) and the user signaling unit.

FIG. 38 shows a flow endpoint control signal transmitted between the user information unit (private branch exchange) 12 and the user signaling unit 11, wherein "DISCONNECT INSTRUCTION" represents the corresponding signal name shown in FIG. 5.

Figure 39:
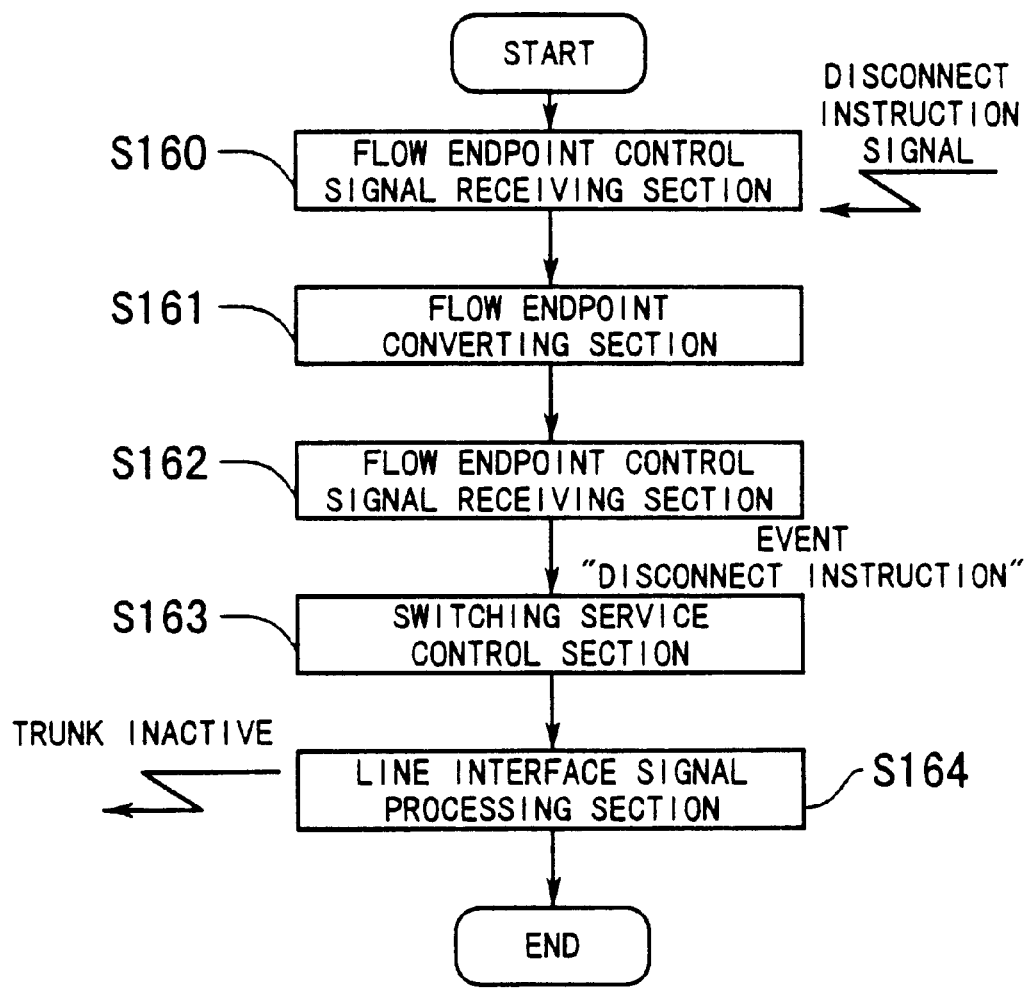
FIG. 39 is a flowchart showing an entire process executed by the user information unit (private branch exchange)

FIG. 39 illustrates an entire process executed by the user information unit (private branch exchange) 12. In FIG. 39, individual processes are represented by the names of the sections for executing the respective processes.

Figure 40:
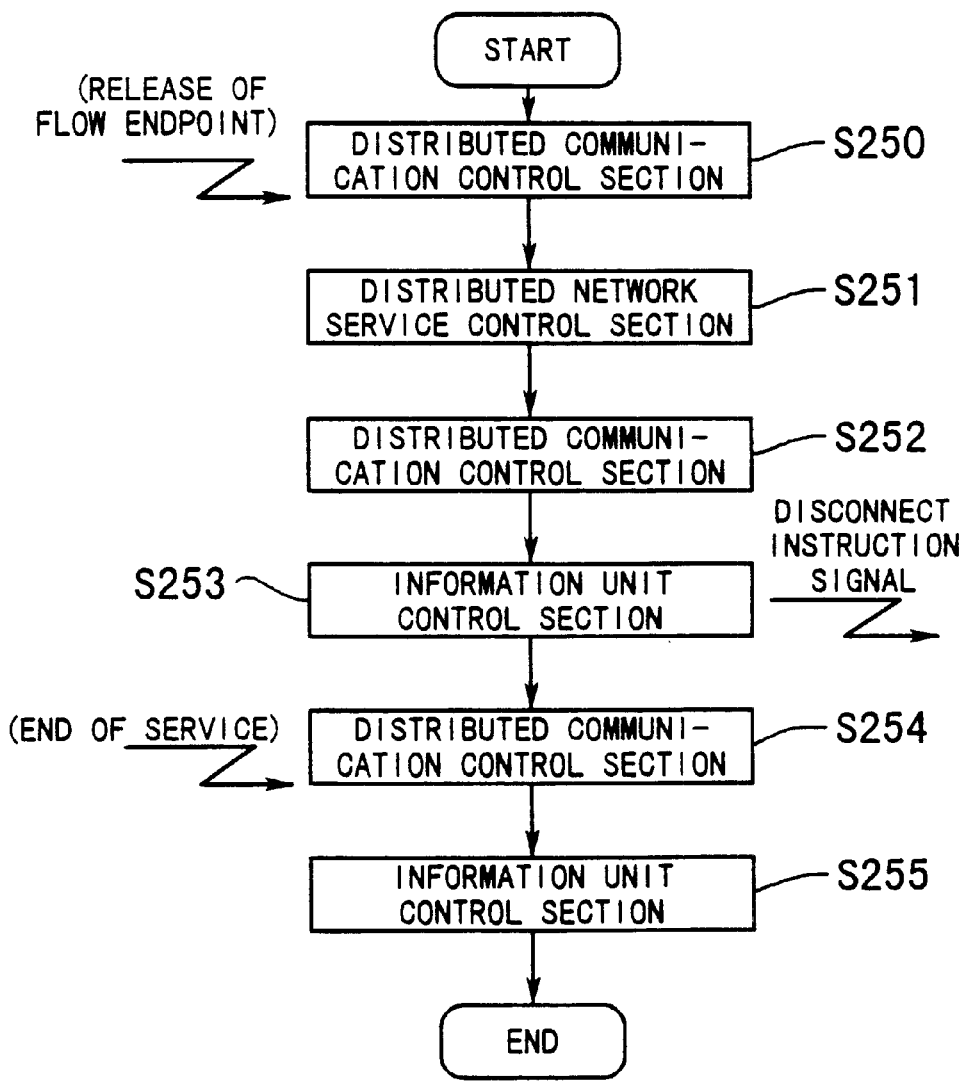
FIG. 40 is a flowchart showing an entire process executed by the user signaling unit.

FIG. 40 illustrates an entire process executed by the user signaling unit 11. Also in FIG. 40, individual processes are represented by the names of the sections for executing the respective processes.

Figure 41:
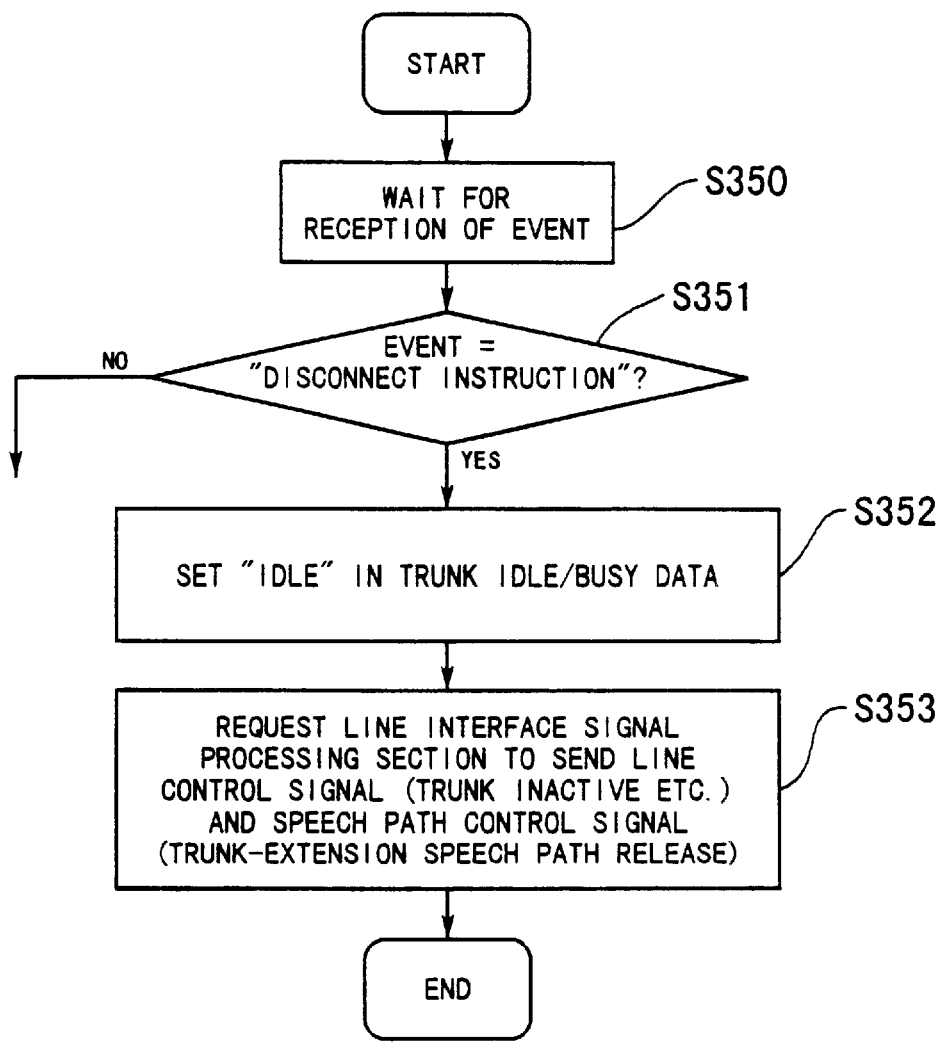
FIG. 41 is a flowchart showing a process executed by the switching service control section.
Figure 42:
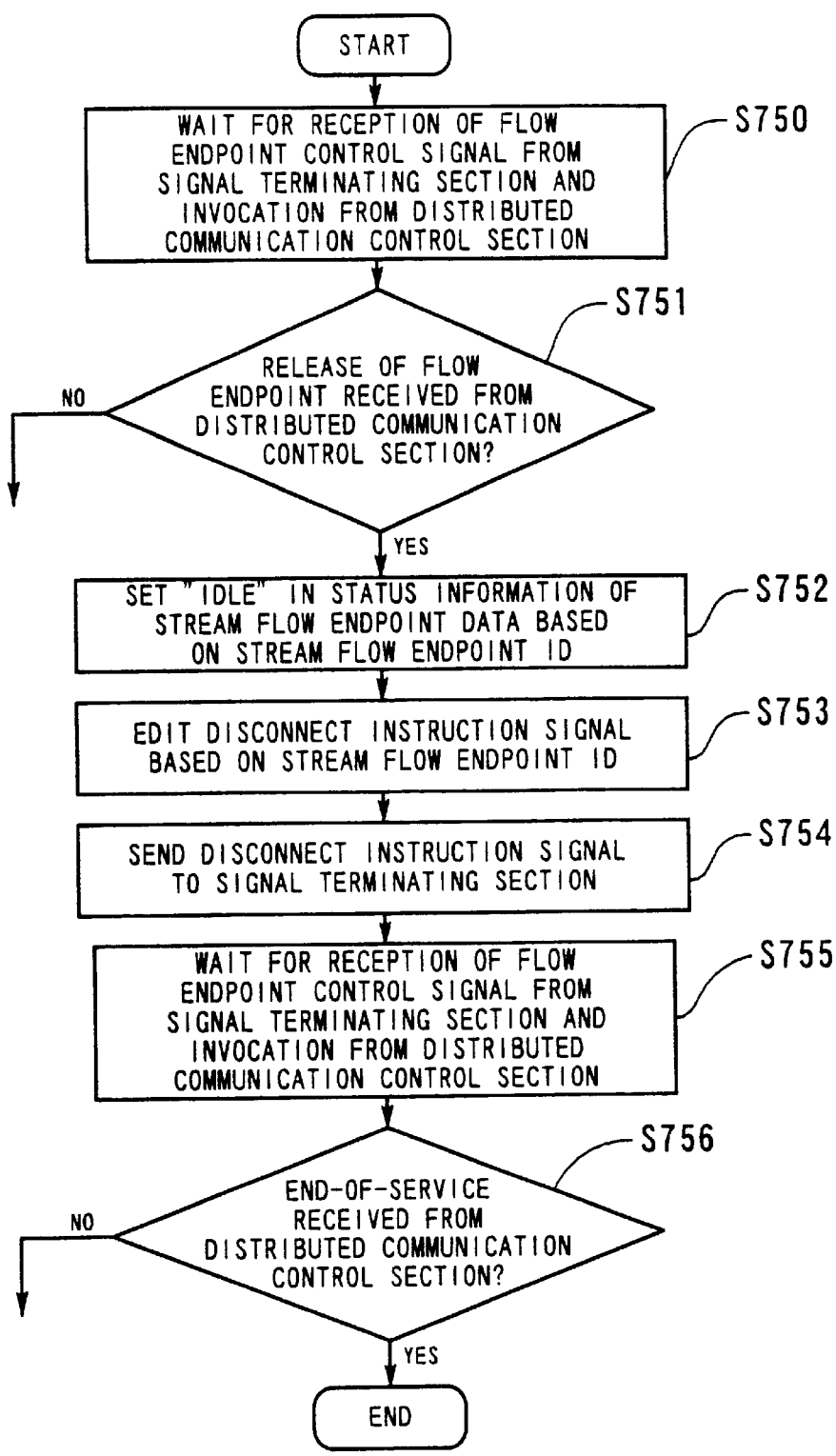
FIG. 42 is a flowchart showing a process executed by the information unit control section.

FIG. 41 illustrates a process executed by the switching service control section 12aba, and FIG. 42 illustrates a process executed by the information unit control section 11ac. It is here assumed that because of the above-described process of terminating connection from the distributed network to the user information unit (private branch exchange) 12, the extension (B) 15 and the trunk (B) 18 equipped in the user information unit (private branch exchange) 12 are in a state of communication.

Referring to the step numbers (S) appearing in FIGS. 38 through 42, the disconnecting process initiated by the user signaling unit 11 will be described. In the following, reference will be also made to FIGS. 18 through 23 described above.

Control of User Signaling Unit 11

<<Steps S250–S252 of FIG. 40>> On receiving release of network flow endpoint release "'N12', CONNECTION ID='2'" from the network signaling unit 20, ..., 30 via the distributed communication control section 11ad, the distributed network service control section 11ab sets the status of the network flow endpoint "N12" in the network flow endpoint data [cf. FIG. 9(B)] to "IDLE". Also, the distributed network service control section 11ab invalidates the area with the connection ID="2" in the flow endpoint link data [cf. FIG. 10(C)] and requests the information unit control section 11ac to release the stream flow endpoint "S2".

<<Step S253 of FIG. 40>> In this step, the process flow shown in FIG. 42 is executed.

On receiving the release of flow endpoint "S2" from the distributed network service control section 11ab (Step S751), the information unit control section 11ac sets the status information on the stream flow endpoint "S2" in the stream flow endpoint data [cf. FIG. 9(A)] to "IDLE" (Step S752). Then, the information unit control section 11ac edits the disconnect instruction signal "'DISCONNECT INSTRUCTION', 'S2'" (Step S753), and sends the disconnect instruction signal to the user information unit (private branch exchange) 12 via the signal terminating section 11c (Step S754).

<<Steps S254-S255 of FIG. 40>> In these steps, the process flow shown in FIG. 42 is executed.

The information unit control section 11ac thereafter receives end-of-telephony service notification from the network signaling unit 20, ..., 30 via the distributed communication control section 11ad (Step S756).

Control of User Information Unit (Private Branch Exchange) 12

<<Step S160 of FIG. 39>> In this step, the process flow shown in FIG. 21 is executed.

On receiving the disconnect instruction signal "'DISCONNECT INSTRUCTION', 'S2'" from the user signaling unit 11 via the signal terminating section 12f (Step S513), the flow endpoint control signal receiving section 12aaa requests the flow endpoint converting section 12ac to convert the stream flow endpoint ID "S2" to an line location number (Step S514).

<<Step S161 of FIG. 39>> In this step, the process flow shown in FIG. 23 is executed.

The flow endpoint converting section 12ac determines whether or not conversion from a stream flow endpoint to an line location number has been requested (Step S608). If the requested conversion is from a stream flow endpoint to an line location number, the line location number '1002' of the extension (B) 15 is extracted from the stream flow endpoint-line location number conversion data [cf. FIG. 8(D)] (Step S609), and the process is returned to the flow endpoint control signal receiving section 12aaa (Step S612).

<<Step S162 of FIG. 39>> In this step, the process flow shown in FIG. 21 is executed.

The flow endpoint control signal receiving section 12aaa extracts the line location number "1002" corresponding to the stream flow endpoint "S2" (Step S515). Subsequently, the flow endpoint control signal receiving section 12aaa converts the disconnect instruction signal to an internal event "EVENT 'DISCONNECT INSTRUCTION', LINE LOCATION NO.='1002'" of the user information unit (private branch exchange) 12 (Step S516), and transfers the event to the switching service control section 12aba (Step S517).

<<Step S163 of FIG. 39>> In this step, the process flow shown in FIG. 41 is executed.

On receiving "EVENT 'DISCONNECT INSTRUC-TION'" (Step S351), the switching service control section 12aba sets "IDLE" in the trunk idle/busy data [cf. FIG. 7(C)] associated with the trunk (B) 18 (Step S352) (The timing for making an extension "IDLE" is complicated and description thereof is omitted for shortness' sake). The switching service control section 12aba then makes a request for line interface control "TRUNK INACTIVE REQUEST", speech path release (trunk B-extension B), etc. to the line interface signal processing section 12abb (Step S353).

<<Step S164 of FIG. 39>> On receiving the instructions from the switching service control section 12aba, the line interface signal processing section 12abb subjects the instructions to format conversion and then sends a request to the line interfaces 12d and 12e. Also, based on the line location number information, the line interface signal processing section 12abb controls the speech path 12c.

A status change notification process will be now described.

Figure 43:
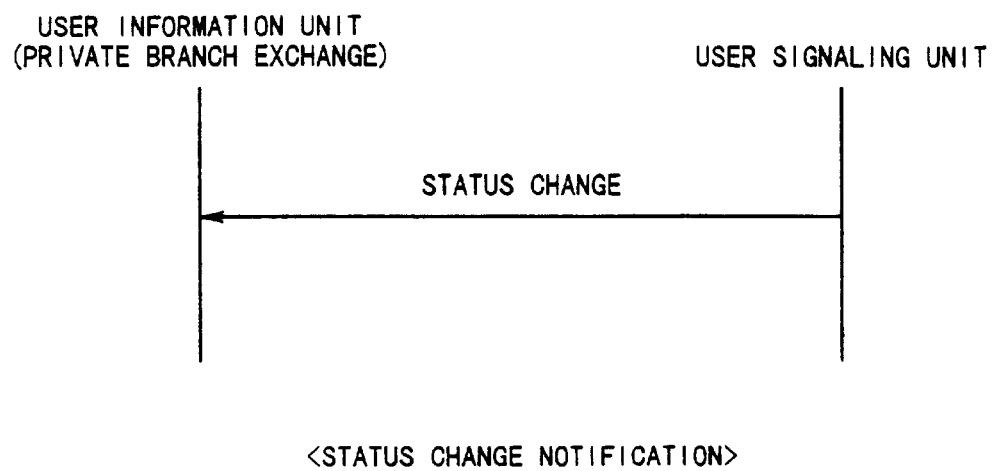
FIG. 43 is a diagram showing a flow endpoint control signal transmitted between the user information unit (private branch exchange) and the user signaling unit.

FIG. 43 shows a flow endpoint control signal transmitted between the user information unit (private branch exchange) 12 and the user signaling unit 11, wherein "STATUS CHANGE" represents the corresponding signal name shown in FIG. 5.

Figure 44:
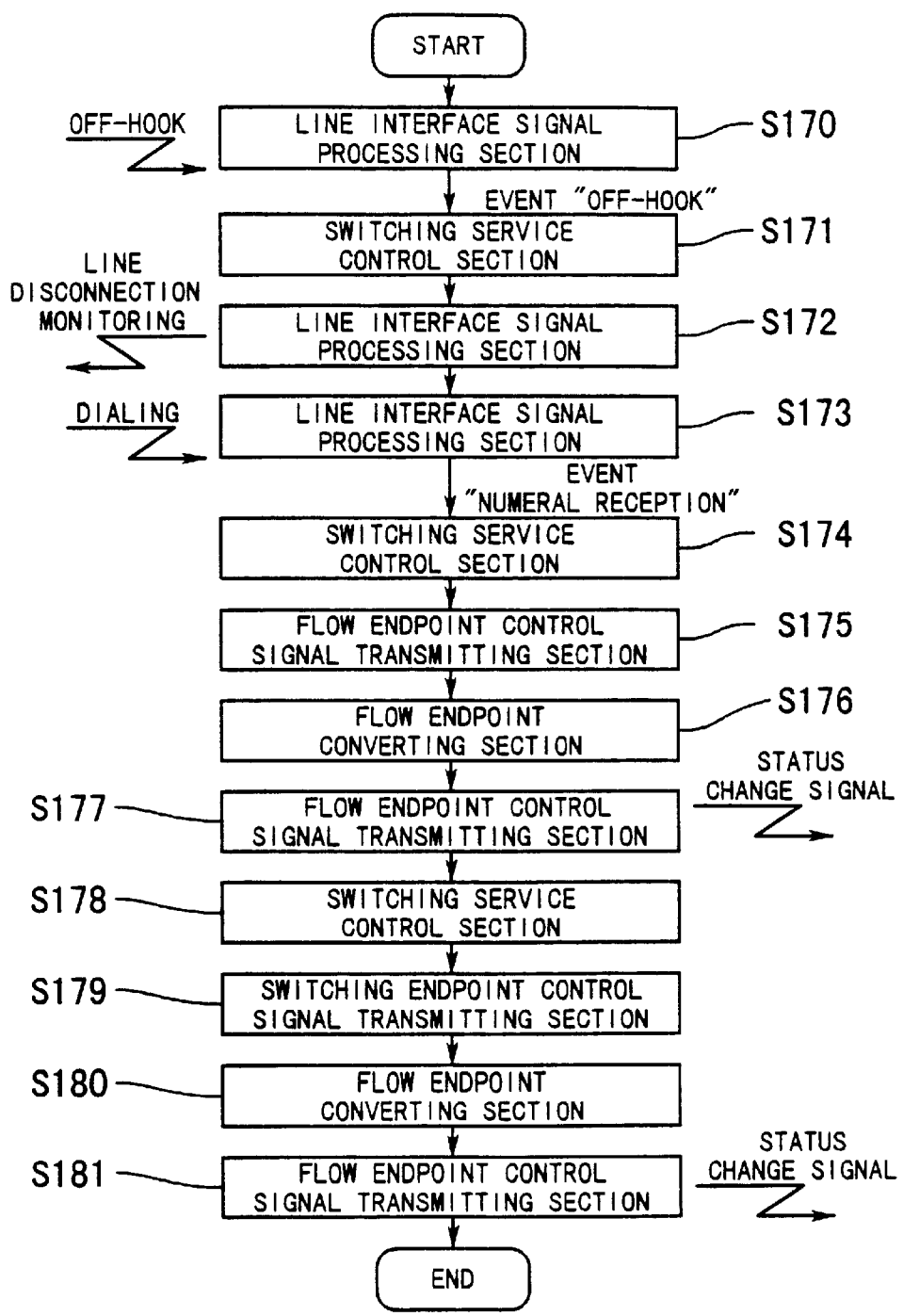
FIG. 44 is a flowchart showing an entire process executed by the user information unit (private branch exchange)

FIG. 44 illustrates an entire process executed by the user information unit (private branch exchange) 12. In FIG. 44, individual processes are represented by the names of the sections for executing the respective processes.

Figure 45:
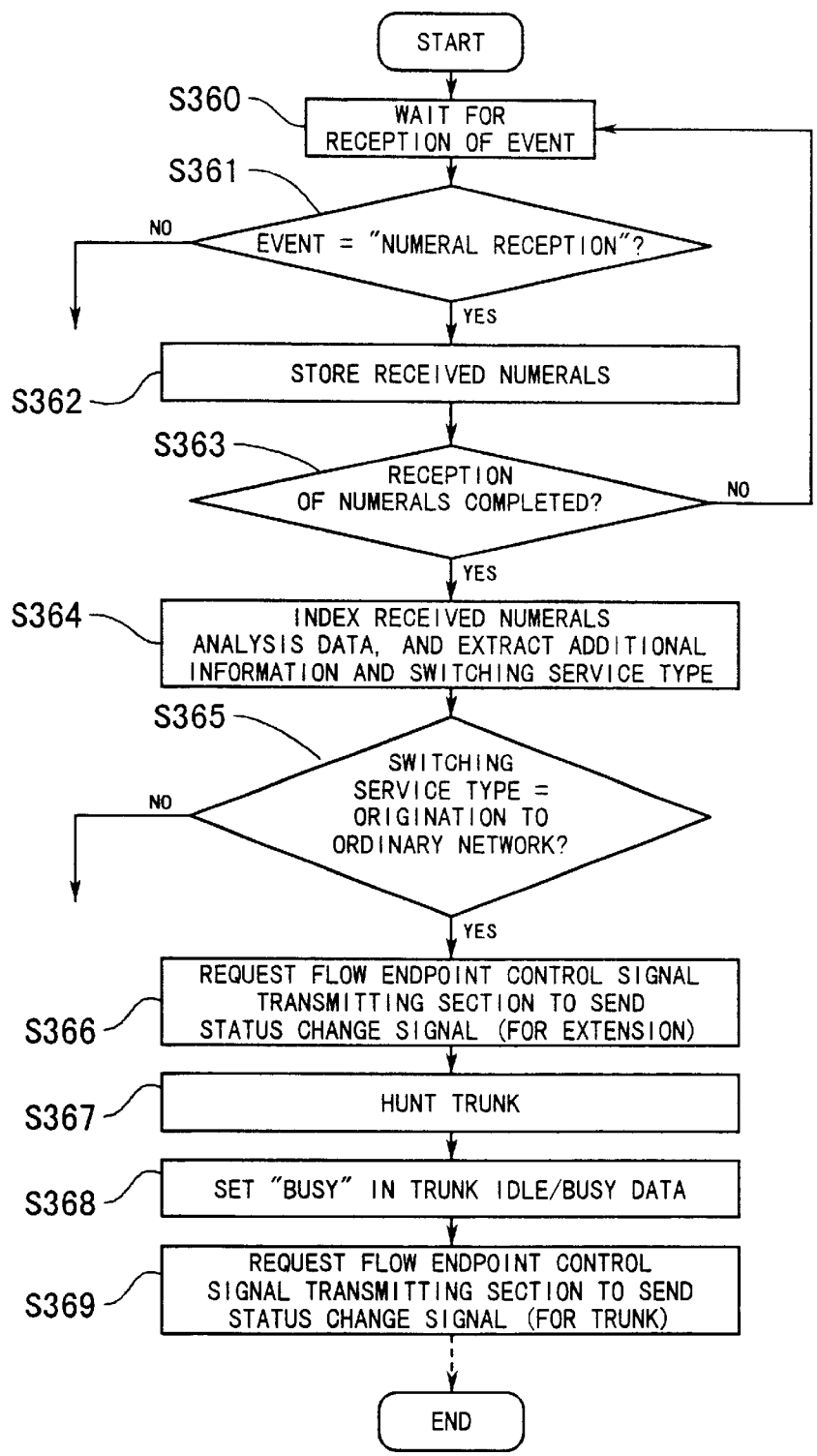
FIG. 45 is a flowchart showing a process executed by the switching service control section.
Figure 46:
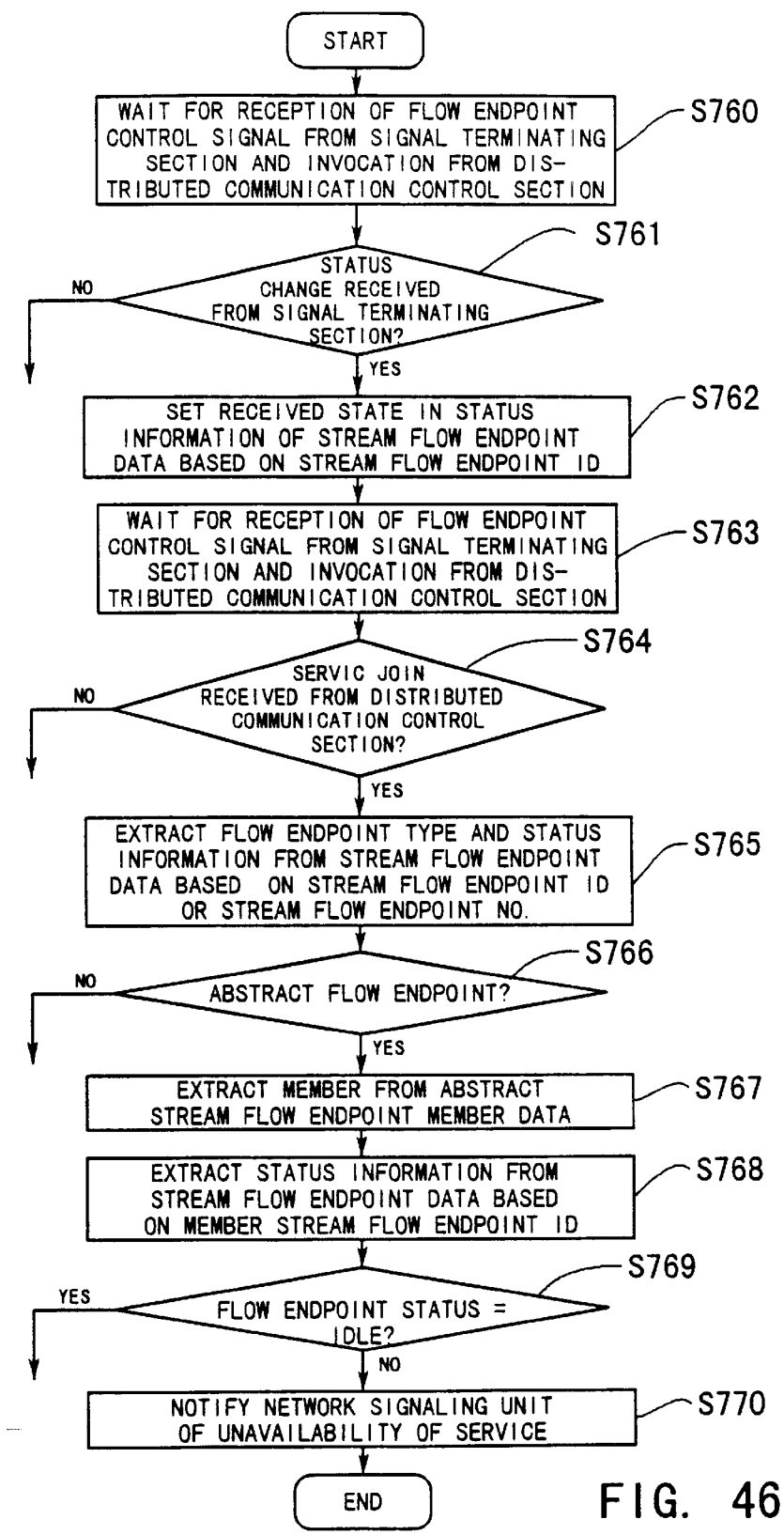
FIG. 46 is a flowchart showing a process executed by the information unit control section.
Figure 47:
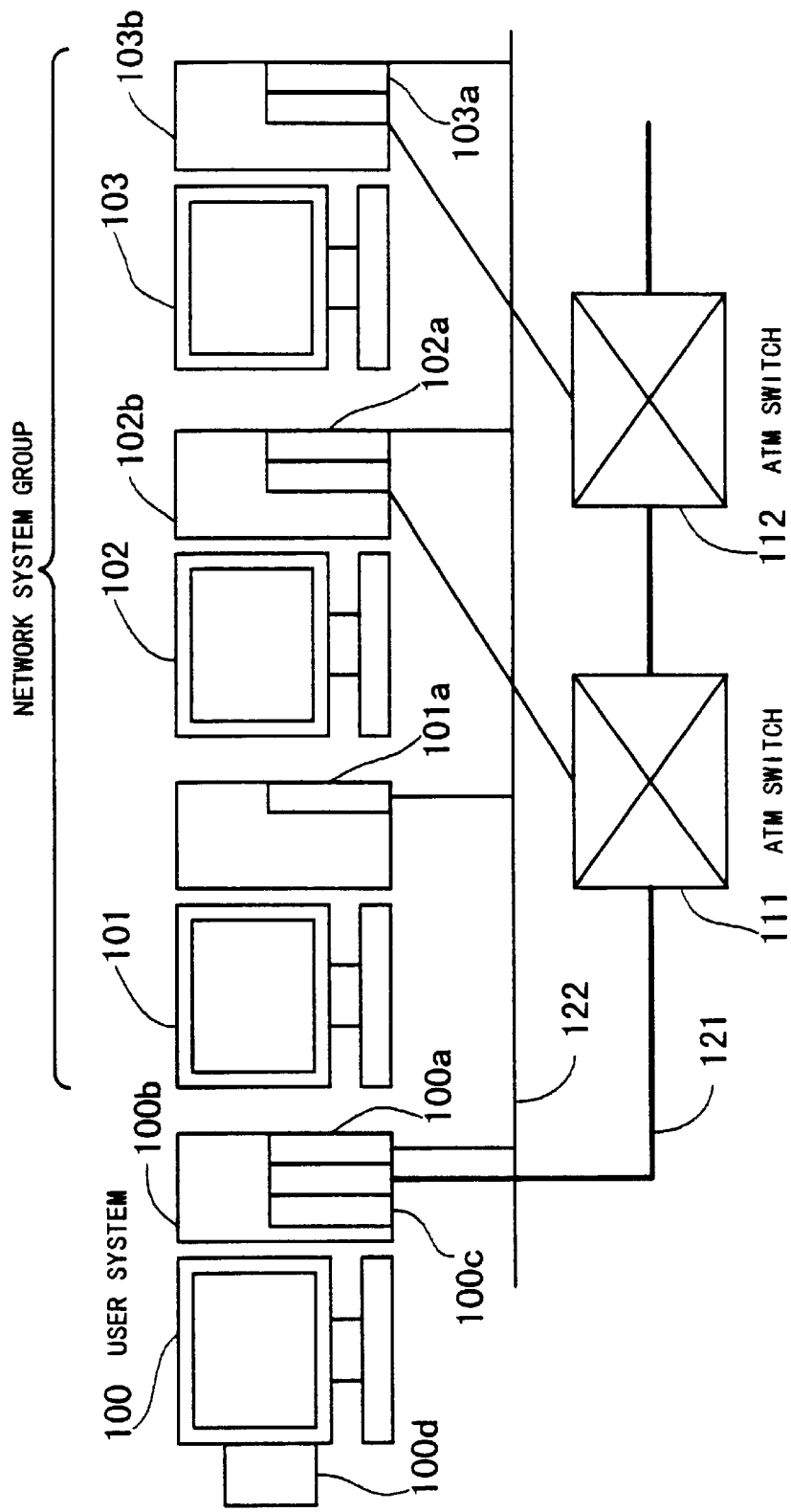
FIG. 47 is a diagram showing, by way of example, a configuration of a distributed network conventionally adopted according to TINA.
Figure 48:
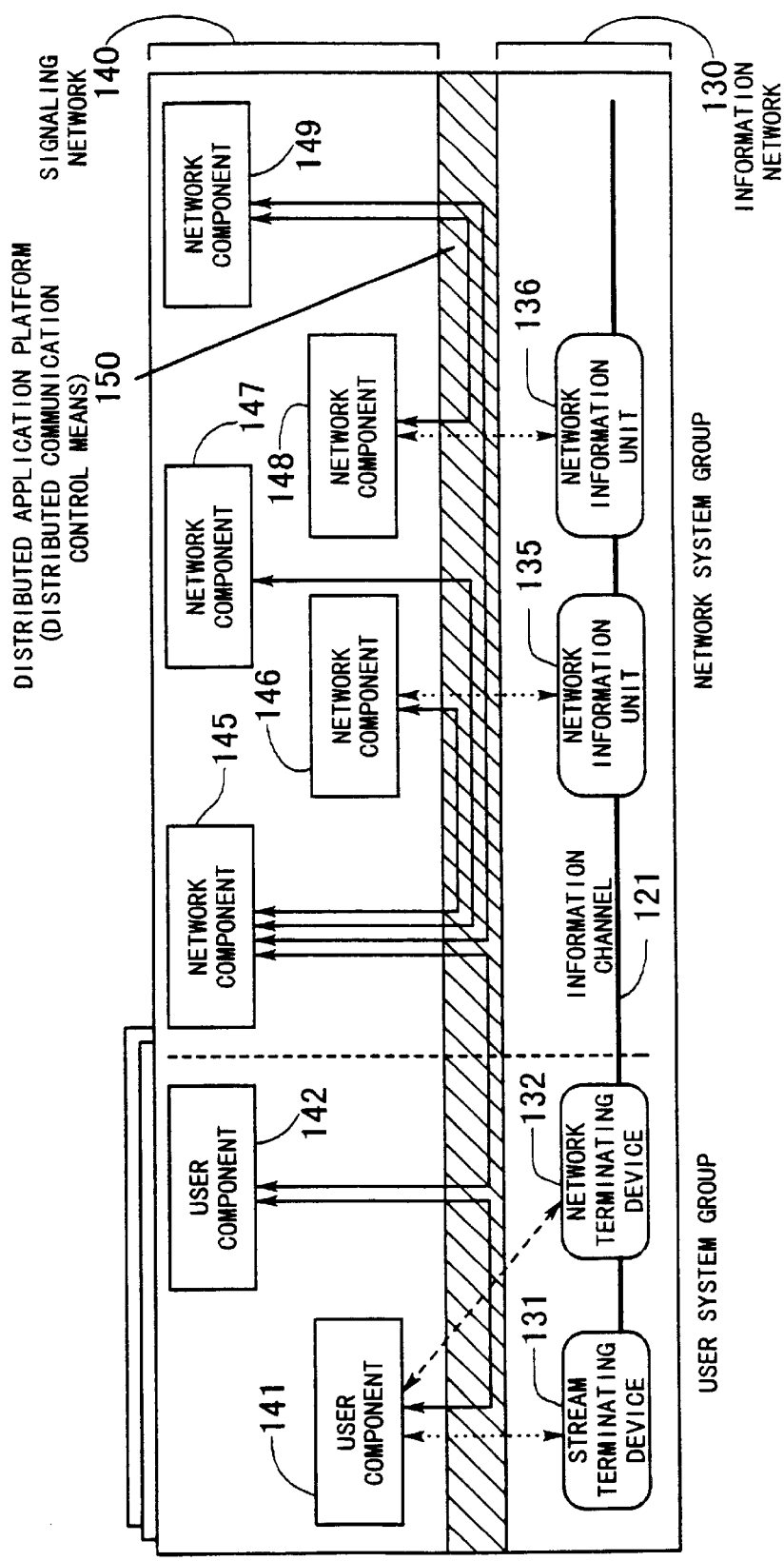
FIG. 48 is a diagram illustrating the architecture of the distributed network shown in FIG. 47.
Figure 49:
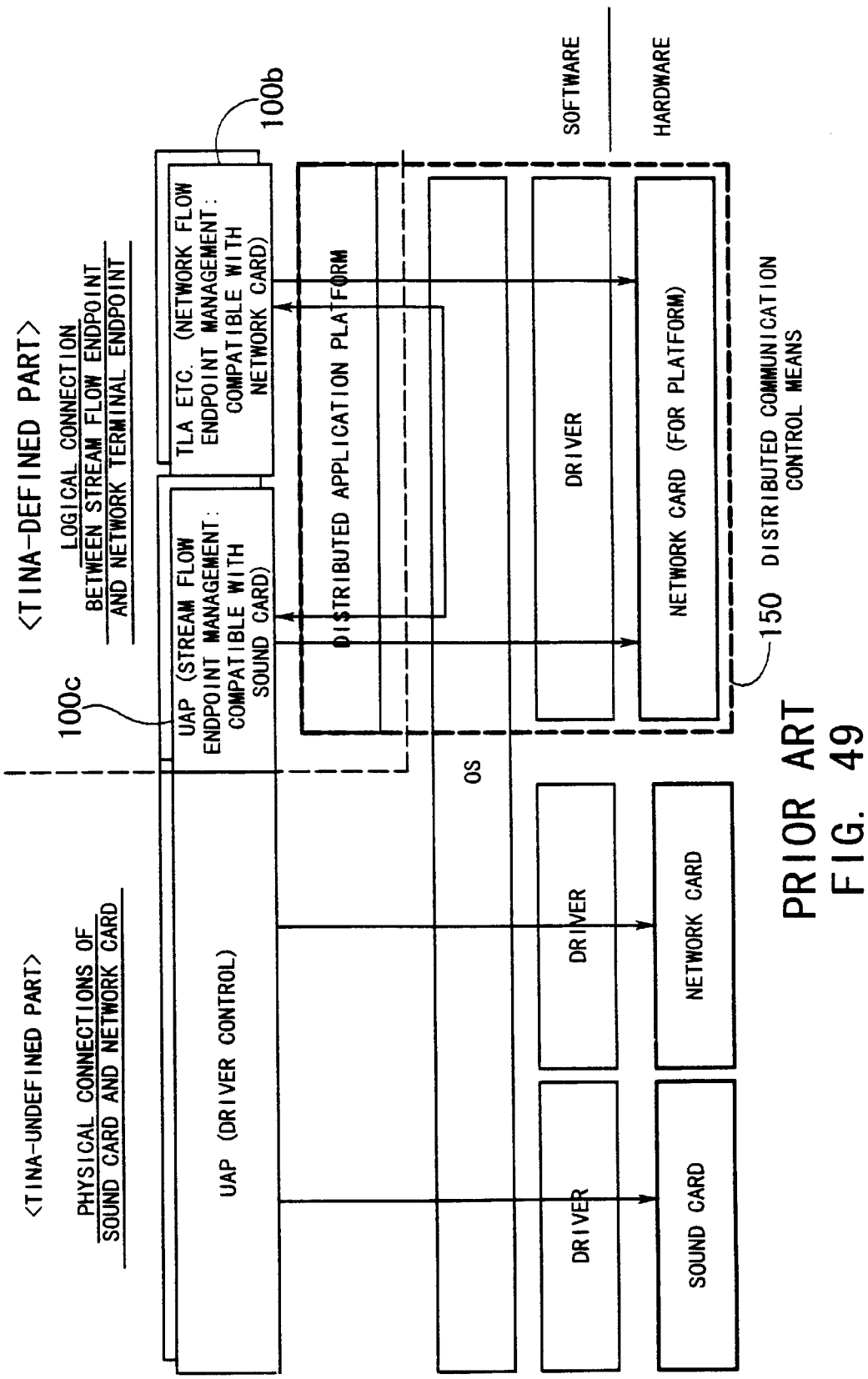
FIG. 49 is a diagram showing, by way of example, a structure of a user system complying with TINA.

FIG. 45 illustrates a process executed by the switching service control section 12aba, and FIG. 46 illustrates a process executed by the information unit control section 11ac. It is here assumed that "2" has been assigned as a connecting number for organization to the ordinary network 60 other than distributed network.

Referring to the step numbers (S) appearing in FIGS. 43 through 46, the status change notification process will be described. In the following, reference will be also made to FIGS. 18 through 23 described above.

Control of User Information Unit (Private Branch Exchange) 12

<<Step S170 of FIG. 44>> When the state of the extension (A) 14, for example, changes to an off-hook state, an "OFF-HOOK" signal is transmitted via the line interface 12d, and on receiving the signal, the line interface signal processing section 12abb transfers information "EVENT 'OFF-HOOK', LINE LOCATION NO. '1001'" to the switching service control section 12aba.

<<Step S171 of FIG. 44>> On receiving "EVENT 'OFF-HOOK'" the switching service control section 12aba extracts the logical extension number "1" from the line location number-logical line number conversion data [cf. FIG. 7(A)], and sets "BUSY" in the extension idle/busy data [cf. FIG. 7(B)]. Then, the switching service control section 12aba makes a request for line interface control "LINE DISCONNECTION MONITORING", speech path setting (dial-tone connection), etc. to the line interface signal processing section 12abb.

<<Step S172 of FIG. 44>> On receiving the instructions from the switching service control section 12aba, the line interface signal processing section 12abb subjects the instructions to format conversion and then sends a request to the line interface 12d. Also, based on the line location number information, the line interface signal processing section 12abb controls the speech path 12c.

<<Step S173 of FIG. 44>> If the connecting number "2" for organization to the ordinary network and a remote-party number "1234567", for example, are dialed at the extension (A) 14, "EVENT 'NUMERAL RECEPTION'" is sent to the switching service control section 12aba each time a line signal is received.

<<Step S174 of FIG. 44>> In this step, the process flow shown in FIG. 45 is executed.

The switching service control section 12aba stores the received numerals (Steps S361–S362). When reception of the numerals is completed (Step S363), the received numerals analysis data [cf. FIG. 7(D)] is indexed and it is confirmed by the first numeral that origination to ordinary network has been requested. At the same time, the trunk group number "2" is extracted (Steps S364–S365). The switching service control section 12aba then makes a status change signal transmission request "'STATUS CHANGE', LOGICAL EXTENSION NO.='1', "BUSY'" to the flow endpoint control signal transmitting section 12aab (Step S366).

<<Step S175 of FIG. 44>> In this step, the process flow shown in FIG. 19 is executed.

When supplied with the status change signal transmission request (Step S414), the flow endpoint control signal transmitting section 12aab requests the flow endpoint converting section 12ac to convert the logical extension number "1" to a stream flow endpoint (Step S416).

<<Step S176 of FIG. 44>> In this step, the process flow shown in FIGS. 22 and 23 is executed.

The flow endpoint converting section 12ac determines whether or not conversion to a stream flow endpoint has been requested (Step S600). If conversion to a stream flow endpoint has been requested, it is determined whether or not the number to be converted is an extension number (Step S601). If the number to be converted is an extension number, the logical extension number-stream flow endpoint conversion data [cf. FIG. 8(B)] is searched for a corresponding stream flow endpoint ID (Step S602). If the stream flow endpoint ID "S1" can be extracted (Step S604), the process is returned to the flow endpoint control signal transmitting section 12aab (Step S612).

<<Step S177 of FIG. 44>> In this step, the process flow shown in FIG. 19 is executed.

If the conversion to a stream flow endpoint meets with success (Step S416), the flow endpoint control signal transmitting section 12aab extracts the stream flow endpoint ID "S1" (Step S417). The flow endpoint control signal transmitting section 12aab then performs format conversion "'STATUS CHANGE', 'S1', 'BUSY'" (Step S418), and transmits the status change signal to the user signaling unit 11 via the signal terminating section 12f (Step S419).

Control of User Signaling Unit 11

The process flow shown in FIG. 46 is executed.

On receiving the flow endpoint control signal "'STATUS CHANGE', 'S1', 'BUSY'" from the user information unit (private branch exchange) 12 via the signal terminating section 11c (Step S761), the information unit control section 11ac sets the status information field of the stream flow endpoint "S1" in the stream flow endpoint data [cf. FIG. 9(A)] to "UNUSABLE" (Step S762).

Control of User Information Unit (Private Branch Exchange) 122

<<Step S178 of FIG. 44>> In this step, the process flow shown in FIG. 45 is executed.

The switching service control section 12aba hunts the trunk D "3001" which is a member of the trunk group corresponding to the trunk group number "2" (Step S367), and sets "BUSY" in the trunk idle/busy data [cf. FIG. 7(C)] associated with the trunk D (Step S368). Then, the switching service control section 12aba makes a status change signal transmission request "'STATUS CHANGE', LOGICAL TRUNK NO.='20', 'BUSY'" to the flow endpoint control signal transmitting section 12aab (Step S369). Subsequently, the switching service control section 12aba carries out origination to the network 60 which is not a distributed network.

<<Step S179 of FIG. 44>> In this step, the process flow shown in FIG. 19 is executed.

When supplied with the status change signal transmission request (Step S414), the flow endpoint control signal transmitting section 12aab requests the flow endpoint converting section 12ac to convert the logical trunk number "20" to a stream flow endpoint (Step S415).

<<Step S180 of FIG. 44>> In this step, the process flow shown in FIGS. 22 and 23 is executed.

The flow endpoint converting section 12ac determines whether or not conversion to a stream flow endpoint has been requested (Step S600). If conversion to a stream flow endpoint has been requested, it is determined whether or not the number to be converted is an extension number (Step S601). If the number to be converted is not an extension number, the logical trunk number-stream flow endpoint conversion data [cf. FIG. 8(C)] is searched for a corresponding stream flow endpoint ID (Step S603). If the stream flow endpoint ID "S31" can be extracted (Step S604), the process is returned to the flow endpoint control signal transmitting section 12aab (Step S612).

<<Step S181 of FIG. 44>> In this step, the process flow shown in FIG. 19 is executed.

If the conversion to a stream flow endpoint meets with success (Step S416), the flow endpoint control signal transmitting section 12aab extracts the stream flow endpoint ID "S31" (Step S417). Then, the flow endpoint control signal transmitting section 12aab performs format conversion "'STATUS CHANGE', 'S31', 'BUSY'" (Step S418), and transmits the status change signal to the user signaling unit 11 via the signal terminating section 12f (Step S419).

Control of User Signaling Unit 11

The process flow shown in FIG. 46 is executed.

On receiving the flow endpoint control signal "'STATUS CHANGE', 'S31', 'BUSY'" from the user information unit (private branch exchange) 12 via the signal terminating section 11c (Step S761), the information unit control section 11ac sets the status information field of the stream flow endpoint "S31" in the stream flow endpoint data [cf. FIG. 7(A)] to "UNUSABLE" (Step S762).

Control of User Signaling Unit 11

The process flow shown in FIG. 46 is executed.

On receiving a telephoney service join request "'500', '3334000'" including receiving stream flow endpoint information, remote party information, etc. from the network signaling unit 20, . . . , 30 via the distributed communication control section 11ad (Step S764), the information unit control section 11ac extracts, based on the stream flow endpoint number "500", the flow endpoint type of the stream flow endpoint "S3" from the stream flow endpoint data [cf. FIG. 9(A)] (Step S765). The extracted flow endpoint type is "ABSTRACT FLOW ENDPOINT" (Step S766), and therefore, the member "S31" is extracted from the abstract stream flow endpoint member data [cf. FIG. 10 (A)] (Step S767). Then, with respect to the stream flow endpoint ID "S31", the status information on the stream flow endpoint "S31" is extracted from the stream flow endpoint data [ cf . FIG. 9 (A)]0 (Step S768), and since "UNUSABLE" is set as the status (Step S769), the network signaling unit 20, . . . , 30 is notified via the distributed communication control section 11ad that the service is not available (Step S770).

As described above, according to the present invention, the user system for a distributed network comprises a user signaling unit, a user information unit incorporating therein physical points corresponding to stream and network flow endpoints, respectively, and a flow endpoint control channel connecting the user signaling unit and the user information unit, wherein the user signaling unit includes a distributed application platform (distributed communication control means), distributed network service control means, and information unit control means for controlling the user information unit by means of a flow endpoint control signal, and the user information unit includes physical point linking means, and flow endpoint control signal processing means cooperating with the user signaling unit by means of the flow endpoint control signal. Accordingly, a user information unit which cannot be equipped with or does not have the distributed application platform can be connected to a distributed network, and flow connections of the user information unit can be freely handled by the user signaling unit.

The flow endpoint control signal does not include physical point information on the user information unit and comprises stream flow endpoint information and network flow endpoint information, and the user information unit is provided with flow endpoint converting means for converting physical point information and flow endpoint information. This makes it unnecessary for the user signaling unit to retain information about physical points corresponding to the flow endpoints equipped in the user information unit.

Further, in cases where a physical point corresponding to a stream flow endpoint is used for a purpose other than terminal connection for a distributed network flow connection, the flow endpoint control signal processing means notifies the user signaling unit of such a status change of the stream flow endpoint by means of the flow endpoint control signal. Thus, a physical point represented by a stream flow endpoint can be freely used for other purposes than distributed network communications.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A user system for a distributed network in which a flow connection is expressed by a logical link between a stream flow endpoint and a network flow endpoint, and physical points represented by the stream and network flow endpoints, respectively, are linked in a flow-dependent manner, said user system comprising:

a user signaling unit;

a user information unit incorporating therein physical points corresponding to stream and network flow endpoints, respectively;

a flow endpoint control line connecting said user signaling unit and said user information unit;

distributed communication control means provided in said user signaling unit for controlling communications between network signaling units on the distributed network via a distributed network signal line;

distributed network service control means provided in said user signaling unit controlling distributed network service;

information unit control means, provided in said user signaling unit, for controlling said user information unit by means of a flow endpoint control signal;

physical point linking means provided in said user information unit controls links of the stream flow endpoint with the network flow endpoint; and flow endpoint control signal processing means provided in said user information unit and cooperating with said user signaling unit by means of the flow endpoint control signal.

2. The user system according to claim 1, wherein said distributed network service control means cooperates with a network signaling unit to perform access to service provided by the distributed network, service execution control, control of the logical link between stream and network flow endpoints, and management of network flow endpoints.

3. The user system according to claim 1, wherein said information unit control means cooperates with a network signaling unit to perform management of stream flow endpoints and control of said user information unit by means of the flow endpoint control signal.

4. The user system according to claim 1, wherein said means links a physical point represented by said stream flow endpoint with a physical point represented by said network flow endpoint.

5. The user system according to claim 1, wherein the flow endpoint control signal includes no information on physical points of said user information unit and comprises stream flow endpoint information and network flow endpoint information, and said user information unit includes flow endpoint converting means for converting physical point information and flow endpoint information.

6. The user system according to claim 1, wherein when a physical point corresponding to a stream flow endpoint changes termination to a non distributed network flow connection, said flow endpoint control signal processing means notifies said user signaling unit of a change in status of the stream flow endpoint by means of the flow endpoint control signal.

* * * * *